US012669743B2

(12) United States Patent
Chen

(10) Patent No.: US 12,669,743 B2
(45) Date of Patent: Jun. 30, 2026

(54) MULTI-LEGGED STAND AND ELECTRONIC TERMINAL SUPPORT DEVICE

(71) Applicant: Shenzhen Haohualianhe Technology Co., Ltd., Guangdong (CN)

(72) Inventor: Weihao Chen, Guangdong (CN)

(73) Assignee: Shenzhen Haohualianhe Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/290,736

(22) Filed: Aug. 5, 2025

(65) Prior Publication Data

US 2026/0036889 A1 Feb. 5, 2026

(30) Foreign Application Priority Data

| Aug. 5, 2024 | (CN) | ........................ | 202411064508.8 |
| Aug. 5, 2024 | (CN) | ........................ | 202411066324.5 |
| Sep. 12, 2024 | (CN) | ........................ | 202411280256.2 |
| Jul. 11, 2025 | (CN) | ........................ | 202510960661.7 |

(51) Int. Cl.
G03B 17/56 (2021.01)
F16M 11/24 (2006.01)

(52) U.S. Cl.
CPC ......... G03B 17/561 (2013.01); F16M 11/242 (2013.01)

(58) Field of Classification Search
CPC ............................ G03B 17/561; F16M 11/242
USPC ........................................................ 248/171
See application file for complete search history.

(56) References Cited

U.S. PATENT DOCUMENTS

| 2,646,956 | A | 7/1953 | Cadwell |
| 2,750,141 | A | 6/1956 | Tobias |
| 3,618,885 | A | 11/1971 | Muller |
| 3,632,073 | A | 1/1972 | Nakatani |
| 3,722,847 | A | 3/1973 | O'Connor |
| 5,222,705 | A | 6/1993 | Gibran |
| 8,201,979 | B2 * | 6/2012 | Deighton ............... F16M 11/38 |
| | | | 248/177.1 |

(Continued)

FOREIGN PATENT DOCUMENTS

| CN | 209146659 U | 7/2019 |
| CN | 112097060 A | 12/2020 |

(Continued)

*Primary Examiner* — Anita M King
(74) *Attorney, Agent, or Firm* — Cooper Legal Group, LLC

(57) ABSTRACT

A multi-legged stand and an electronic terminal support device. The multi-legged stand includes: a support rod assembly, a sliding sleeve assembly, support leg assemblies, connecting rods, and a preliminary opening member. When the support leg assemblies are splayed relative to the support rod assembly, the support leg assemblies can stand on a support surface. When a first external action is applied to the preliminary opening member, the preliminary opening member rotates relative to the support rod assembly. The preliminary opening member includes actuating portions. During rotation of the preliminary opening member from an initial position to a second position, the actuating portions actuate the support leg assemblies to cause the support leg assemblies to be switched from a folded state relative to the support rod assembly to a preliminarily opened state relative to the support rod assembly, facilitating splaying of the support leg assemblies relative to the support rod assembly.

30 Claims, 40 Drawing Sheets

(56) References Cited

U.S. PATENT DOCUMENTS

| | | | |
|---|---|---|---|
| 8,939,602 B2 | 1/2015 | Wessel | |
| 9,222,633 B2 * | 12/2015 | Inskeep | F21S 9/02 |
| 9,380,904 B2 * | 7/2016 | Peek | F16M 11/28 |
| 9,651,196 B1 | 5/2017 | Mao | |
| 9,907,194 B2 | 2/2018 | Chen | |
| 10,302,244 B2 | 5/2019 | Lu | |
| 11,149,901 B2 | 10/2021 | Grabner | |
| 11,402,059 B2 | 8/2022 | Yeomans | |
| 11,532,216 B2 * | 12/2022 | Houle | G08B 5/006 |
| 11,595,506 B2 | 2/2023 | Kameli | |
| 11,606,946 B1 | 3/2023 | Kowalski | |
| 11,835,208 B1 | 12/2023 | Chen | |
| 11,940,717 B1 * | 3/2024 | Zou | G03B 17/56 |
| 11,971,134 B2 | 4/2024 | Xia | |
| 12,104,742 B1 | 10/2024 | Hu | |
| 12,158,234 B2 | 12/2024 | Wang | |
| 2006/0202098 A1 | 9/2006 | Hsieh | |
| 2007/0012160 A1 | 1/2007 | Sato | |
| 2014/0151527 A1 | 6/2014 | Sawhney | |
| 2015/0076295 A1 | 3/2015 | Fiorese | |
| 2016/0161050 A1 * | 6/2016 | Trebesius | F16M 11/38 |
| | | | 248/122.1 |
| 2016/0230922 A1 | 8/2016 | Caroom | |
| 2021/0123302 A1 | 4/2021 | Caldwell | |
| 2023/0176454 A1 | 6/2023 | Wang | |
| 2025/0237934 A1 | 7/2025 | Wang | |

FOREIGN PATENT DOCUMENTS

| | | |
|---|---|---|
| CN | 215454886 U | 1/2022 |
| CN | 216158729 U | 4/2022 |
| CN | 216158730 U | 4/2022 |
| CN | 216202167 U | 4/2022 |
| CN | 217816052 U | 11/2022 |
| CN | 115479197 A | 12/2022 |
| CN | 221300878 U | 7/2024 |
| WO | 2022073449 A1 | 4/2022 |
| WO | 2024041620 A1 | 2/2024 |

* cited by examiner

MULTI-LEGGED STAND AND ELECTRONIC TERMINAL SUPPORT DEVICE

CROSS-REFERENCE TO RELATED APPLICATIONS

The present application claims the priority and benefits of Chinese patent application No. 202510960661.7, filed on Jul. 11, 2025, Chinese patent application No. 202411280256.2, filed on Sep. 12, 2024, Chinese patent application No. 202411064508.8, filed on Aug. 5, 2024, and Chinese patent application No. 202411066324.5, filed on Aug. 5, 2024. The entire contents of Chinese patent application No. 202510960661.7, Chinese patent application No. 202411280256.2, Chinese patent application No. 202411064508.8, and Chinese patent application No. 202411066324.5 are hereby incorporated by reference in their entireties.

TECHNICAL FIELD

The present disclosure relates to the technical field of auxiliary equipment for electronic terminals or photography accessories, and more specifically to a multi-legged stand and an electronic terminal support device.

BACKGROUND

Stands are primarily utilized for mounting and supporting electronic terminals such as tablets and smartphones to facilitate their filming, and are further employed to support supplementary photography accessories. Current market offerings encompass a diverse array of stands, varying in materials and functionalities. For instance, a multi-legged stand has emerged, featuring adjustable splay across its multiple legs.

In the related art, a conventional multi-legged stand includes a support rod assembly and at least three leg assemblies, where the at least three leg assemblies can be splayed or folded relative to the support rod assembly. When splayed relative to the support rod assembly, the at least three leg assemblies can stabilize the stand on a support surface. In the folded state, the at least three leg assemblies are folded against the support rod assembly. A prevalent limitation in the conventional multi-legged stand is the difficulty in transitioning the leg assemblies from the folded state to the splayed state relative to the support rod assembly.

SUMMARY OF THE DISCLOSURE

A multi-legged stand, including: a support rod assembly, a sliding sleeve assembly, at least three support leg assemblies, at least three connecting rods, and a preliminary opening member; wherein the sliding sleeve assembly is slidably sleeved along a length direction of the support rod assembly on the support rod assembly;

the at least three support leg assemblies are each rotatably connected to the sliding sleeve assembly;

the at least three connecting rods are matched with the at least three support leg assemblies in a one-to-one correspondence, with an end of each connecting rod rotatably connected to the support rod assembly and another end of the connecting rod rotatably connected to a corresponding support leg assembly, allowing the at least three support leg assemblies to be splayed or folded relative to the support rod assembly; in an initial state, the at least three support leg assemblies remain in a folded state relative to the support rod assembly; in a case where the at least three support leg assemblies are in a splayed state relative to the support rod assembly, the at least three support leg assemblies are capable of standing on a support surface;

in a case where a first external action is applied to the preliminary opening member, the preliminary opening member is caused to rotate relative to the support rod assembly; the preliminary opening member includes at least three actuating portions, with the at least three actuating portions being matched with the at least three support leg assemblies in a one-to-one correspondence; during rotation of the preliminary opening member from an initial position to a second position, the at least three actuating portions actuate the at least three support leg assemblies respectively to cause the at least three support leg assemblies to be switched from the folded state relative to the support rod assembly to a preliminarily opened state relative to the support rod assembly, facilitating splaying of the at least three support leg assemblies relative to the support rod assembly.

A multi-legged stand, including: a support rod assembly, a sliding sleeve assembly, at least three support leg assemblies, at least three connecting rods, and a preliminary opening member;

wherein the sliding sleeve assembly is slidably sleeved along a length direction of the support rod assembly on the support rod assembly;

the at least three support leg assemblies are each rotatably connected to the sliding sleeve assembly;

the at least three connecting rods are matched with the at least three support leg assemblies in a one-to-one correspondence, with an end of each connecting rod rotatably connected to the support rod assembly and another end of the connecting rod rotatably connected to a corresponding support leg assembly, allowing the at least three support leg assemblies to be splayed or folded relative to the support rod assembly; in an initial state, the at least three support leg assemblies remain in a folded state relative to the support rod assembly; in a case where the at least three support leg assemblies are in a splayed state relative to the support rod assembly, the at least three support leg assemblies are capable of standing on a support surface;

the preliminary opening member is slidably arranged on the support rod assembly; a second external action is configured to be applied to the preliminary opening member to cause the preliminary opening member to translate along a first direction relative to the support rod assembly;

the preliminary opening member includes at least three contact-push portions, with the at least three contact-push portions corresponding to the at least three support leg assemblies in a one-to-one correspondence;

during a process of the preliminary opening member translating from an initial position to a third position, the at least three contact-push portions push the at least three support leg assemblies, causing the at least three support leg assemblies to be switched from being folded relative to the support rod assembly to being preliminarily opened relative to the support rod assembly.

An electronic terminal support device, including a support member and the multi-legged stand as above; wherein the support member is configured to support an electronic terminal, and the support member is arranged on the support rod assembly.

BRIEF DESCRIPTION OF THE DRAWINGS

To more clearly illustrate the technical solutions of the embodiments of the present disclosure, the following is a brief introduction to the drawings used in the embodiments. It should be understood that the following drawings only illustrate certain embodiments of the present disclosure and should not be regarded as limiting the scope thereof. For those skilled in the art, other related drawings can be obtained based on these drawings without creative labor.

DETAILED DESCRIPTION

Figure 1:
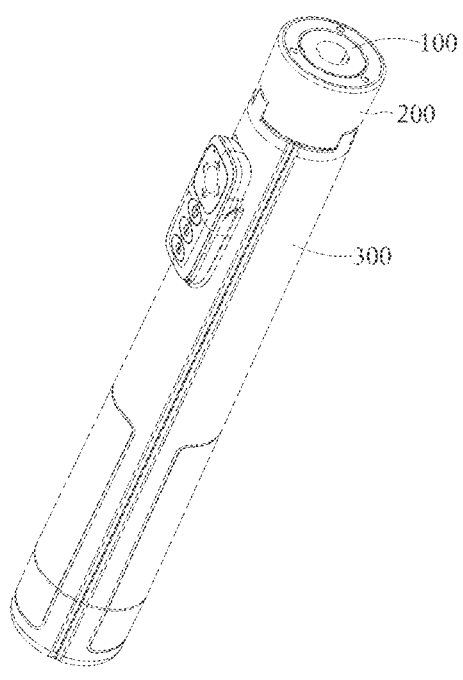
FIG. 1 is a structural schematic view of a multi-legged stand according to some embodiments of the present disclosure; where three support leg assemblies of the multi-legged stand are in a folded state relative to a support rod assembly.
Figure 2:
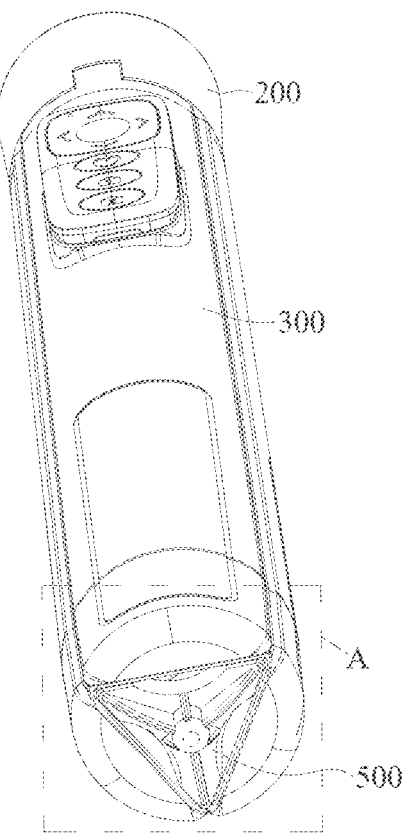
FIG. 2 is another structural schematic view of the multi-legged stand shown in FIG. 1 at another viewing angle.
Figure 3:
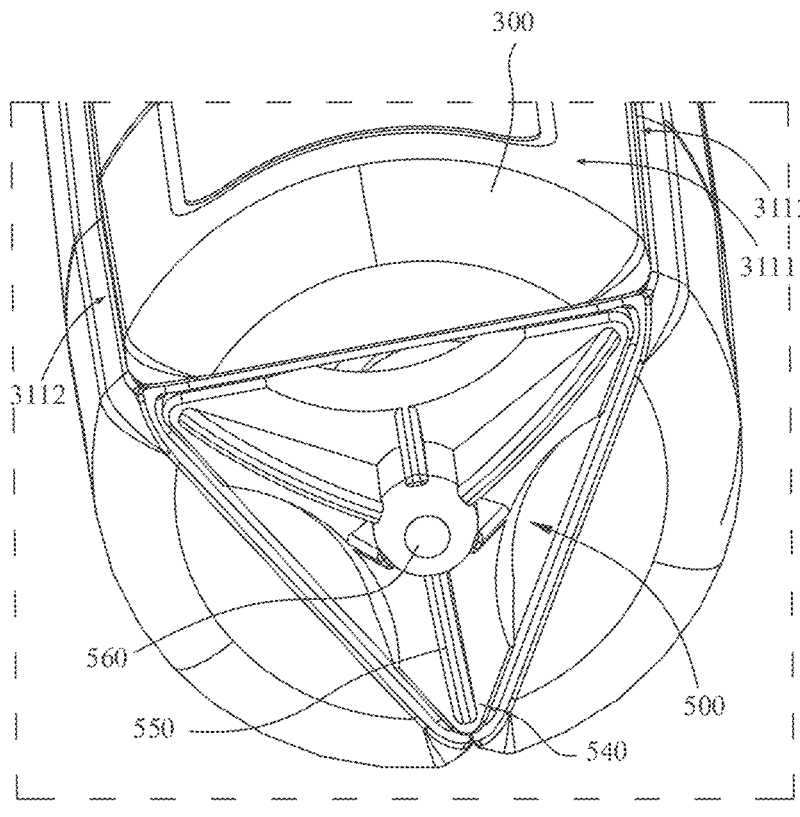
FIG. 3 is an enlarged view of the structure at position A in the multi-legged stand shown in FIG. 2.

To make the objectives, technical solutions, and advantages of the embodiments of the present disclosure clearer, the technical solutions of the embodiments of the present disclosure will be described in detail below with reference to the accompanying drawings. It should be noted that the embodiments described herein are only some of the embodiments of the present disclosure and not all of them. The components of the embodiments of the present disclosure described and shown in the accompanying drawings may be arranged and designed in various different configurations.

Therefore, the detailed description of the embodiments of the present disclosure provided in the accompanying drawings is not intended to limit the scope of the present disclosure as claimed, but merely represents selected embodiments of the present disclosure. All other embodiments obtained by those skilled in the art based on the embodiments of the present disclosure without making any creative contributions are within the scope of the present disclosure.

The embodiments of the present disclosure provide a multi-legged stand, as referred to in FIGS. 1-27, or FIGS. 29-55, or FIGS. 56-66. The multi-legged stand includes a support rod assembly 100, a sliding sleeve assembly 200, at least three support leg assemblies 300, at least three connecting rods 400, and a preliminary opening member 500; the sliding sleeve assembly 200 is slidably sleeved along a length direction of the support rod assembly 100 on the support rod assembly 100; the at least three support leg assemblies 300 are rotatably connected to the sliding sleeve assembly 200; the at least three connecting rods 400 are matched with the at least three support leg assemblies 300 in a one-to-one correspondence, with an end of each connecting rod 400 rotatably connected to the support rod assembly 100 and another end of the connecting rod 400 rotatably connected to a corresponding support leg assembly 300, allowing the at least three support leg assemblies 300 to be splayed or folded relative to the support rod assembly 100; in an initial state, the at least three support leg assemblies 300 remain in a folded state relative to the support rod assembly 100; when the at least three support leg assemblies 300 are in a splayed state relative to the support rod assembly 100, the at least three support leg assemblies 300 can stand on a support surface; when a first external action is applied to the preliminary opening member 500, the preliminary opening member 500 is caused to rotate relative to the support rod assembly 100; the preliminary opening member 500 includes at least three actuating portions 540, with the at least three actuating portions 540 being matched with the at least three support leg assemblies 300 in a one-to-one correspondence; during rotation of the preliminary opening member 500 from an initial position to a second position, the at least three actuating portions 540 actuate the at least three support leg assemblies 300 respectively to cause the at least three support leg assemblies 300 to be switched from the folded state relative to the support rod assembly 100 to a preliminarily opened state relative to the support rod assembly 100, facilitating the splaying of the at least three support leg assemblies 300 relative to the support rod assembly 100. It can be understood that the rotation of the preliminary opening member 500 relative to the support rod assembly 100 causes the at least three support leg assemblies 300 to be preliminarily opened relative to the support rod assembly 100, thereby enabling at least three support leg assemblies 300 to be splayed more easily relative to the support rod assembly 100, and thus facilitating the use of the multi-legged stand.

Understandably, during the process where the at least three actuating portions 540 actuate the at least three support leg assemblies 300 respectively to cause the at least three support leg assemblies 300 to be folded relative to the support rod assembly 100 and become preliminarily opened relative to the support rod assembly 100, the actuating portions 540 rotate relative to the support rod assembly 100 and pushes open the corresponding support leg assemblies 300, causing the at least three support leg assemblies 300 to be folded relative to the support rod assembly 100 and then preliminarily opened relative to the support rod assembly 100.

For example, the multi-legged stand according to the embodiments of the present disclosure may be applied to support electronic devices and/or photography accessories. The electronic devices may include smartphones, tablets, cameras, etc., and the photography accessories may include lighting fixtures, remote controls, secondary cameras, etc.

For example, the support rod assembly 100 may be length-adjustable along its length direction to accommodate different support height requirements of users, thereby enhancing the product's versatility; or, the support rod assembly 100 may have a fixed length. For example, the support rod assembly 100 includes multiple length-adjustable segments, with a first length-adjustable segment among them. The sliding sleeve assembly 200 is slidably sleeve on the first length-adjustable segment. The number of the support leg assemblies 300 may be 3, 4, etc., and the number of the connecting rods 400 may be 3, 4, etc., with the number of the connecting rods 400 being the same as the number of the support leg assemblies 300. During the process where the at least three support leg assemblies 300 are splayed or folded relative to the support rod assembly 100, the sliding sleeve assembly 200, the support rod assembly 100, the support leg assemblies 300, and the connecting rods 400 operate in coordination. The sliding sleeve assembly 200, the support rod assembly 100, each support leg assembly 300, and its corresponding connecting rod 400 form a planar four-bar linkage mechanism. Specifically, this planar four-bar linkage mechanism may be a crank-slider mechanism, a rocker-slider mechanism, etc. During the process of the support leg assembly 300 changing from the folded state to the splayed state relative to the support rod assembly 100, the sliding sleeve assembly 200 slides relative to the support rod assembly 100; when the extent to which the support leg assembly 300 is splayed relative to the support rod assembly 100 varies, the sliding sleeve assembly 200 is positioned at different locations on the support rod assembly 100 correspondingly.

For example, the support rod assembly 100 has a central axis extending in a longitudinal direction, such as a central axis of the support rod assembly 100 extending along the length direction of the support rod assembly 100; for example, the sliding sleeve assembly 200 is sleeved on the periphery of the support rod assembly 100 along the central axis. The support rod assembly 100 extends longitudinally, providing positioning and guidance for the sliding of the sliding sleeve assembly 200, thereby enhancing the overall stability of the multi-legged stand. For example, a sliding-fit portion of the support rod assembly 100 with the sliding sleeve assembly 200 is cylindrical in shape to ensure smooth sliding of the sliding sleeve assembly 200. For example, a rotational axis of the preliminary opening member 500 is along the length direction of the support rod assembly 100. Specifically, the rotational axis of the preliminary opening member 500 is parallel to the central axis of the support rod assembly 100. More specifically, the rotational axis of the preliminary opening member 500 is coaxial with the central axis of the support rod assembly 100. In other examples, the rotational axis of the preliminary opening member 500 is not parallel to the length direction of the support rod assembly 100, and the rotational axis of the preliminary opening member 500 is not parallel to the central axis of the support rod assembly 100.

For example, the sliding sleeve assembly 200 is sleeved on the periphery of the support rod assembly 100, the support rod assembly 100 can extend from a top of the sliding sleeve assembly 200, and the support leg assembly 300 is rotatably connected to a bottom end of a main cylinder of the sliding sleeve assembly 200.

For example, the support rod assembly 100 has a first outer peripheral wall 111, and the sliding sleeve assembly 200 is slidably sleeved on the first outer peripheral wall 111 of the support rod assembly 100. Specifically, the first outer peripheral wall 111 is disposed on the first length-adjustable segment. A sliding gap exists between the first outer peripheral wall 111 of the support rod assembly 100 and an inner peripheral wall of the sliding sleeve assembly 200, thereby reducing or eliminating friction between the support rod assembly 100 and the sliding sleeve assembly 200. As a result, the sliding of the support rod assembly 100 and the sliding sleeve assembly 200 is smoother and unobstructed, enabling the multi-legged stand to automatically be splayed or folded more quickly and conveniently. In an example, rolling elements are provided between the inner peripheral wall of the sliding sleeve assembly 200 and the outer peripheral wall of the support rod assembly 100. For example, the rolling elements may be structures such as balls or rolling bearings, which reduce friction while ensuring smooth sliding between the sliding sleeve assembly 200 and the support rod assembly 100. To ensure overall consistency, the cross-section of the sliding sleeve assembly 200 is generally circular.

To prevent shaking when the support rod assembly 100 and the sliding sleeve assembly 200 slide relative to each other, the gap between the outer peripheral wall of the support rod assembly 100 and the inner peripheral wall of the sliding sleeve assembly 200 may have its size limited. For example, in some embodiments, the sliding gap between the outer peripheral wall of the support rod assembly 100 and the inner peripheral wall of the sliding sleeve assembly 200 is greater than or equal to 0.1 mm and less than or equal to 1.5 mm. In this way, while ensuring that the support rod assembly 100 and the sliding sleeve assembly 200 can slide with a clearance fit, the shaking of the support rod assembly 100 and the sliding sleeve assembly 200 during relative sliding may be prevented, thereby making the automatic splaying and folding of the multi-legged stand more reliable.

For example, when the at least three support leg assemblies 300 are in the folded state relative to the support rod assembly 100, the at least three support leg assemblies 300 can be held by the user. For instance, when the support rod assembly 100 supports an electronic device, the user can hold the at least three support assemblies to take a selfie. In some cases, when the at least three support leg assemblies 300 are in the folded state relative to the support rod assembly 100, the connecting rods 400 are folded relative to the support rod assembly 100, with each connecting rod 400 disposed between the support rod assembly 100 and a corresponding support leg assembly 300.

For example, to reduce costs and improve aesthetics, the shape and size of the at least three support leg assemblies 300 are typically similar. When the multi-legged stand is applied to a smartphone, the multi-legged stand may be configured as a remote-controlled selfie stick. For example, a mounting slot for accommodating a remote controller may be defined on one of the support leg assemblies 300. The remote controller may be fixedly arranged in the mounting slot or detachably arranged therein. The remote controller may be a Bluetooth remote controller, enabling users to control the smartphone's camera via the Bluetooth remote controller to expand the application scenarios of the multi-legged stand.

It should be understood that the at least three support leg assemblies 300 can remain in the folded state relative to the support rod assembly 100. For example, during the transportation of the multi-legged stand, the support leg assemblies 300 remain in a stable folded configuration relative to the support rod assembly 100, and the support leg assemblies 300 cannot splay relative to the support rod assembly 100, such as the support leg assemblies 300 not splaying relative to the support rod assembly 100 due to their own weight. For example, in the folded state, each support leg assembly 300 is snap-fitted to the connecting rod 400, the support rod assembly 100, or the sliding sleeve assembly 200. Alternatively, the support leg assembly 300 is magnetically attracted to the connecting rod 400, the support rod assembly 100, or the sliding sleeve assembly 200.

In common cases, when the at least three support leg assemblies 300 are in a preliminarily opened state relative to the support rod assembly 100, the at least three support leg assemblies 300 can further be opened relative to the support rod assembly 100, causing the at least three support leg assemblies 300 to be splayed relative to the support rod assembly 100, thereby enabling the at least three support leg assemblies 300 to stand on the support surface. In other uncommon cases, the preliminarily opened state of the at least three support leg assemblies 300 relative to the support rod assembly 100 is one of splayed states of the at least three support leg assemblies 300 relative to the support rod assembly 100, i.e., in the preliminarily opened state of the at least three support leg assemblies 300 relative to the support rod assembly 100, the at least three support leg assemblies 300 can stand on the support surface.

In some cases, when the support leg assemblies 300 are folded relative to the support rod assembly 100, each support leg assembly 300 is subjected to a folding force that keeps it folded relative to the support rod assembly 100. The type of the folding force acting on the support leg assembly 300 to keep it folded relative to the support rod assembly 100 may be diverse. The folding force acting on the support leg assembly 300 to keep it folded relative to the support rod assembly 100 may include a suction force (e.g., vacuum suction force), snap-fitting force, magnetic attraction force, or adhesive bonding force. The folding force acting on the support leg assembly 300 may be partially or entirely derived from its corresponding connecting rod 400, the support rod assembly 100, or the sliding sleeve assembly 200. For example, when the support leg assembly 300 is snap-fit to the connecting rod 400, the support rod assembly 100, or the sliding sleeve assembly 200, the folding force is partially or entirely derived from the snap-fit force exerted by the connecting rod 400, the support rod assembly 100, or the sliding sleeve assembly 200 on the support leg assembly 300. In another example, when the support leg assembly 300 is magnetically attracted to the connecting rod 400, the support rod assembly 100, or the sliding sleeve assembly 200, the folding force is partially or entirely derived from the magnetic attraction force of the connecting rod 400, the support rod assembly 100, or the sliding sleeve assembly 200. When the at least three support leg assemblies 300 are switched from the folded state relative to the support rod assembly 100 into the preliminarily opened state relative to the support rod assembly 100, the folding force acting on the support leg assembly 300 is reduced or eliminated, allowing the support leg assembly 300 to be splayed easily relative to the support rod assembly 100, thereby causing the support leg assembly 300 to assume the splayed state relative to the support rod assembly 100. For example, when the support leg assembly 300 is in the preliminarily opened state relative to the support rod assembly 100, since the folding force acting on the support leg assembly 300 is reduced or eliminated, the user can more easily pry the support leg assemblies 300 apart from the support rod assembly 100 by hand, or the user can more easily slide the sliding sleeve assembly 200, thereby facilitating the splaying of the support leg assemblies 300 relative to the support rod assembly 100. In another example, when the support leg assembly 300 is in the preliminarily opened state relative to the support rod assembly 100, under the self-weight of a movable component, the support leg assembly 300 is splayed relative to the support rod assembly 100, the sliding sleeve assembly 200 slides toward the bottom end of the support rod assembly 100, and the connecting rod 400 is splayed relative to the support rod assembly 100, thereby causing the support leg assembly 300 to be in the splayed state relative to the support rod assembly 100. Herein, the movable component includes the support leg assembly 300, the connecting rod 400, and the sliding sleeve assembly 200.

In other cases, when the at least three support leg assemblies 300 are switched from the folded state relative to the support rod assembly 100 into the preliminarily opened state relative to the support rod assembly 100, the folding force acting on the support leg assembly 300 remains unchanged. However, since the support leg assembly 300 is preliminarily opened relative to the support rod assembly 100, the user can easily use their hands or external tools to further pry open the support leg assembly 300 relative to the support rod assembly 100, thereby facilitating the splaying of the support leg assemblies 300 relative to the support rod assembly 100.

It can be understood that the folding force acting on the support leg assembly 300 may be magnetic attraction force. Compared to other methods, due to the effect of the magnetic field, during the process of the at least three support leg assemblies 300 switching from the splayed state to the folded state relative to the support rod assembly 100, the magnetic attraction force promotes the folding and adhesion of the at least three support leg assemblies 300 to the support rod assembly 100, thereby making the automatic folding and adhesion of the at least three support leg assemblies 300 to the support rod assembly 100 faster and smoother, and ensuring that the at least three support leg assemblies 300 ultimately adhere more precisely to the support rod assembly 100. Furthermore, since the folding force acting on the support leg assemblies 300 is magnetic attraction force, compared to a mechanism where the folding force is a snap-fitting force, the support leg assemblies 300 may be more smoothly pushed open when the at least three actuating portions 540 rotate, thereby preventing unintended jamming occurrences.

Specifically, the support surface may be the ground, a table surface, etc., and may be a flat surface or a curved surface, etc., and may be a horizontal surface or an inclined surface.

In some implementations, referring to FIGS. 1-27, or referring to FIGS. 29-55, or referring to FIGS. 56-66, the preliminary opening member 500 is rotatable relative to the support rod assembly 100, meaning that during the movement of the preliminary opening member 500 relative to the support rod assembly 100, at least one of the motion components of the preliminary opening member 500 is a rotational movement relative to the support rod assembly 100. For example, the preliminary opening member 500 is rotatably connected to the support rod assembly 100, such as through a rotary joint, allowing the user to directly rotate the preliminary opening member 500 relative to the support rod assembly 100. Another example is that the preliminary opening member 500 can both translate relative to the support rod assembly 100 and rotate relative to the support rod assembly 100.

It can be understood that applying a first external action to the preliminary opening member 500 causes the preliminary opening member 500 to rotate relative to the support rod assembly 100, thereby causing the support leg assembly 300 to be preliminarily opened relative to the support rod assembly 100. For example, when the preliminary opening member 500 can only rotate relative to the support rod assembly 100, the first external action includes a rotational torque around the rotational axis of the preliminary opening member 500. Applying a rotational torque to the preliminary opening member 500 (e.g., by manually rotating the preliminary opening member 500) causes the preliminary opening member 500 to rotate relative to the support rod assembly 100, thereby allowing the support leg assembly 300 to be preliminarily opened relative to the support rod assembly 100. When the preliminary opening member 500 is both capable of translating relative to the support rod assembly 100 and capable of rotating relative to the support rod assembly 100, the first external action includes a force acting on the preliminary opening member 500 along a first direction, where the force is applied to the preliminary opening member 500 to cause it to translate along the first direction relative to the support rod assembly 100, further causing the preliminary opening member 500 to rotate relative to the support rod assembly 100; or, the first external action includes a rotational torque around the rotational axis of the preliminary opening member 500, where the rotational torque is applied to the preliminary opening member 500 such that the preliminary opening member 500 rotates relative to the support rod assembly 100.

In some embodiments, referring to FIGS. 1-27, or referring to FIGS. 56-66, the preliminary opening member 500 is rotatably arranged on the support rod assembly 100 in a restricted manner, such that the preliminary opening member 500 cannot exceed the initial position, or the preliminary opening member 500 cannot exceed the second position. For example, when the preliminary opening member 500 is in the initial position, the preliminary opening member 500 directly or indirectly abuts against the support rod assembly 100. For example, when the preliminary opening member 500 is in the second position, the preliminary opening member 500 directly or indirectly abuts against the support rod assembly 100.

For example, referring to FIGS. 1-27, or referring to FIGS. 29-55, or referring to FIGS. 56-66, during the process where the at least three support leg assemblies 300 are switched from the folded state relative to the support rod assembly 100 into the preliminarily opened state relative to the support rod assembly 100, the rotation angle of each support leg assembly 300 relative to the support rod assembly 100 is greater than or equal to 0.5°, such as 0.5°, 1°, 2°, 3°, etc.

In further embodiments, during the process where the at least three support leg assemblies 300 are switched from the folded state relative to the support rod assembly 100 into the preliminarily opened state relative to the support rod assembly 100, the rotation angle of each support leg assembly 300 relative to the support rod assembly 100 is greater than or equal to 0.3°, such as 0.3°, 0.4°, 0.5°, etc.

It should be understood that the initial position of the preliminary opening member 500 may refer to a specific position or a position range; the second position of the preliminary opening member 500 may refer to a specific position or a position range. For example, any position that allows the support leg assembly 300 to be in the preliminarily opened state may be the second position of the preliminary opening member 500.

Figure 6:
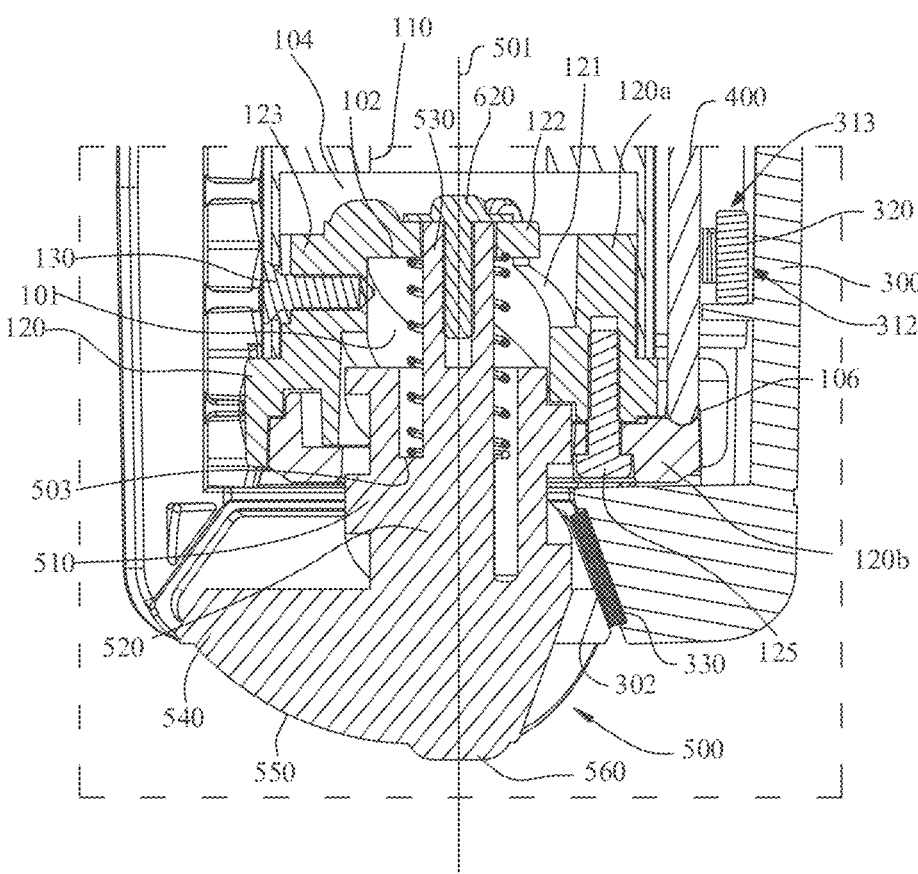
FIG. 6 is an enlarged view of the structure at position B shown in FIG. 5.
Figure 7:
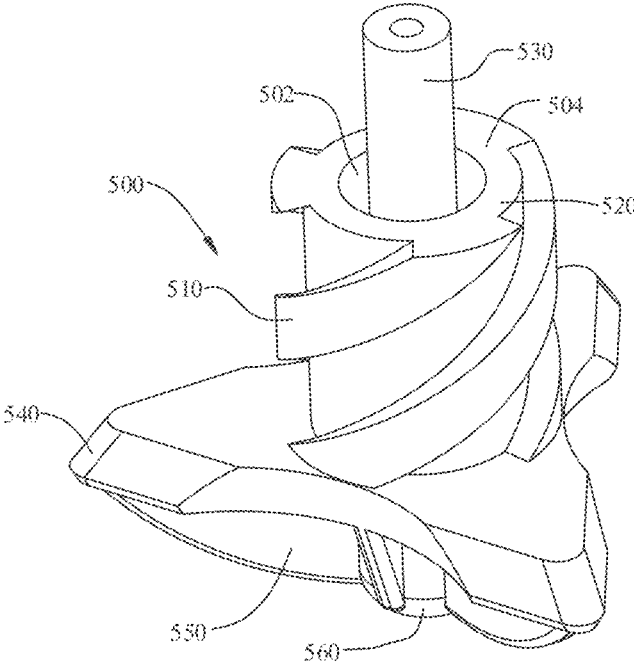
FIG. 7 is a structural schematic view of a preliminary opening member in the multi-legged stand shown in FIG. 2.
Figure 18:
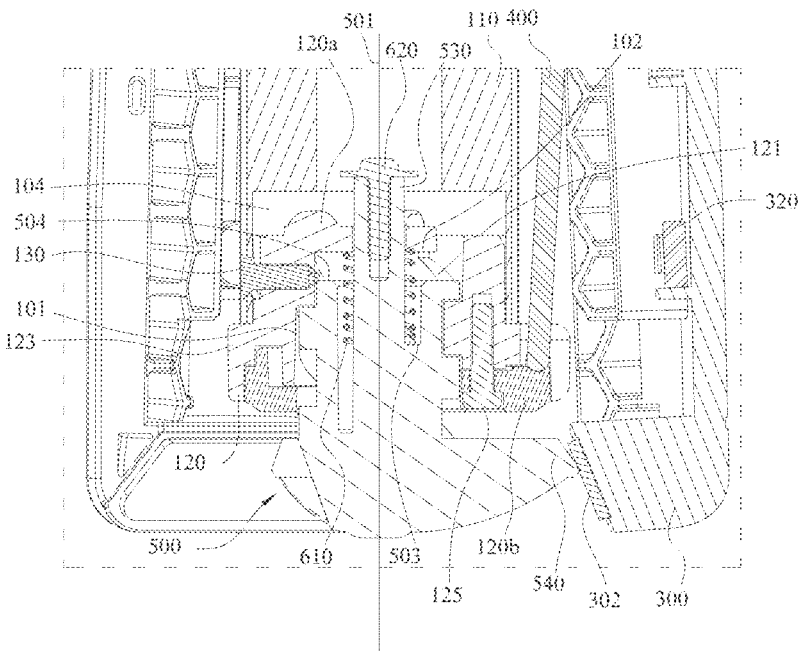
FIG. 18 is an enlarged view of the structure at position D in the multi-legged stand shown in FIG. 17.
Figure 19:
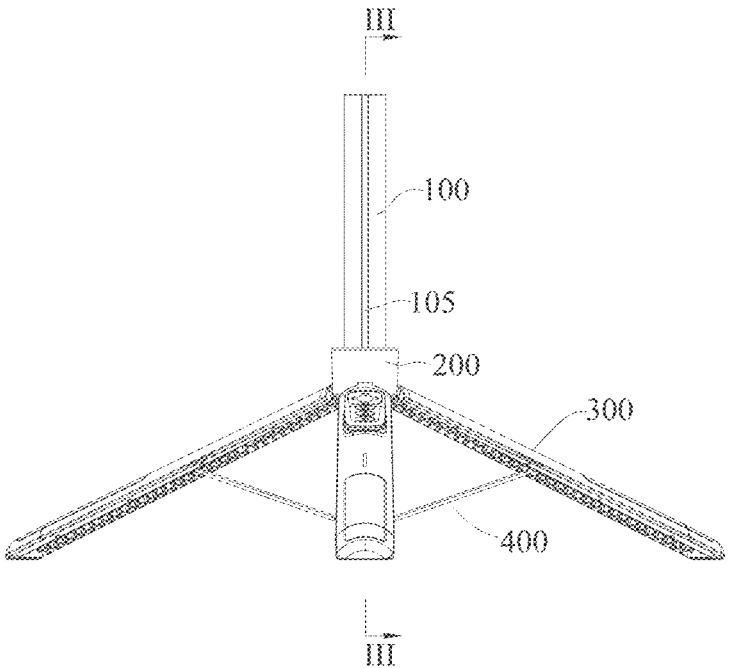
FIG. 19 is a structural schematic view of the multi-legged stand shown in FIG. 1 when the three support leg assemblies are splayed relative to the support rod assembly.
Figure 20:
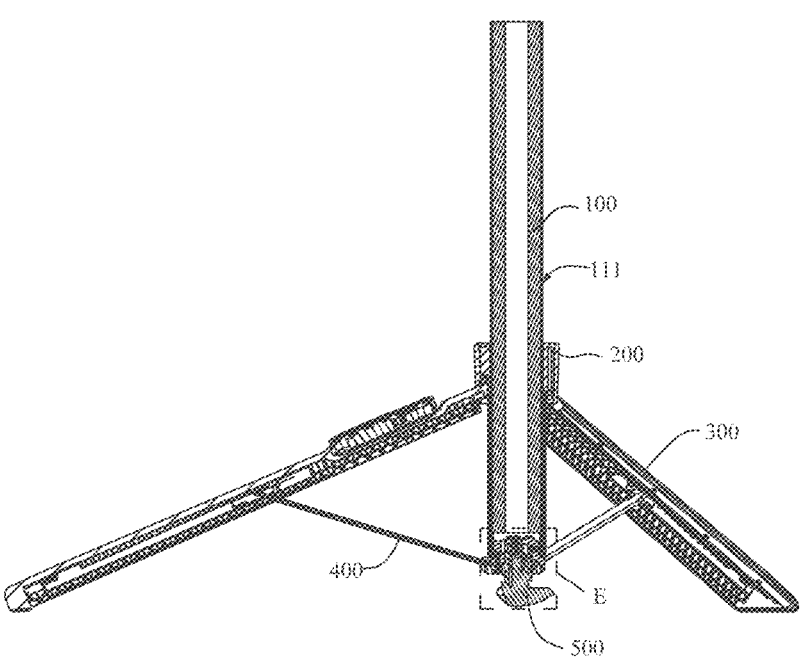
FIG. 20 is a cross-sectional view of the multi-legged stand shown in FIG. 19 along an III-III line.

In some embodiments, referring to FIGS. 6 and 18, during the rotation of the preliminary opening member 500 relative to the support rod assembly 100, the preliminary opening member 500 may further translate along the first direction relative to the support rod assembly 100. During the application of the first external action to the preliminary opening member 500, the preliminary opening member 500 translates along the first direction relative to the support rod assembly 100 and rotates relative to the support rod assembly 100. The first external action includes a force acting on the preliminary opening member 500 along the first direction, and/or, the first external action includes a rotational torque acting on the preliminary opening member 500 around its rotational axis 501. It can be understood that by applying the first external action to the preliminary opening member 500, the preliminary opening member 500 rotates relative to the support rod assembly 100, thereby causing the support leg assemblies 300 to be preliminarily opened relative to the support rod assembly 100. The method of applying the first external action may be varied, thereby facilitating the use of the multi-legged stand.

In some cases, the first external action includes a force acting along the first direction (the entire or part of the first external action is a force acting along the first direction; e.g., a component force of the first external action is a force acting along the first direction), which is a thrust directed toward the support rod assembly 100. The user can press the preliminary opening member 500 by hand or allow the preliminary opening member 500 to collide with the support surface to achieve pressing the preliminary opening member 500. This force may be a pulling force away from the support rod assembly 100, for example, the user pulls the preliminary opening member 500. It should be understood that the force must overcome the resistance (which includes the friction resistance between the preliminary opening member 500 and the support rod assembly 100) acting on the preliminary opening member 500, causing the preliminary opening member 500 to translate parallel to the support rod assembly 100 in the first direction and rotate relative to the support rod assembly 100.

In other cases, the first external action includes a rotational torque acting on the preliminary opening member 500 and around the rotational axis 501 (the entire or part of the first external action is a rotational torque around the rotational axis 501; e.g., a component torque of the first external action is a rotational torque around the rotational axis 501). By applying the rotational torque to the preliminary opening member 500 (e.g., by manually or with an external tool toggling the preliminary opening member 500), the preliminary opening member 500 is caused to rotate relative to the support rod assembly 100, thereby causing the support leg assemblies 300 to be preliminarily opened relative to the support rod assembly 100.

In some embodiments, the preliminary opening member 500 is connected to the support rod assembly 100 via a cam pair. During the movement of the preliminary opening member 500 relative to the support rod assembly 100, the preliminary opening member 500 both translates relative to the support rod assembly 100 and rotates relative to the support rod assembly 100. Specifically, the support rod assembly 100 has a connection protrusion, and the preliminary opening member 500 has a connection groove (or, the support rod assembly 100 has a connection groove, and the preliminary opening member 500 has a connection protrusion), the connection protrusion and the connection groove are in engagement, and the connection protrusion and the connection groove form the cam pair. The connection protrusion slides or rolls within the connection groove, causing the preliminary opening member 500 to both translate relative to the support rod assembly 100 and rotate relative to the support rod assembly 100. Specifically, the connection groove and the connection protrusion form a cylindrical cam mechanism, e.g., the connection groove extends along a spiral line. The first external action overcomes the resistance (which includes the friction resistance between the connecting protrusion and the connecting groove) acting on the preliminary opening member 500, enabling the connection protrusion to slide or roll along the connection groove.

For example, the first direction is along the length direction of the support rod assembly 100. The preliminary opening member 500 is arranged on the bottom end of the support rod assembly 100, and the first direction is from the bottom end of the support rod assembly 100 toward its top end.

Furthermore, during the process where the preliminary opening member 500 translates parallel to the support rod assembly 100 along the first direction and rotates relative to the support rod assembly 100, the translating of the preliminary opening member 500 relative to the support rod assembly 100 along the first direction assists in the preliminary opening of the support leg assemblies 300.

In some embodiments, referring to FIGS. 6 and 18, the preliminary opening member 500 is arranged with a first thread 510, and the support rod assembly 100 is arranged with a second thread 121. The first thread 510 and the second thread 121 are in meshing engagement, and the rotational axis 501 of the preliminary opening member 500 is coaxial with the central axis of the first thread 510. During the application of the first external action to the preliminary opening member 500, the preliminary opening member 500 rotates around the rotational axis and relative to the support rod assembly 100, and the preliminary opening member 500 translates along the first direction relative to the support rod assembly 100, with the first direction being parallel to the rotational axis. The first external action includes a force acting on the preliminary opening member 500 along the rotational axis 501, and/or, the first external action includes a rotational torque acting on the preliminary opening member 500 around the rotational axis 501. It can be understood that the first thread 510 and the second thread 121 may facilitate the manufacturing of the preliminary opening member 500 and the support rod assembly 100, and further facilitate the mounting of the preliminary opening member 500 onto the support rod assembly 100. The first direction is along the rotational axis 501.

It can be understood that the preliminary opening member 500 is spirally connected to the support rod assembly 100, and the preliminary opening member 500 is spirally connected to the support rod assembly 100 via a screw pair. During the spiral movement of the preliminary opening member 500 relative to the support rod assembly 100, the first external action overcomes the resistance (the friction resistance between the first thread 510 and the second thread 121) acting on the preliminary opening member 500. The preliminary opening member 500 both translates relative to the support rod assembly 100 and rotates relative to the support rod assembly 100.

For example, the first thread 510 and the second thread 121 are rectangular threads, or the first thread 510 and the second thread 121 are triangular threads, etc. The structure of the first thread 510 and the second thread 121 allows at least one kind of the first external action to drive the preliminary opening member 500, for example, the pitch angle of the first thread 510 is 30.6°. The first thread 510 is an external thread, and the second thread 121 is an internal thread; or, the first thread 510 is an internal thread, and the second thread 121 is an external thread.

For example, the center axis of the first thread 510 is parallel to the length direction of the support rod assembly 100, or the center axis of the first thread 510 is parallel to the center axis of the support rod assembly 100; more specifically, the center axis of the first thread 510 is coaxial with the center axis of the support rod assembly 100. In other examples, the center axis of the first thread 510 is not parallel to the length direction of the support rod assembly 100, or the center axis of the first thread 510 is not parallel to the center axis of the support rod assembly 100.

In some cases, the first external action includes a force acting along the rotational axis 501 (part or all of the first external action is a force acting along the rotational axis 501, e.g., a component force of the first external action is a force acting along the rotational axis 501), which is a thrust directed toward the support rod assembly 100. The user can manually press the preliminary opening member 500, or the preliminary opening member 500 can collide with the support surface to achieve pressing the preliminary opening member 500. The force may be a pulling force away from the support rod assembly 100, for example, the user can pull the preliminary opening member 500. In other cases, the first external action includes a rotational torque acting on the preliminary opening member 500 and around the rotational axis 501 (part or all of the first external action is a rotational torque around the rotational axis 501, such as a component torque of the first external action being a rotational torque around the rotational axis 501). By applying a rotational torque to the preliminary opening member 500 (e.g., the user can rotate the preliminary opening member 500 with his/her hand or an external tool), causing the preliminary opening member 500 to rotate relative to the support rod assembly 100, thereby preliminarily opening the support leg assembly 300 relative to the support rod assembly 100.

Figure 21:
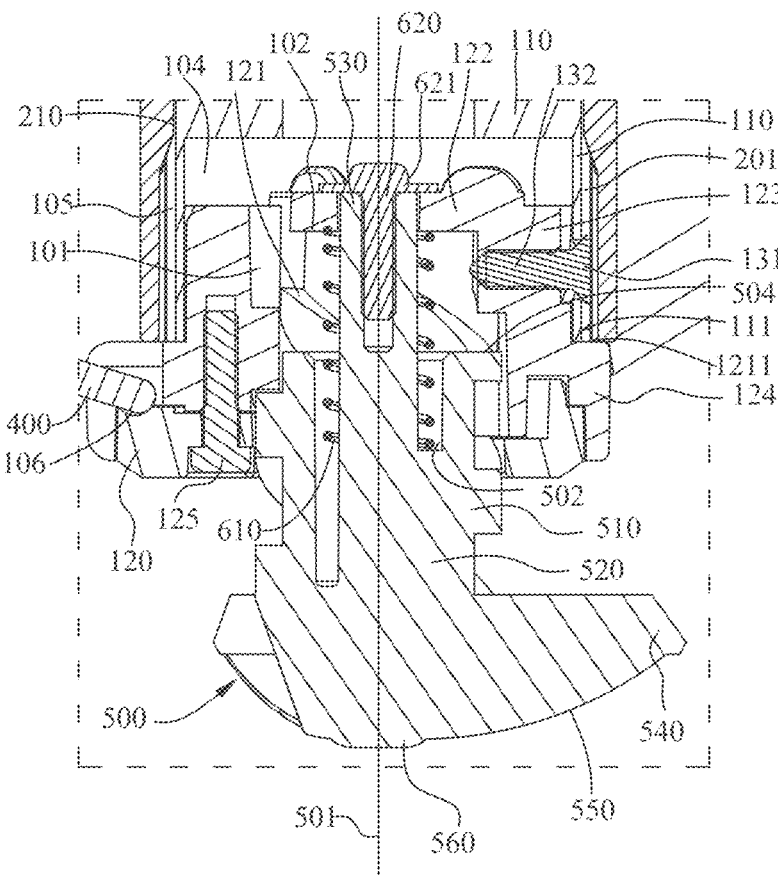
FIG. 21 is an enlarged view of the structure at position E in the multi-legged stand shown in FIG. 20.

In some embodiments, referring to FIGS. 6, 18, 21, etc., the multi-legged stand further includes a reset spring 610. The reset spring 610 acts on the preliminary opening member 500. When the at least three support leg assemblies 300 are in a splayed state relative to the support rod assembly 100, the reset spring 610 causes the preliminary opening member 500 to return from the second position to the initial position. The reset spring 610 causes the preliminary opening member 500 to return to the initial position, thereby preventing the preliminary opening member 500 from obstructing the folding of the support leg assembly 300 relative to the support rod assembly 100, specifically, preventing the actuating portion 540 of the preliminary opening member 500 from obstructing the folding of the support leg assembly relative to the support rod assembly 100.

It can be understood that during the movement of the preliminary opening member 500 relative to the support rod assembly 100 under the first external action, the resistance experienced by the preliminary opening member 500 further includes the elastic force exerted by the reset spring 610 on the preliminary opening member 500.

For example, when the at least three support leg assemblies 300 are in the preliminarily opened state relative to the support rod assembly 100, the reset spring 610 causes the preliminary opening member 500 to return from the second position to the initial position.

For example, the reset spring 610 may be a cylindrical spring, a tower spring, a torsion spring, etc. In some cases, the reset spring 610 is a cylindrical spring or a tower spring, and the action of the reset spring 610 on the preliminary opening member 500 is to apply a force along the rotational axis 501 of the preliminary opening member 500, which force is a tensile force or a compressive force exerted by the reset spring 610 on the preliminary opening member 500. In some cases, the reset spring 610 is a torsion spring, and the reset spring 610 acts on the preliminary opening member 500 by applying a rotational torque around the rotational axis 501.

In some embodiments, referring to FIGS. 6, 18, and 21, the preliminary opening member 500 includes a mounting column 520, and the first thread 510 is disposed on the mounting column 520. The support rod assembly 100 defines a mounting cavity 101, and the mounting column 520 is arranged in the mounting cavity 101. The second thread 121 is disposed on a cavity wall of the mounting cavity 101, and the mounting column 520 defines an accommodation cavity 502. The accommodation cavity 502 is in communication with an end of the mounting column 520, and the at least three actuating portions 540 are connected to the mounting column 520. The mounting column 520 has a first abutment wall 503, which is disposed within the accommodation cavity 502, and the support rod assembly 100 has a second abutment wall 102, which is disposed within the mounting cavity 101. The reset spring 610 is a cylindrical spring or a tower spring, with a first end of the reset spring 610 received within the accommodation cavity 502, the first end abutting against the first abutment wall 503, and a second end of the reset spring 610 abutting against the second abutment wall 102. During the process of the preliminary opening member 500 rotating from the initial position to the second position, the mounting column 520 moves toward the second abutment wall 102, causing the reset spring 610 to be compressed. It can be understood that the mounting column 520 is arranged in the mounting cavity 101, and the first end of the reset spring 610 is received in the accommodation cavity 502, such that the reset spring 610 is at least partially received in the accommodation cavity 502, thereby ensuring that the multi-legged stand has a compact overall configuration.

For example, the cylindrical spring may be a circular cylindrical spring, a square cylindrical spring, a polygonal cylindrical spring, etc., and the tower spring may be a conical spring, a frustoconical spring, a polygonal tower spring, etc. The force exerted by the reset spring 610 on the preliminary opening member 500 is a force acting on the preliminary opening member 500 along the rotational axis 501, and this force is a thrust exerted by the reset spring 610 on the preliminary opening member 500. It should be understood that the first external action includes a thrust acting on the preliminary opening member 500 along the rotational axis 501, and/or the first external action includes a rotational torque acting on the preliminary opening member 500 around the rotational axis 501.

It should be understood that the first end of the reset spring is received in the accommodation cavity, thereby restricting the reset spring to remain within the preliminary opening member, ensuring that the reset spring does not bend or disengage from its operational position during extension or retraction.

It should be understood that the reset spring is a cylindrical spring or a tower spring, enabling the reset spring to be easily compressed and preventing it from obstructing the movement of the preliminary opening member.

It should be understood that the first thread 510 is an external thread, and the second thread 121 is an internal thread.

Obviously, during the rotation of the preliminary opening member 500 from the initial position to the second position, the preliminary opening member 500 moves parallel to the rotational axis 501 and rotates around the rotational axis 501.

In some embodiments, the mounting column 520 has a first end surface 504, and the accommodation cavity 502 is connected to the first end surface 504. When the preliminary opening member 500 is in the second position, the first end surface 504 abuts against the second abutment wall 102, and the reset spring 610 is received within the accommodation cavity 502. The first end surface 504 abuts against the second abutment wall 102, enabling the preliminary opening member 500 to rotate conveniently to the second position, thereby placing the support leg assembly 300 in the preliminarily opened state. In the cases, the first end surface 504 abutting against the second abutment wall 102 also restricts the preliminary opening member 500 to be arranged within the support rod assembly 100, preventing the preliminary opening member 500 from moving beyond its second position relative to the support rod assembly 100.

In other embodiments, the mounting column 520 has a first end surface 504, and the accommodation cavity 502 is connected to the first end surface 504. When the preliminary opening member 500 is in the second position, the first end surface 504 is spaced apart from the second abutment wall 102, and the reset spring 610 is mostly received within the accommodation cavity 502.

In some embodiments, referring to FIGS. 6, 18, 21, etc., the preliminary opening member 500 further includes a connecting column 530, which is connected to the mounting column 520. An end of the connecting column 530 is received in the accommodation cavity 502, and the reset spring 610 is sleeved on the connecting column 530; the support rod assembly 100 includes a retaining portion 122, which defines a through hole 103, and the connecting column 530 passes through the through hole 103. The retaining portion 122 is arranged with the second abutment wall 102, which is configured to retain the connecting column 530 when the preliminary opening member is in its initial position. The multi-legged stand further includes a first fastener 620, which is securely connected to the connecting column 530. A first head portion 621 of the first fastener 620 and the mounting column of the preliminary opening member 500 are disposed on opposite sides of the retaining portion 122. During the process of the preliminary opening member 500 returning from the second position to the initial position, the reset spring 610 acts on the preliminary opening member 500, causing the first head portion 621 of the first fastener 620 to move toward the retaining portion 122; when the preliminary opening member 500 is in the initial position, the first head portion 621 of the first fastener 620 abuts against the retaining portion 122 to retain the connecting column. It can be understood that the retaining portion retaining the connecting column is specifically implemented by that the first head portion 621 of the first fastener 620 abuts against the retaining portion 122, thereby allowing the preliminary opening member 500 to be arranged in a restricted manner on the support rod assembly 100, preventing the preliminary opening member 500 from separating from the support rod assembly 100 under the action of the reset spring 610. The reset spring 610 is sleeved on the connecting column 530 to prevent the reset spring 610 from exiting the accommodation cavity 502, thereby ensuring that the reset spring does not bend or disengage from its operational position during extension or retraction, and further making the multi-legged stand compact.

Specifically, the first fastener 620 may be a threaded member or a riveted member (e.g., a screw, a rivet, etc.), and the first fastener 620 also facilitates the mounting of the preliminary opening member 500.

In some embodiments, when the preliminary opening member 500 is in the initial position, the connecting column 530 directly or indirectly abuts against the retaining portion 122.

It can be understood that an end of the connecting column 530 is received in the accommodation cavity 502, the first abutment wall 503 is disposed in the accommodation cavity, and the first end of the reset spring 610 is received in the accommodation cavity 502, thereby making the multi-legged stand compact.

In some embodiments, referring to FIGS. 6, 18, 21, etc., or referring to FIGS. 33, 36, 37, 42, 50, etc., the support rod assembly 100 includes a support rod body 110 and a mounting member 120, where the mounting member 120 is arranged on the support rod body 110, and each connecting rod 400 is rotatably connected to the mounting member 120. The mounting cavity 101 is defined on the mounting member 120, the second thread 121 is arranged on the mounting member 120, and the mounting member 120 has the second abutment wall 102. It can be understood that the support rod assembly 100 includes the support rod body 110 and the mounting member 120, thereby facilitating the assembly of the support rod assembly 100. The mounting member 120 is configured for both the rotatable connection of the connecting rods 400 and the mounting of the preliminary opening member 500, thereby making the structure of the multi-legged stand compact.

For example, a fixed connection between the mounting member 120 and the support rod body 110 may be achieved through methods such as screws, interference fit, or rivets. By providing the mounting member 120 for connecting the preliminary opening member 500 and the connecting rod, the bottom connection structure of the support rod assembly 100 can be formed independently, thereby reducing manufacturing costs and facilitating the assembly of the preliminary opening member 500 with the support rod assembly 100. Additionally, since the support rod body 110 primarily serves a supporting and guiding function, and the mounting member 120 primarily serves a connecting function, the support rod body 110 and the mounting member 120 may be made from different materials. For example, the support rod body 110 may be made from a metal material to enhance its structural strength and reduce sliding friction with the sliding sleeve assembly 200, while the mounting member 120 may be made of a plastic material to reduce the manufacturing cost of the mounting member 120.

In some embodiments, referring to FIGS. 6, 18, 21, etc., the preliminary opening member 500 further includes a connecting column 530, which is connected to the mounting column 520. An end of the connecting column 530 is received in the accommodation cavity 502, and the reset spring 610 is sleeved on the connecting column 530; the mounting member 120 includes a retaining portion 122, which defines a through hole 103, and the connecting column 530 passes through the through hole 103. The retaining portion 122 is arranged with the second abutment wall 102. The multi-legged stand further includes a first fastener 620, which is securely connected to the connecting column 530. A first head portion 621 of the first fastener 620 and the mounting column of the preliminary opening member 500 are disposed on opposite sides of the retaining portion 122. During the process of the preliminary opening member 500 returning from the second position to the initial position, the reset spring 610 acts on the preliminary opening member 500, causing the first head portion 621 of the first fastener 620 to move toward the retaining portion 122; when the preliminary opening member 500 is in the initial position, the first head portion 621 of the first fastener 620 abuts against the retaining portion 122. The first head portion 621 of the first fastener 620 abuts against the retaining portion 122, preventing the preliminary opening member 500 from separating from the support rod assembly 100. Further, the first head portion 621 of the first fastener 620 abuts against the retaining portion 122, and the reset spring 610 precisely causes the preliminary opening member 500 to return to its initial position, preventing the preliminary opening member 500 from interfering with the support leg assembly 300 folding relative to the support rod assembly 100.

In some embodiments, referring to FIGS. 6, 18, 21, etc., or referring to FIGS. 33, 36, 37, 42, 50, etc., the mounting member 120 is arranged on a bottom end of the support rod body 110. When the at least three support leg assemblies 300 are splayed to their maximum splayed state relative to the support rod assembly 300, the sliding sleeve assembly 200 abuts against the mounting member 120. The mounting member 120 includes a mounting portion 123 and a mounting protrusion 124 connected to the mounting portion 123. Each connecting rod 400 is rotatably connected to the mounting protrusion 124 of the mounting member 120, and the mounting cavity 101 is in communication with the mounting portion 123. The support rod body 110 defines the mounting hole 104 communicating with its bottom end, the mounting portion 123 is inserted into the mounting hole 104, and the support rod assembly 100 further includes a second fastener 130, which passes through the support rod body 110 and is securely connected to the mounting portion 123. The sliding sleeve assembly 200 has a sliding cavity 201 that is slidably matched with the support rod assembly 100, and an inner wall of the sliding cavity 201 is arranged with a slidable bar 210, which extends along the sliding direction of the sliding cavity 201. An outer wall of the support rod body 110 is recessed to define a sliding groove 105, which is adapted to the slidable bar 210. During the sliding of the sliding sleeve assembly 200 along the length direction of the support rod assembly 100, the slidable bar 210 slides within the sliding groove 105. The second fastener 130 includes a second head portion 131 and a second rod portion 132 connected to the second head portion 131. The second head portion 131 is received within the sliding groove 105, and the second rod portion 132 passes through the support rod body 110 and is securely connected to the mounting portion 123. When the sliding sleeve assembly 200 abuts against the support rod assembly 100, the second head portion 131 is received within the sliding cavity 201, and the second head portion 131 is disposed between the bottom end of the slidable bar 210 and the bottom end of the sliding sleeve assembly 200. It can be understood that the sliding sleeve assembly 200 abuts against the mounting member 120, preventing the multi-legged stand from splaying too widely, thereby avoiding deformation of the support leg assembly 300 and the connecting rod 400, and preventing damage to the multi-legged stand during use.

It can be understood that the second fastener 130 securely connects the mounting portion 123 to the support rod body 110, preventing the mounting portion 123 from detaching from the support rod body 110. The second fastener 130 may be a threaded fastener, a riveted fastener, etc.

As can be understood, the cooperation between the slidable bar 210 and the sliding groove 105 enables the sliding sleeve assembly 200 to slide more stably relative to the support rod assembly 100. By placing the second head portion 131 within the sliding groove 105, the possibility of the second head portion 131 scratching the user is reduced. Additionally, the sliding groove 105 serves both to cooperate with the slidable bar 210 and to accommodate the second head portion 131, thereby making the structure of the support rod assembly 100 compact. When the sliding sleeve assembly 200 abuts against the support rod assembly 100, the second head portion 131 is disposed between the bottom end of the slidable bar 210 and the bottom end of the sliding sleeve assembly 200, preventing the second head portion 131 from obstructing the sliding of the sliding sleeve assembly 200; further, the second head portion 131 is received within the sliding cavity 201, further preventing the second head portion 131 from scratching the user's hands. For example, there are two slidable bars 210 provided, which are disposed on opposite sides of the sliding cavity 201; there are two sliding grooves 105 provided, which are disposed on opposite sides of the support rod body 110; there are two second fasteners provided, and the second head portions 131 of the two second fasteners 130 are respectively received within the two sliding grooves 105. It can be understood that the slidable bars 210 and the sliding grooves 105 both extend along the sliding direction of the sliding sleeve assembly 200.

For example, when the sliding sleeve assembly 200 abuts against the mounting member 120, the sliding sleeve assembly 200 abuts against the mounting protrusion 124.

For example, as shown in FIG. 21, the mounting member 120 includes an abutment surface 1211 protruding from the first outer peripheral wall 111 of the support rod body 110, and the abutment surface 1211 is disposed on the mounting protrusion 124. When the at least three support leg assemblies 300 are splayed to their maximum splayed state relative to the support rod assembly 100, the sliding sleeve assembly 200 abuts against the abutment surface 1211. The abutment surface 1211 may be planar, curved, etc.

Figure 22:
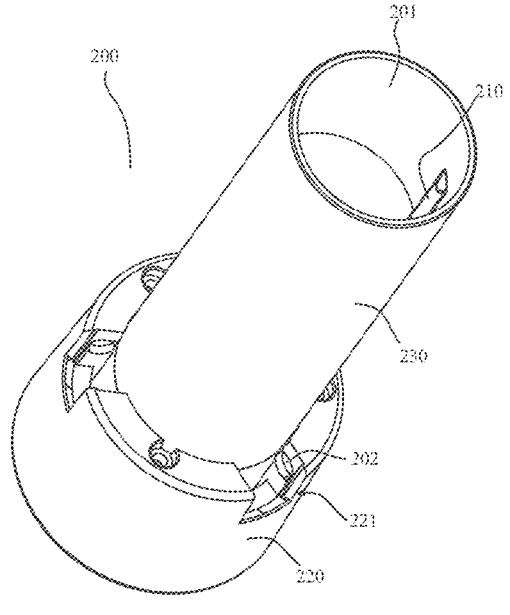
FIG. 22 is a structural schematic view of a sliding sleeve assembly in the multi-legged stand shown in FIG. 19.
Figure 23:
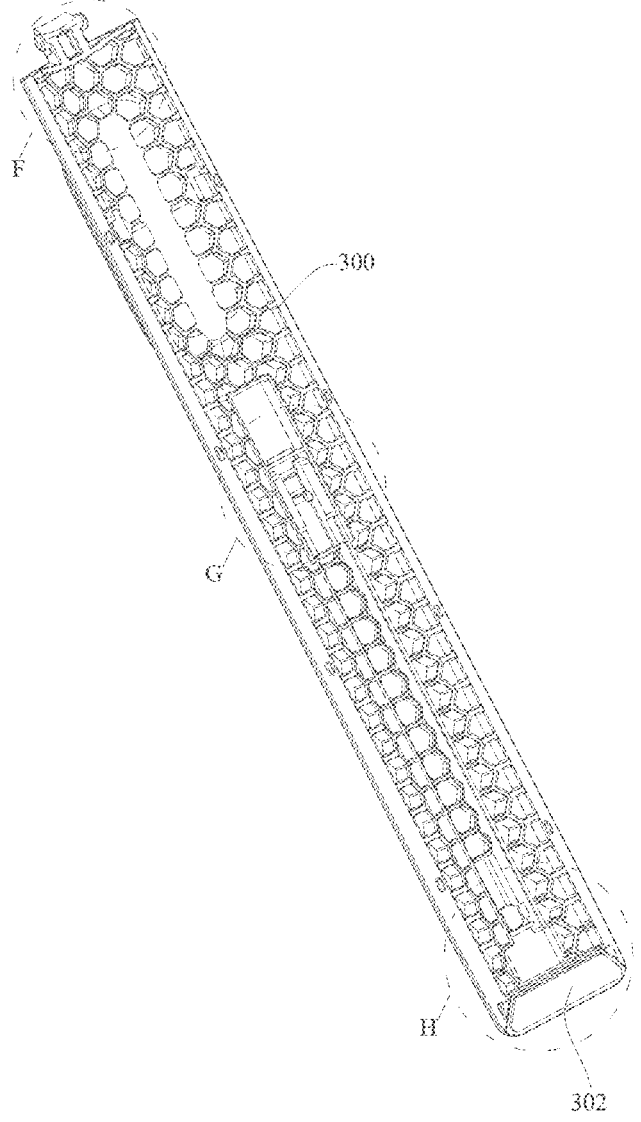
FIG. 23 is a structural schematic view of the support leg assembly in the multi-legged stand shown in FIG. 19.
Figure 24:
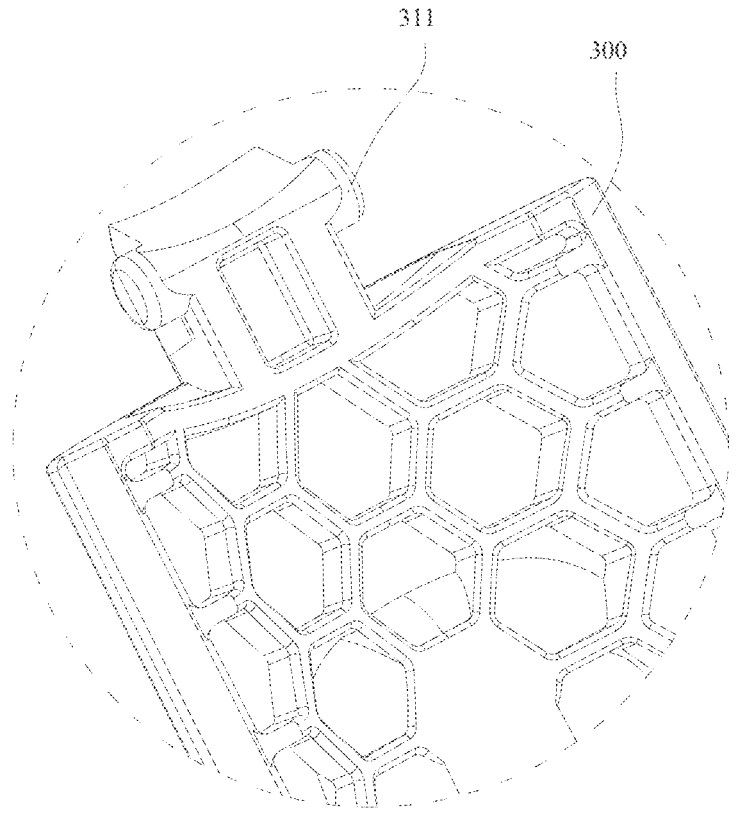
FIG. 24 is an enlarged view of the structure at position F in the support leg assembly shown in FIG. 23.
Figure 25:
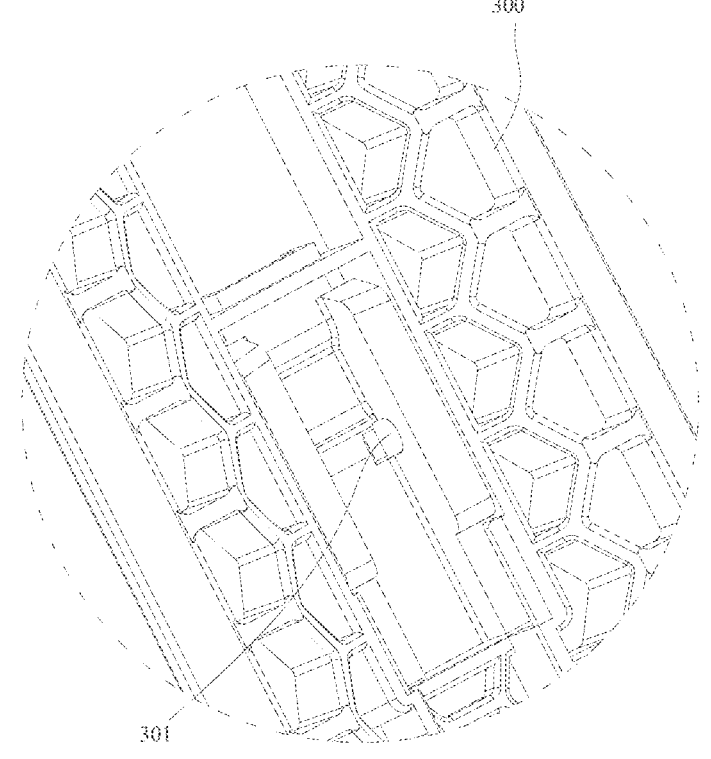
FIG. 25 is an enlarged view of the structure at position G in the support leg assembly shown in FIG. 23.

For example, referring to FIG. 22, the sliding sleeve assembly 200 further includes a main cylinder 220 and a positioning cylinder 230 connected to the main cylinder 220. The main cylinder 220 and the positioning cylinder 230 are both slidably sleeved on the periphery of the support rod body 110. The support leg assemblies 300 are rotatably connected to the main cylinder 220. The positioning cylinder 230 extends from a bottom end of the main cylinder 220. When the at least three support leg assemblies 300 are folded relative to the support rod body 110, the positioning cylinder 230 is disposed between the support leg assemblies 300 and the support rod body 110. When the at least three support leg assemblies 300 are splayed to their maximum splayed state relative to the support rod body 110, the positioning cylinder 230 abuts against the mounting member 120, and the at least three support leg assemblies 300 can stand on the support surface, with the support rod assembly 100 and the preliminary opening assembly 500 both located above the support surface. Specifically, the positioning cylinder 230 may abut against the abutment surface 1211. Specifically, the cross-sectional area of the positioning cylinder 230 is less than the cross-sectional area of the main cylinder 220 to facilitate the folding of the at least three support leg assemblies 300 relative to the support rod body 110; the positioning cylinder 230 is slidably sleeved on the periphery of the support rod body 110. The main cylinder 220 is provided for the user to grip, enabling the sliding sleeve assembly 200 to slide relative to the support rod assembly 100.

It can be understood that the cross-sectional area of the positioning cylinder 230 is less than that of the main cylinder 220, and a spacing exists between the outer peripheral wall of the main cylinder 220 and the outer peripheral wall of the positioning cylinder 230, enabling the main cylinder 220 to have a certain thickness, facilitating the rotational connection of the top end of the support leg assembly 300 to the lower end of the main cylinder 220, thereby providing sufficient rotational space for a second rotational portion of the support leg assembly 300.

It can be understood that the length of the main cylinder 220 may be designed according to actual requirements. To facilitate users' grip on the multi-legged stand, in some embodiments, the length of the main cylinder 220 is greater than or equal to 1 cm. For example, the length of the main cylinder 220 may be in a range from 2 cm to 6 cm, which ensures that the main cylinder 220 is sufficiently long to facilitate user grip, such as when the user grips the main cylinder 220 to lift the multi-legged stand, or when the user grips the main cylinder 220 to allow the sliding sleeve assembly to slide relative to the support rod assembly.

For example, as shown in FIG. 22, the sliding sleeve assembly 200 includes at least three first rotatable portions 202, and each support leg assembly 300 includes a second rotatable portion 311. The first rotatable portion 202 may be a hole, and the second rotatable portion 311 may be a shaft. The first rotatable portion 202 is arranged on the main cylinder 220, which defines an avoidance notch 221 to prevent interference between the main cylinder 220 and the support leg assembly. The top end of the support leg assembly is rotatably connected to the lower end of the main cylinder 220.

For example, referring to FIGS. 1-27 or FIGS. 29-55, the sliding sleeve assembly 200 includes at least three first rotatable portions 202, each support leg assembly 300 includes a second rotatable portion 311, and the second rotatable portions 311 of the at least three support leg assemblies 300 are rotatably connected to the corresponding at least three first rotatable portions 202. The first rotatable portion 202 is a shaft, and the second rotatable portion 311 is a hole; or the first rotatable portion 202 is a hole, and the second rotatable portion 311 is a shaft. For example, the support rod assembly 100 includes a third rotatable portion 106, and the connecting rod 400 includes a fourth rotatable portion 410. The third rotatable portion 106 is rotatably coupled with the fourth rotatable portion 410. The third rotatable portion 106 is a hole, and the fourth rotatable portion 410 is a shaft, or the third rotatable portion 106 is a shaft, and the fourth rotatable portion 410 is a hole. For example, each support leg assembly 300 includes a fifth rotatable portion 301, and the connecting rod 400 includes a sixth rotatable portion 420. The fifth rotatable portion 301 and the sixth rotatable portion 420 are rotatably coupled, with the fifth rotatable portion 301 being a hole and the sixth rotatable portion 420 being a shaft, or alternatively, the fifth rotatable portion 301 being a shaft and the sixth rotatable portion 420 being a hole.

For example, referring to FIGS. 1-27 or FIGS. 29-55, the mounting member 120 includes a first mounting sub-member 120a and a second mounting sub-member 120b, with the second mounting sub-member 120b arranged on the first mounting sub-member 120a. The second thread 121 is disposed on the first mounting sub-member 120a. The first mounting sub-member 120a includes the mounting portion 123. The first mounting sub-member 120a further includes a portion of the mounting protrusion 124. The second mounting sub-member 120b includes a portion of the mounting protrusion 124. The second mounting sub-member 120b is arranged on the first mounting sub-member 120a to form the mounting protrusion 124. When the sliding sleeve assembly 200 abuts against the mounting member 120, the sliding sleeve assembly 200 abuts against the first mounting sub-member 120a. Specifically, the first mounting sub-member 120a is arranged on the second mounting sub-member 120b via the third fastener 125, which may be a threaded element, a riveted element, etc. The third rotatable portion 106 is a hole, and the first mounting sub-member 120a and the second mounting sub-member 120b are combined to form the third rotatable portion 106. The advantage of this configuration is that it facilitates the rotational mounting of the connecting rod 400 on the support rod assembly 100. For example, one mounting method for the connecting rod 400 is to place the connecting rod 400 between the first mounting sub-member 120a and the second mounting sub-member 120b, and then mount the second mounting sub-member 120b onto the first mounting sub-member 120a using the third fastener 125.

Specifically, the second thread 121 is disposed on the mounting portion 123, the mounting cavity 101 is in communication with the mounting portion 123, and the retaining portion 122 is disposed on the mounting portion 123. The second fastener 130 passes through the support rod body 110 and is securely connected to the first mounting sub-member 120a.

For example, the mounting member 120 is at least partially embedded within the support rod body 110, and the preliminary opening member 500 is at least partially embedded within the support rod body 110, thereby making the overall structure of the multi-legged stand more compact. For example, the mounting portion 123 of the mounting member 120 is embedded within the support rod body 110.

Figure 4:
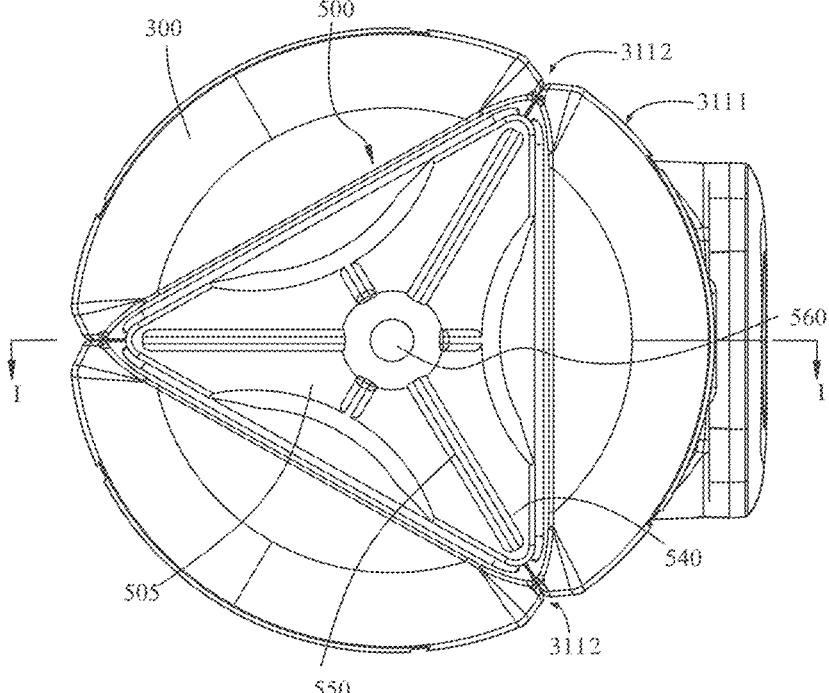
FIG. 4 is a front view of the multi-legged stand shown in FIG. 1 in a certain direction.
Figure 5:
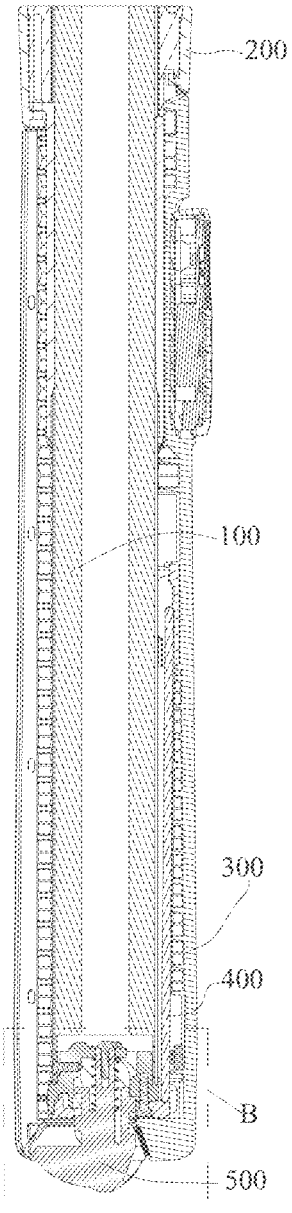
FIG. 5 is a cross-sectional view of the multi-legged stand shown in FIG. 4 along an I-I line.

In some embodiments, referring to FIGS. 4, 6, 18, etc., or referring to FIGS. 33, 36, 37, 42, 50, etc., when the support leg assembly 300 is folded relative to the support rod assembly 100, the support leg assembly 300 is subjected to a folding force that keeps it folded relative to the support rod assembly 100. During the process where the at least three support leg assemblies 300 are switched from being folded relative to the support rod assembly 100 to being preliminarily opened relative to the support rod assembly 100, the folding force weakens or becomes zero. It can be understood that the folding force acting on the support leg assembly 300 weakens or becomes zero, enabling the support leg assembly 300 to easily open and assume a splayed state relative to the support rod assembly 100.

Referring to FIG. 6, or FIGS. 33, 36, 37, 42, 50, etc., when the support leg assemblies 300 are folded relative to the support rod assembly 100, the support leg assemblies 300 are magnetically attracted to the connecting rods 400. During the process where the at least three support leg assemblies 300 are switched from being folded relative to the support rod assembly 100 to being preliminarily opened relative to the support rod assembly 100, the attractive force of the connecting rods 400 on the support leg assemblies 300 weakens or becomes zero. It can be understood that the attraction of the connecting rod 400 to the support leg assembly 300 weakens, enabling the support leg assembly 300 to easily open, facilitating the support leg assembly 300 to assume a splayed state relative to the support rod assembly 100.

For example, referring to FIGS. 1-27 or FIGS. 29-55, the support leg assembly 300 includes a support leg body 310 and a magnetic attraction member 320, and the magnetic attraction member 320 is detachably arranged on the support leg body 310. When the support leg assembly 300 is folded relative to the support rod assembly 100, the magnetic attraction member 320 magnetically attracts the connecting rod 400. Furthermore, the magnetic attraction between the magnetic attraction member 320 and the connecting rod 400 keeps the support leg assembly 300 in the folded state relative to the support rod assembly 100. The magnetic attraction member 320 facilitates the folding of the support leg assembly 300 relative to the support rod assembly 100, thereby enabling convenient storage of the multi-legged stand. For example, the magnetic attraction member 320 is made of a permanent magnetic material, such as aluminum-nickel-cobalt permanent magnetic alloy, iron-chromium-cobalt permanent magnetic alloy, permanent magnetic ferrite, rare earth permanent magnetic material, and composite permanent magnetic material. For example, the connecting rod 400 is at least partially made of soft magnetic material, such as cast iron, silicon steel, carbon steel, alloy steel, or soft magnetic ferrite. The connecting rod 400 includes a soft magnetic body and a coating, with the soft magnetic body made of soft magnetic material and the coating adhering to the soft magnetic body.

In other examples, the connecting rod 400 is at least partially made of a permanent magnet material, and the support leg assembly 300 is at least partially made of a soft magnetic material to achieve magnetic attraction between the support leg assembly 300 and the corresponding connecting rod 400. In other examples, the connecting rod 400 is at least partially made of a permanent magnet material, and the support leg assembly 300 is at least partially made of a permanent magnet material.

It can be understood that since the connecting rod 400 is closer to the support leg assembly 300 than the support rod assembly 100, by magnetically connecting the support leg assembly 300 to the connecting rod 400, the magnetic attraction surfaces of the two are closer together compared to the magnetic attraction between the support leg assembly 300 and the support rod assembly 100, thereby improving the magnetic attraction effect of the at least three support leg assemblies 300 and effectively preventing them from accidentally spreading apart.

Figure 26:
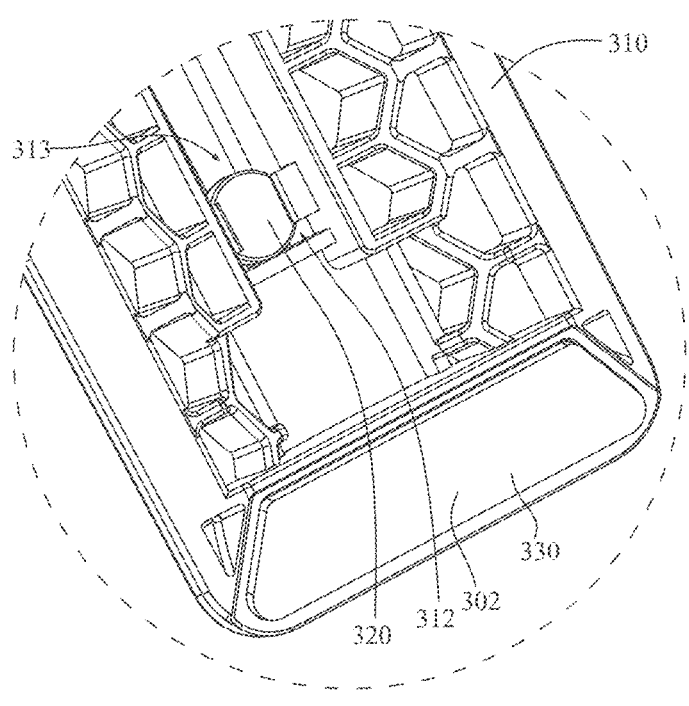
FIG. 26 is an enlarged view of the structure at position H in the support leg assembly shown in FIG. 23.
Figure 27:
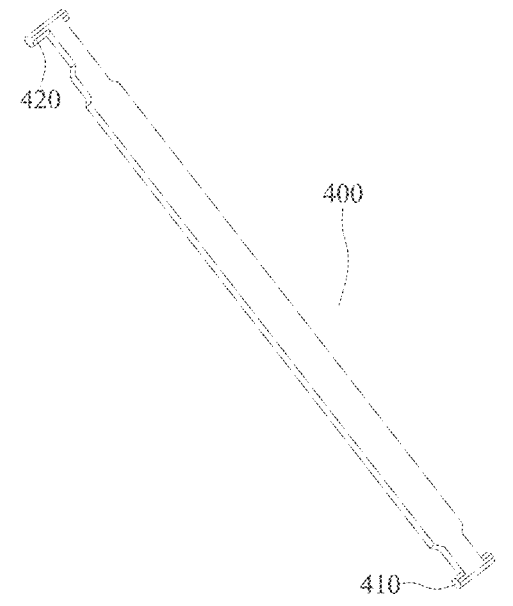
FIG. 27 is a structural schematic view of a connecting rod in the multi-legged stand shown in FIG. 19.

In some implementations, referring to FIGS. 6 and 26, a clamping slot 312 is defined on the support leg body 310, and the magnetic attraction member 320 is engaged in the clamping slot 312. Engaging the magnetic attraction member 320 in the clamping slot 312 facilitates the mounting of the magnetic attraction member 320.

In some implementations, referring to FIGS. 6 and 26, the clamping slot 312 is located on an inner side of the support leg body 310. The support leg body 310 defines a first mounting opening 313 communicating with the clamping slot 312, and the magnetic attraction member 320 can be inserted into the clamping slot 312 through the first mounting opening 313. When the multi-legged stand stands on a support surface, the self-weight of the magnetic attraction member 320 causes the magnetic attraction member 320 to have a relative movement trend away from the first mounting opening 313. The advantage of this configuration is that during the actual use of the multi-legged stand, the magnetic attraction member 320 is prevented from disengaging from the clamping slot 312 of the support leg body 310.

For example, when the multi-legged stand stands on the support surface, the first mounting opening 313 is disposed above the clamping slot 312.

For example, the magnetic attraction member 320 is fixedly connected to the support leg body 310, and the magnetic attraction member 320 is fixedly connected to the inner side of the support leg body 310. For example, the magnetic attraction member 320 may be fixedly connected to the inner side of the support leg body 310 by embedding, adhesive bonding, etc. The magnetic attraction member 320 is correspondingly arranged with the connecting rod 400, maximizing the magnetic attraction force between them and thereby enhancing the magnetic attraction effect.

In some embodiments, referring to FIGS. 1-27 or FIGS. 29-55, the multi-legged stand is configured to support electronic devices or photography accessories. When the at least three support leg assemblies 300 are folded relative to the support rod assembly 100, the at least three support leg assemblies 300 can be held by hand. It can be understood that the at least three support leg assemblies 300 that can be handheld may facilitate the user's handheld use of the multi-legged stand. For example, the user can hold the at least three support leg assemblies 300 for selfies. For example, when the at least three support leg assemblies 300 are folded relative to the support rod assembly 100, the at least three support leg assemblies 300 form a columnar shape.

Figure 30:
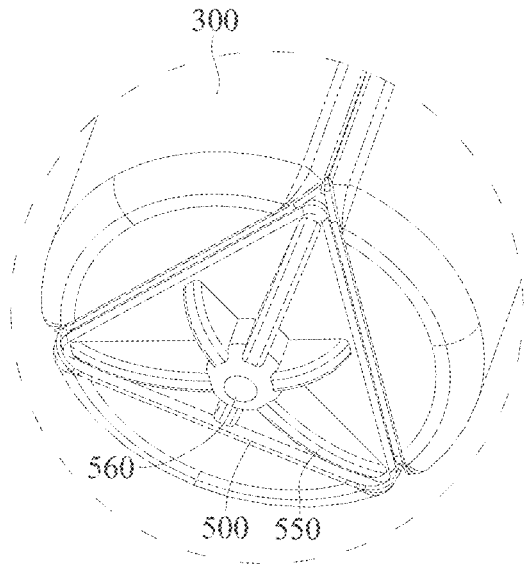
FIG. 30 is an enlarged view of the structure at position A in the multi-legged stand shown in FIG. 29.
Figure 31:
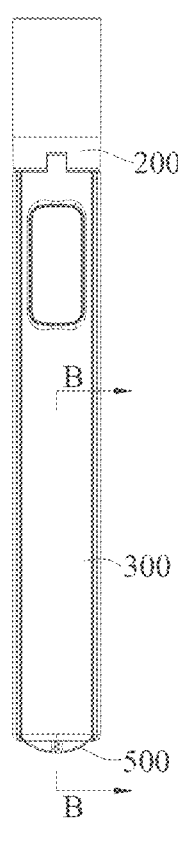
FIG. 31 is a front view of the multi-legged stand shown in FIG. 29 in a certain direction.
Figure 32:
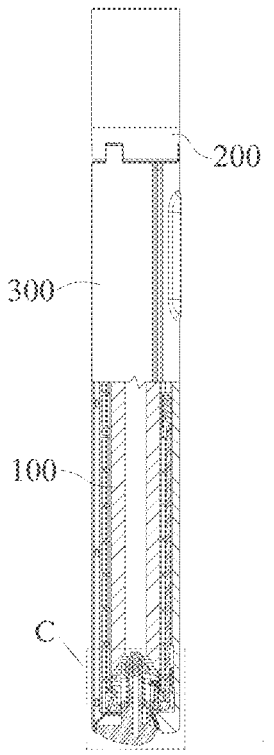
FIG. 32 is a partial cross-sectional view of the multi-legged stand shown in FIG. 31 along a B-B line.

In some embodiments, referring to FIG. 4 or 30, when the at least three support leg assemblies 300 are in a folded state relative to the support rod assembly 100, each actuating portion 540 is disposed between adjacent support leg assemblies 300. It can be understood that each actuating portion 540 is disposed between two adjacent support leg assemblies 300, such that the multi-legged stand has a compact structure and occupies a small volume when in the folded state. Specifically, the support leg assembly 300 has a contact surface 302. During the process of the preliminary opening member 500 rotating from the initial position to the second position, the actuating portion 540 actuates the corresponding contact surface 302 of the support leg assembly 300. The contact surfaces 302 of adjacent support leg assemblies 300 are arranged in a crossed pattern. When the at least three support leg assemblies 300 are in a folded state relative to the support rod assembly 100, each actuating portion 540 is disposed within a space between the contact surfaces 302 of adjacent support leg assemblies 300.

For example, the at least three actuating portions are centrally symmetrical around the rotational axis of the preliminary opening member, and the at least three contact surfaces 302 are centrally symmetrical around the rotational axis of the preliminary opening member.

In other embodiments, referring to FIGS. 4 to 6 and FIGS. 14 to 18, when the at least three support leg assemblies 300 are folded relative to the support rod assembly 100, the at least three support leg assemblies 300 surround the outer periphery of the support rod assembly 100, and each actuating portion 540 is disposed between corresponding adjacent two support leg assemblies 300. The inner wall surface of each support leg assembly 300 has a contact surface 302, which is configured such that the preliminary opening member 500 contacts the corresponding actuating portion 540 during rotation from the initial position to the second position.

In the embodiments, the contact surface 302 may be a flat surface or a convex arc surface. It should be understood that, when the at least three support leg assemblies 300 are in the folded state relative to the support rod assembly 100, the vertical distance between the rotational axis 501 and the contact surface 302 is less than the distance between the rotational axis 501 and the junction of the adjacent two support leg assemblies 300. More specifically, the multi-legged stand further includes an anti-slip pad 330, which is disposed on the bottom end of the support leg assembly 300, with the contact surface 302 disposed on the anti-slip pad 330. By forming the contact surface 302 on the anti-slip pad 330, the actuating portion 540 does not come into hard contact with the contact surface 302, thereby preventing wear on the actuating portion 540.

In the folded state, the at least three support leg assemblies 300 surround the outer periphery of the support rod assembly 100, making it more convenient for users to hold the multi-legged stand. For example, the users can hold the at least three support leg assemblies 300 to take photos. In the folded state, the actuating portion 540 is disposed between adjacent support leg assemblies 300, i.e., the distance from the top of the actuating portion 540 to the rotational axis 501 is greater than the vertical distance between the rotational axis 501 and the contact surface 302. In this way, after the at least three actuating portions 540 rotate, the actuating portions 540 move along the contact surface 302 to gradually open the at least three support leg assemblies 300. In this manner, the process of the at least three actuating portions 540 preliminarily opening the at least three support leg assemblies 300 is smoother, and the at least three actuating portions 540 do not interfere with the folding of the at least three support leg assemblies 300.

For example, the inner peripheral wall of the support leg assembly 300 is a concave wall that mates with the first outer peripheral wall 111 of the support rod assembly 100, and the outer peripheral wall of the support leg assembly 300 is a convex wall; when the at least three support leg assemblies 300 are in a folded state, the outer peripheral walls of the at least three support leg assemblies 300 collectively form a first outer peripheral surface, which can be held by the user. More specifically, the first outer peripheral wall 111 of the support rod assembly 100 is a rotational surface (e.g., a cylindrical surface, etc.), the inner peripheral wall of the support leg assembly 300 is a concave arc wall, and the outer peripheral wall of the support leg assembly is a convex arc wall. The at least three support leg assemblies 300 are assembled around the first outer peripheral wall 111 of the support rod assembly 100.

For example, the support leg assembly 300 has an overall arc-shaped plate structure. When the at least three support leg assemblies 300 are in a folded state, the first outer peripheral surface is approximately cylindrical, facilitating handling by the user.

For example, when the at least three support leg assemblies 300 are in a folded state, the first outer peripheral surface is flush with the outer peripheral wall of the main cylinder 220, resulting in a more succinct and flat appearance of the entire multi-legged stand. When the at least three support leg assemblies 300 are in a folded state, the first outer peripheral surface and the outer peripheral surface of the main cylinder 220 of the sliding sleeve assembly 200 together form the outer peripheral surface of the multi-legged stand, and the outer peripheral surface of the multi-legged stand as a whole can be held by the user.

For example, both sides of the support leg assembly 300 have joining surfaces. When the at least three support leg assemblies 300 are in the folded state, the joining surfaces of each support leg assembly 300 are connected to its adjacent support leg assemblies 300. The contact surface 302 of the support leg assembly 300 is located between the joining surfaces on both sides of the support leg assembly 300. The contact surfaces is preferably a flat surface.

For example, as shown in FIGS. 1 to 4, when the at least three support leg assemblies 300 are in a folded state, the outer peripheral walls of the at least three support leg assemblies 300 collectively form a first outer peripheral surface 3111 that can be held by a user, and the connection points between the outer peripheral walls of adjacent support leg assemblies 300 are recessed to define an anti-pinch slot 3112. The anti-pinch slot 3112 prevents the user's hand from being pinched when holding the first outer peripheral surface 3111.

For example, the contact surface 302 is disposed on the bottom end of the support leg assembly 300, and the top end of the support leg assembly 300 is rotatably connected to the sliding sleeve assembly 200, such that when the actuating portion actuates the contact surface 302, the support leg assembly 300 is subjected to a greater opening torque which is used to overcome friction with the sliding sleeve assembly 200.

Figure 15:
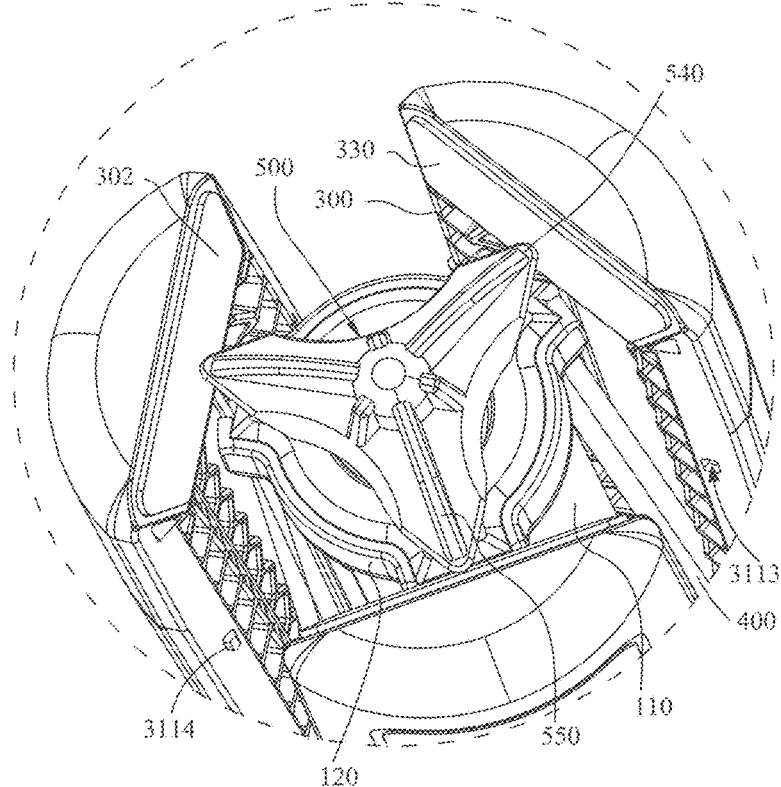
FIG. 15 is an enlarged view of the structure at position C in the multi-legged stand shown in FIG. 14.
Figure 16:
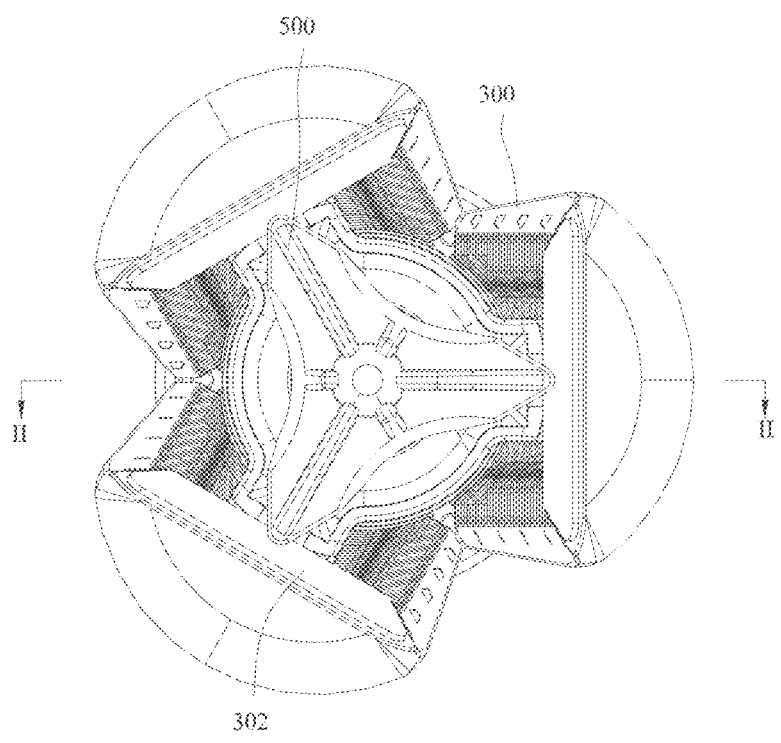
FIG. 16 is a front view of the multi-legged stand shown in FIG. 13 in a certain direction.
Figure 17:
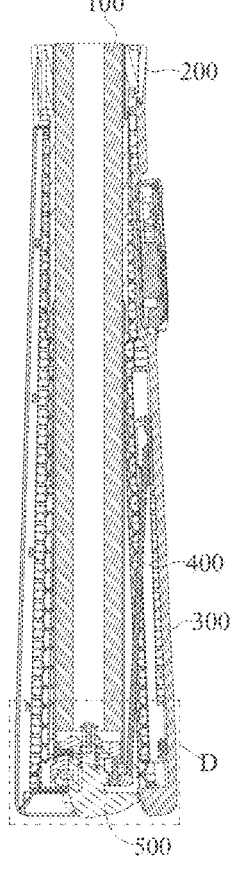
FIG. 17 is a cross-sectional view of the multi-legged stand shown in FIG. 16 along and II-II line.
Figure 44:
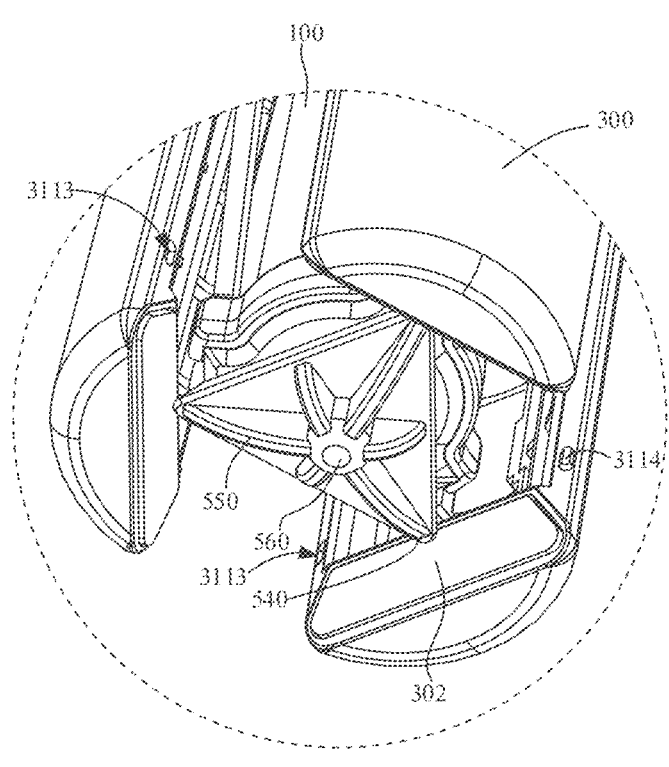
FIG. 44 is an enlarged view of the structure at position G in the multi-legged stand shown in FIG. 43.
Figure 45:
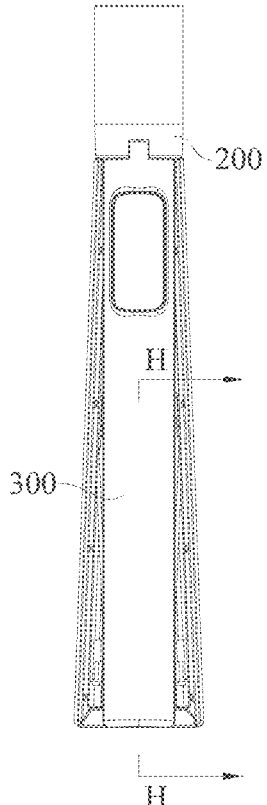
FIG. 45 is a front view of the multi-legged stand shown in FIG. 44 in a certain direction.
Figure 46:
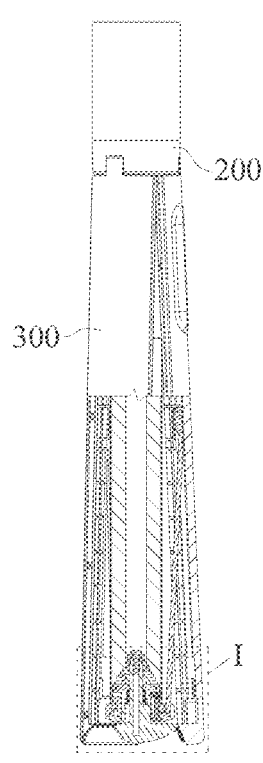
FIG. 46 is a partial cross-sectional view of the multi-legged stand shown in FIG. 45 along an H-H line.

For example, as shown in FIGS. 15 and 44, when the at least three support leg assemblies 300 are in a folded state, the side walls of adjacent support leg assemblies 300 are joined together; one of the side walls of the adjacent support leg assemblies 300 defines multiple positioning insertion slots 3113, and the other side wall is arranged with multiple positioning protrusions 3114 that can be precisely matched and interlocked with the multiple positioning insertion slots 3113. Specifically, the multiple positioning insertion slots 3113 are arranged at intervals along the length direction of the support leg assembly. Through the interlocking cooperation of the positioning insertion slots 3113 and the positioning protrusions 3114, when the at least three support leg assemblies are folded, the alignment between adjacent support leg assemblies is more precise and reliable, and the overall integrity of the at least three support leg assemblies is improved after folding, thereby reducing shaking between adjacent support leg assemblies.

In some embodiments, referring to FIGS. 1-27, or FIGS. 29-55, or FIGS. 56-66, etc., during the process where the at least three support leg assemblies 300 are switched from being folded relative to the support rod assembly 100 to being preliminarily opened relative to the support rod assembly 100, the sliding sleeve assembly 200 slides along the second direction. When the at least three support leg assemblies 300 are preliminarily opened relative to the support rod assembly 100 and the second direction is along the direction of gravity, the self-weight of the movable component causes the at least three support leg assemblies 300 to be splayed relative to the support rod assembly 100. The movable component includes the sliding sleeve assembly 200, the at least three support leg assemblies 300, and the at least three connecting rods 400. It can be understood that the self-weight of the movable component causes the at least three support leg assemblies 300 to "automatically" splay, thereby facilitating the use of the multi-legged stand.

Clearly, the second direction is along the length of the support rod assembly 100. During the preliminary opening of the at least three support leg assemblies 300 relative to the support rod assembly 100, the sliding sleeve assembly 200 slides along the second direction, the support leg assemblies 300 rotate relative to the sliding sleeve assembly 200, and the support leg assemblies 300 are preliminarily opened relative to the support rod assembly 100; the connecting rods 400 rotate relative to the support rod assembly 100, and the connecting rods 400 rotate relative to the support leg assembly 300.

Since the second direction is along the direction of gravity, the self-weight of the movable component includes at least the self-weight of the sliding sleeve assembly 200. During the process where the at least three support leg assemblies 300 are switched from being preliminarily opened relative to the support rod assembly 100 to being splayed, the sliding sleeve assembly 200 slides along the second direction, and the center of gravity of the sliding sleeve assembly 200 descends. In some cases, the self-weight of the movable component further includes the self-weight of the support leg assemblies 300 and the self-weight of the connecting rods 400; during the process where the at least three support leg assemblies 300 are switched from being preliminarily opened relative to the support rod assembly 100 to being splayed, the sliding sleeve assembly 200 slides in the second direction, and the center of gravity of the sliding sleeve assembly 200 descends; one end of the support leg assembly 300 slides with the sliding sleeve assembly 200, and the other end is splayed relative to the support rod assembly 100; the center of gravity of the support leg assembly 300 descends, the connecting rod 400 is switched from being preliminarily opened relative to the support rod assembly 100 to being fully splayed relative to the support rod assembly 100, and the center of gravity of the connecting rod 400 decreases.

Figure 33:
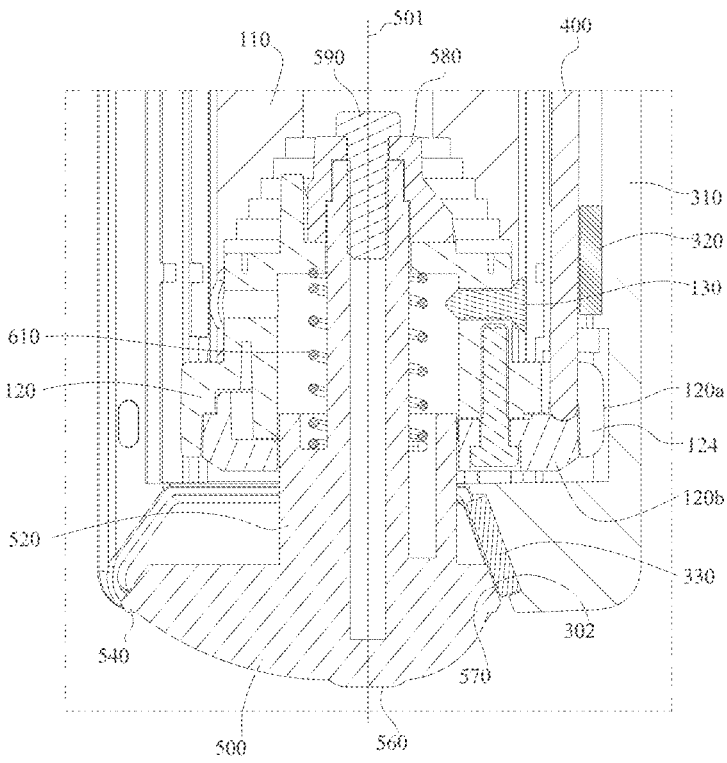
FIG. 33 is an enlarged view of the structure at position C in the multi-legged stand shown in FIG. 32.
Figure 47:
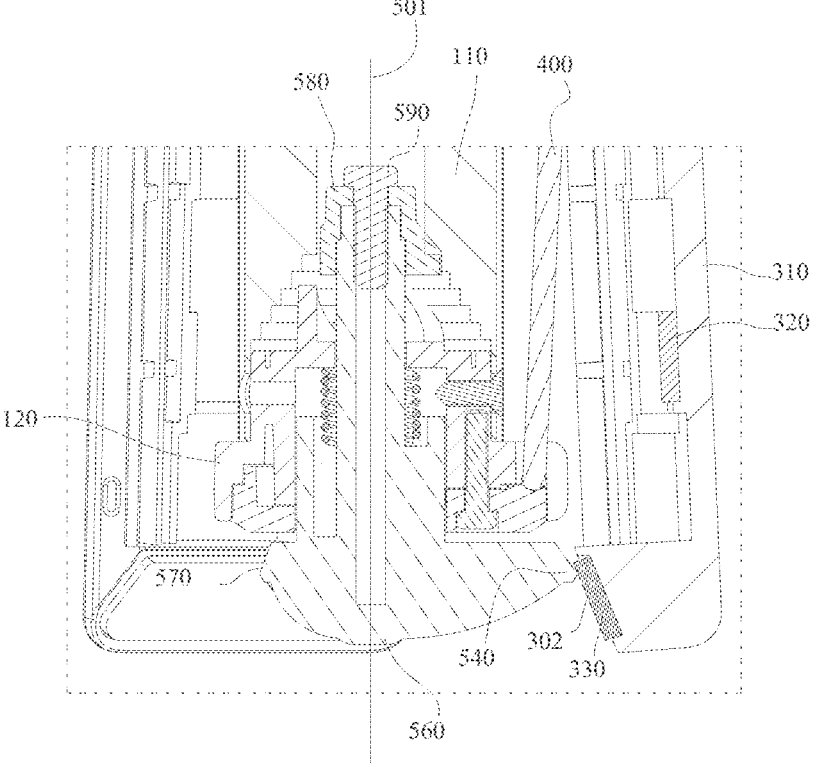
FIG. 47 is an enlarged view of the structure at position I in the multi-legged stand shown in FIG. 46.
Figures 48, 49:
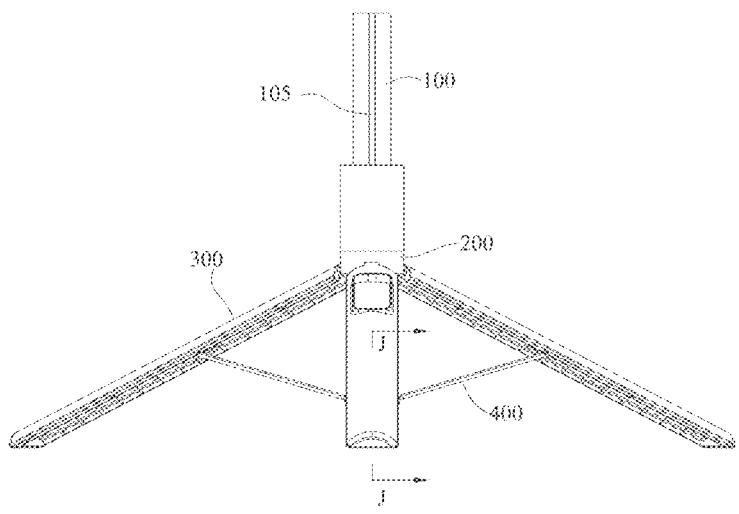
FIG. 48 is a structural schematic view of the multi-legged stand shown in FIG. 29 when the three support leg assemblies are fully splayed relative to the support rod assembly.
FIG. 49 is a partial cross-sectional view of the multi-legged stand shown in FIG. 48 along a J-J line.
Figure 50:
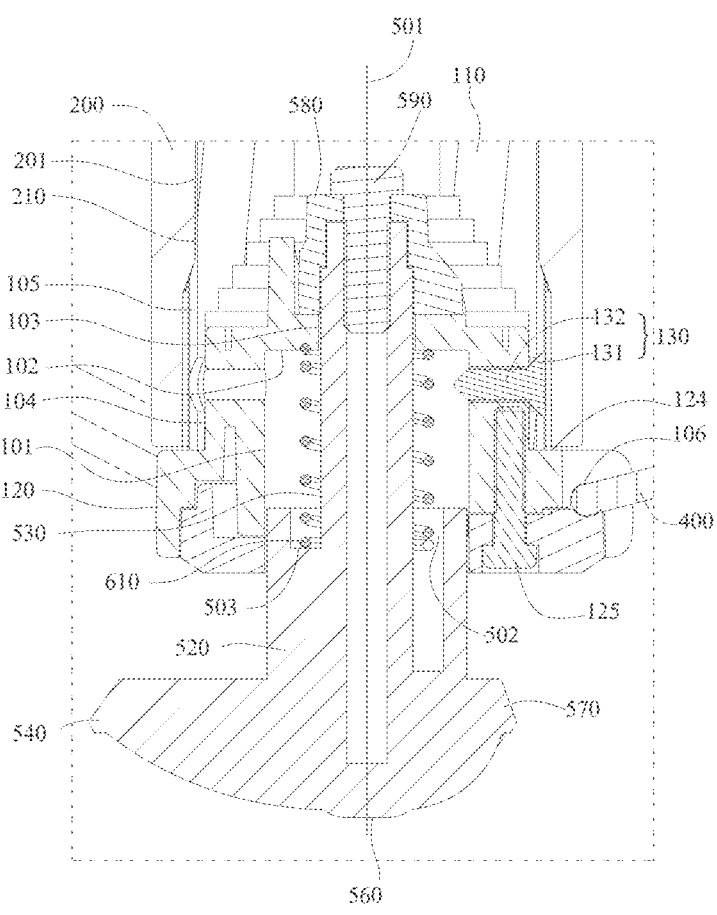
FIG. 50 is an enlarged view of the structure at position K shown in FIG. 49.
Figure 51:
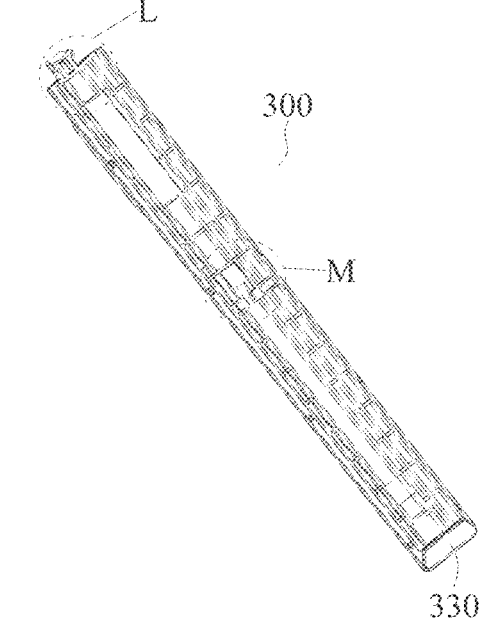
FIG. 51 is a structural schematic view of the support leg assembly in the multi-legged stand shown in FIG. 29.
Figure 52:
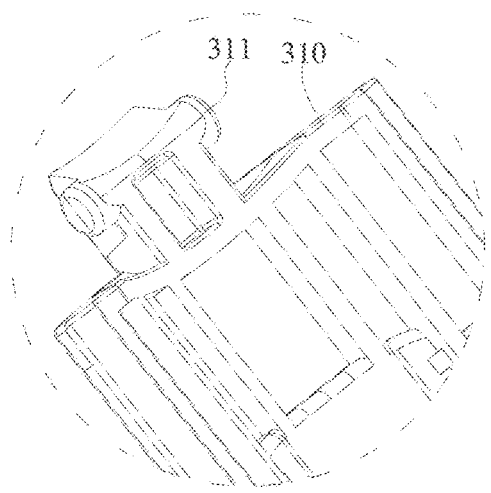
FIG. 52 is an enlarged view of the structure at position L in the support leg assembly shown in FIG. 51.
Figure 53:
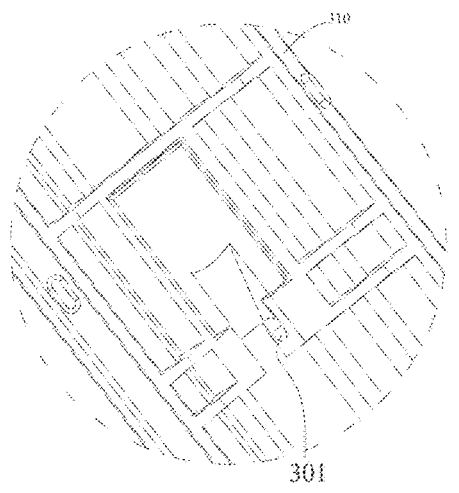
FIG. 53 is an enlarged view of the structure at position M in the support leg assembly shown in FIG. 51.
Figure 54:
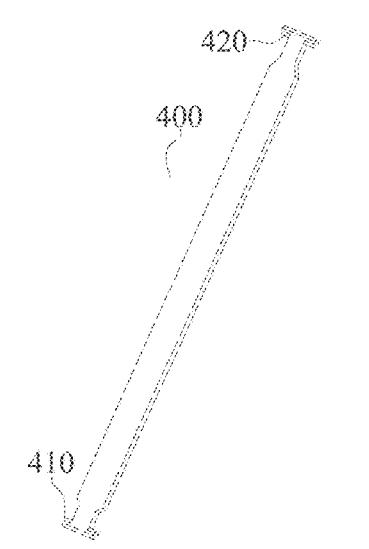
FIG. 54 is a structural schematic view of a connecting rod in the multi-legged stand shown in FIG. 48.
Figure 55:
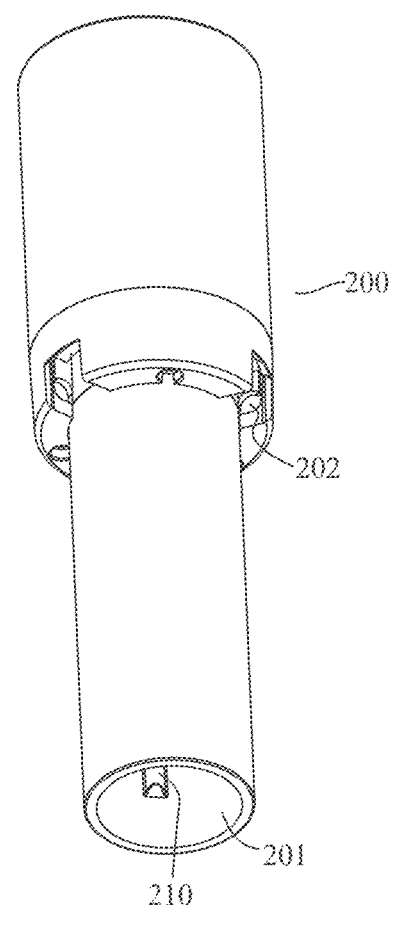
FIG. 55 is a structural schematic view of a sliding sleeve assembly in the multi-legged stand shown in FIG. 48.
Figure 56:
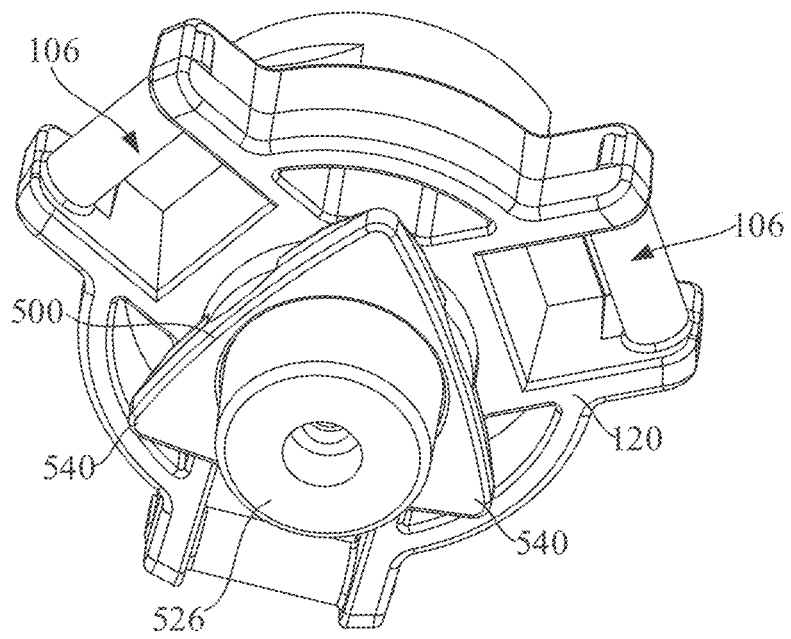
FIG. 56 is an assembly schematic view of a mounting member and a preliminary opening member of a multi-legged stand according to further embodiments of the present disclosure.
Figure 57:
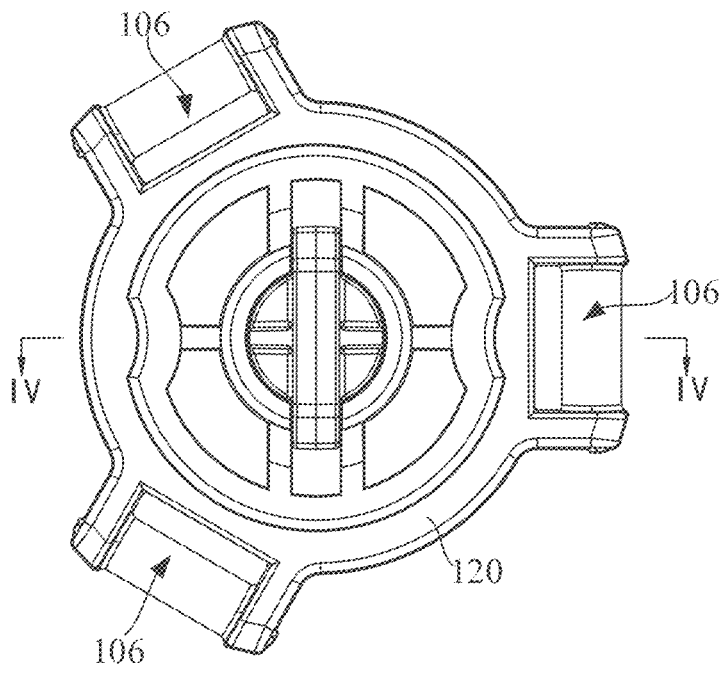
FIG. 57 is a top view of the structure shown in FIG. 56.

In some embodiments, referring to FIGS. 1-27, or referring to FIGS. 33, 47, etc., the first external action includes a rotational torque acting on the preliminary opening member 500 and around the rotational axis 501. The preliminary opening member 500 includes a rotational adjustment portion, and the user can apply a rotational torque around the rotational axis 501 to the rotational adjustment portion with his/her hand to rotate the preliminary opening member 500 from the initial position to the second position. It can be understood that the rotational adjustment portion facilitates the user's manual adjustment of the preliminary opening member 500, thereby facilitating the use of the multi-legged stand. In this case, the first external action includes the rotational torque applied by the user to the rotational adjustment portion. The rotational adjustment portion may be any shape that can be adjusted by hand, such as a cylindrical or plate-shaped structure.

Figure 8:
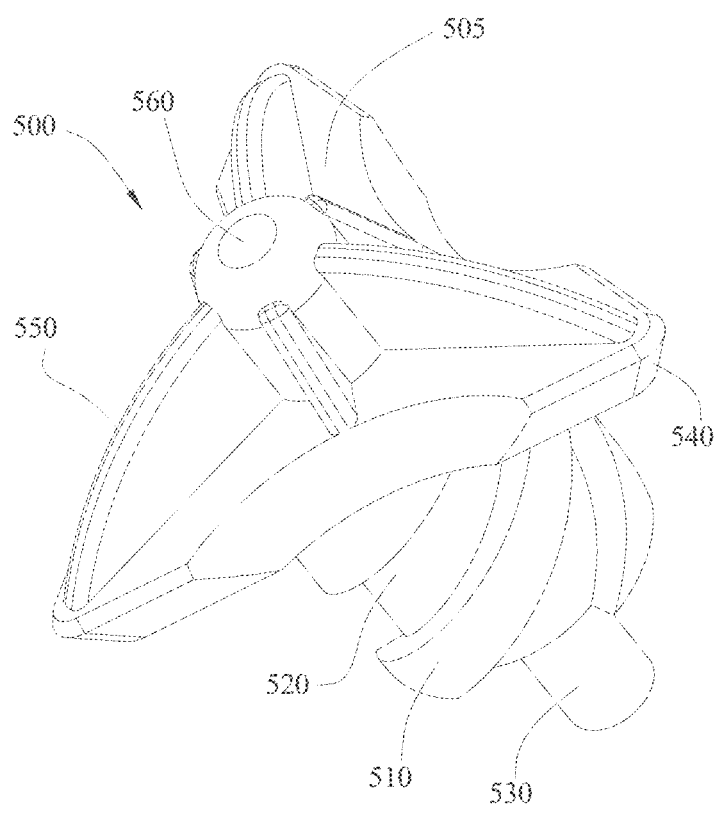
FIG. 8 is a structural schematic view of the preliminary opening member shown in FIG. 7 at another viewing angle.
Figure 9:
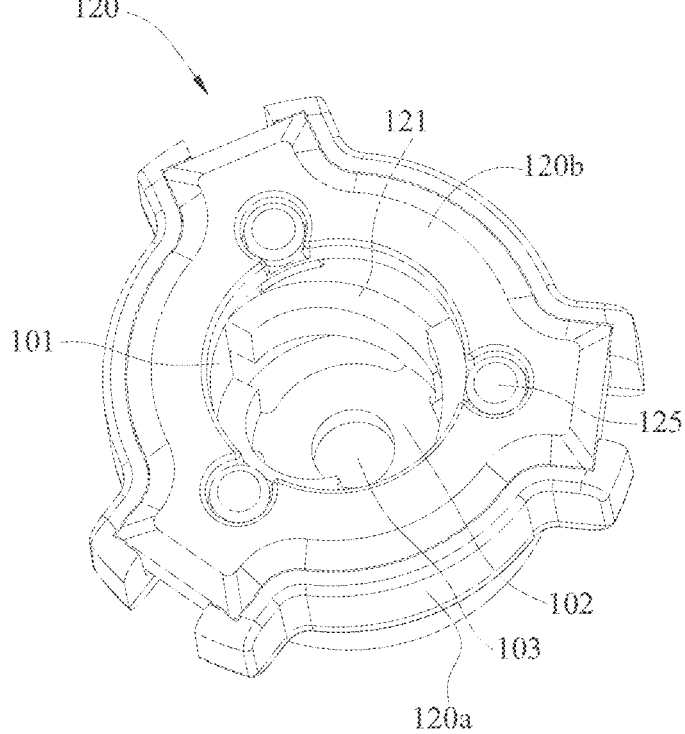
FIG. 9 is a structural schematic view of a mounting member shown in FIG. 6.
Figure 10:
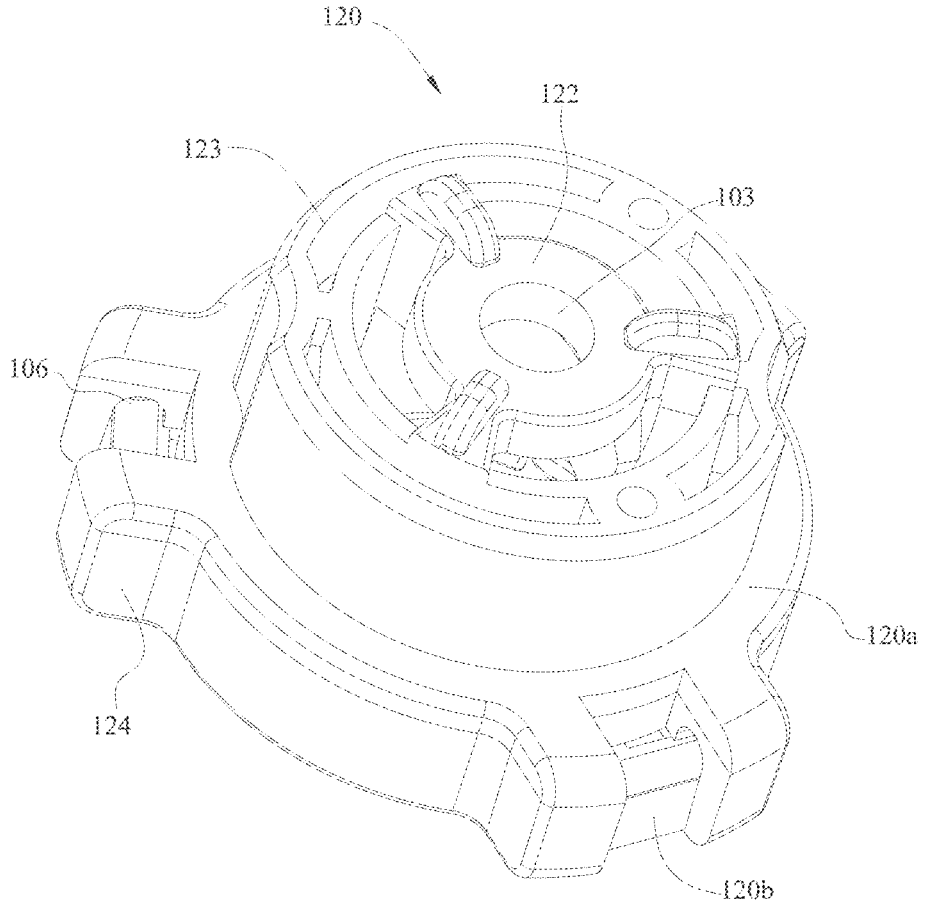
FIG. 10 is a structural schematic view of the mounting member shown in FIG. 9 at another viewing angle.
Figure 11:
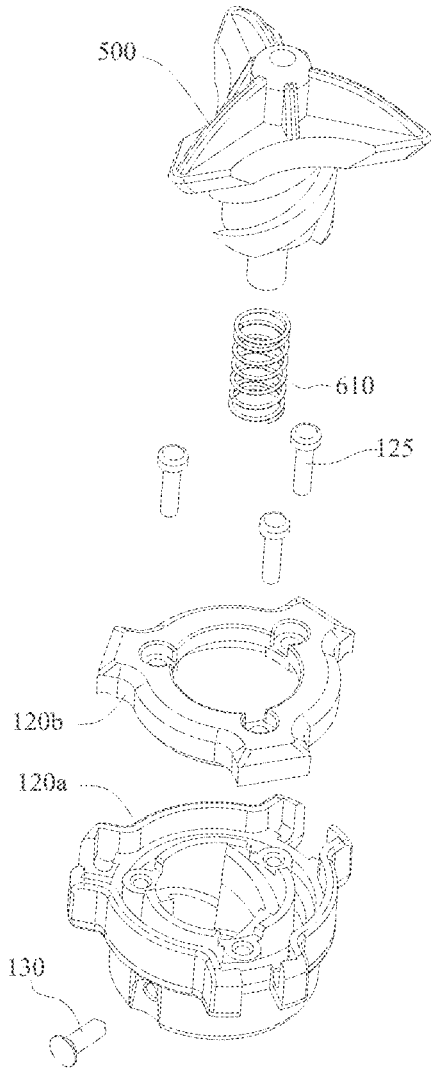
FIG. 11 is an exploded schematic view of the mounting member, the preliminary opening member, a reset spring, and other structures shown in FIG. 6.
Figure 12:
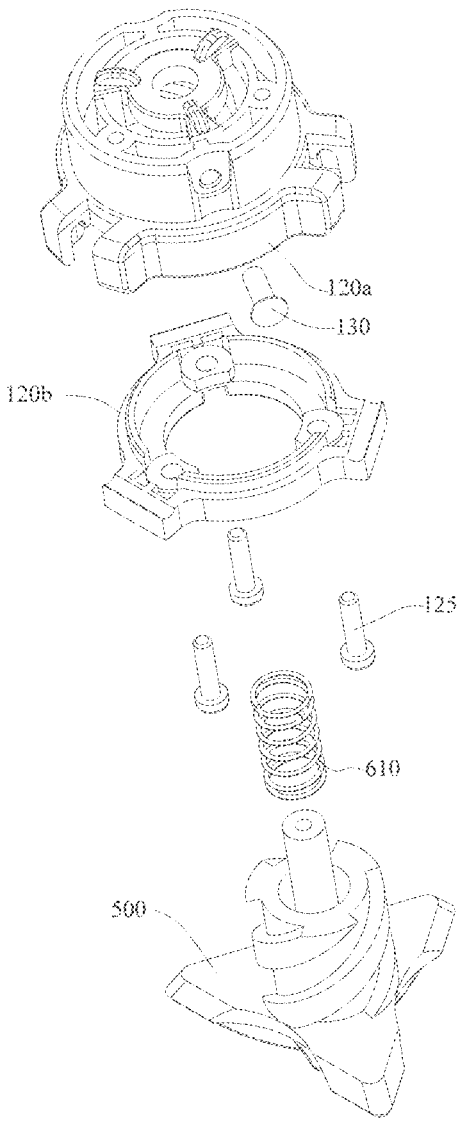
FIG. 12 is an exploded schematic view of the structure shown in FIG. 11 at another viewing angle.
Figure 13:
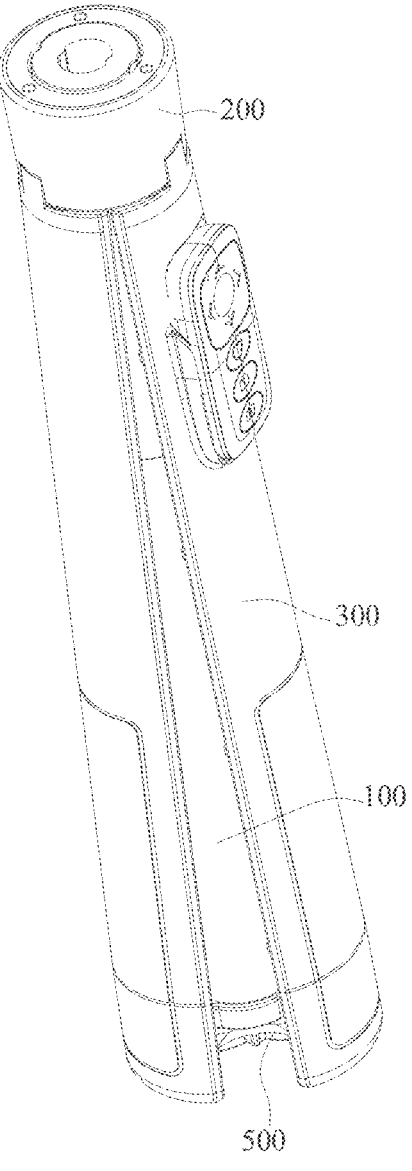
FIG. 13 is a structural schematic view of the multi-legged stand shown in FIG. 1 when the three support leg assemblies are preliminarily opened relative to the support rod assembly, with the preliminary opening member in a second position.
Figure 14:
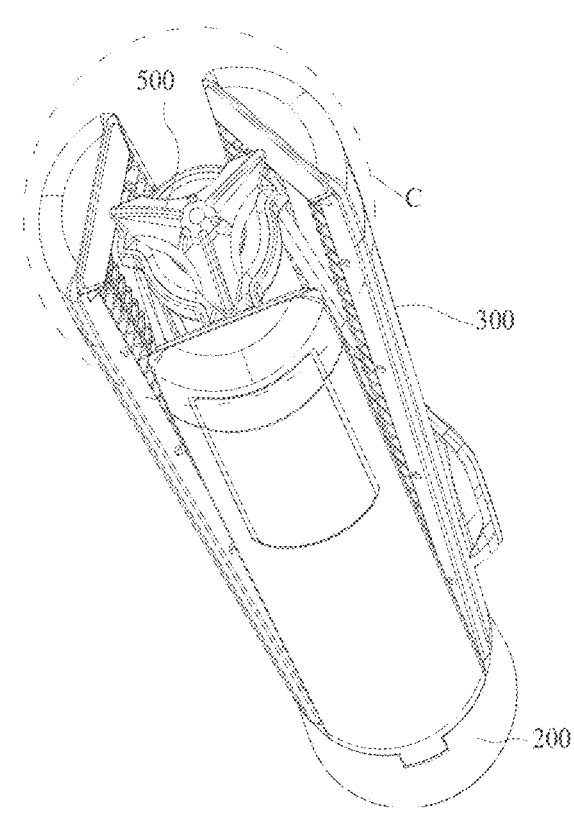
FIG. 14 is a structural schematic view of the multi-legged stand shown in FIG. 13 at another viewing angle.

In some embodiments, referring to FIGS. 4 and 8, or referring to FIG. 44, the number of the support leg assemblies 300 is three, the number of the actuating portions 540 is three, and the rotational adjustment portion includes three adjustment plates 550. The three adjustment plates 550 are centered symmetrically around the rotational axis 501 of the preliminary opening member 500. Each of the three adjustment plates 550 is connected to a corresponding one of the three actuating portions 540. A space between each adjacent adjustment plates 550 is a force application space 505, allowing the user's three fingers to be placed in the three force application spaces 505 for manual adjustment of the rotational adjustment portion. As can be understood, the user's three fingers can be placed in the three force application spaces 505 to adjust the rotational adjustment portion, thereby facilitating the use of the multi-legged stand. All the three fingers can apply the rotational torque to the rotational adjustment portion. For example, the three fingers are placed in the three force application spaces 505, and then the user rotates the arm, causing the three fingers to act on the three adjustment plates 550. More specifically, the user's three fingers may be the thumb, index finger, and middle finger. By applying the rotational torque to the preliminary opening member 500 using the three fingers, the preliminary opening member 500 can be rotated more easily, thereby facilitating the use of the multi-legged stand. In other embodiments, the rotational adjustment portion includes one adjustment plate 550, two adjustment plates 550, or four adjustment plates 550, etc.

In some embodiments, referring to FIG. 6, the preliminary opening member 500 includes a pressure-applying portion 560. The first external action includes a force acting on the preliminary opening member 500 along the first direction. Applying pressure to the pressure-applying portion 560 along the first direction causes the preliminary opening member 500 to translate along the first direction relative to the support rod assembly 100 and rotate relative to the support rod assembly 100. The user applies pressure to the pressure-applying portion 560, allowing the user to rotate the preliminary opening member 500 relative to the support rod assembly 100 by pressing, thereby preliminarily opening the support leg assemblies 300 relative to the support rod assembly 100, thus facilitating the use of the multi-legged stand. For example, the user presses the pressure-applying portion 560 with his/her hand, or the user strikes the support surface to apply pressure to the preliminary opening member 500. For example, the at least three adjustment plates 550 are connected to the pressure-applying portion 560, and the at least three actuating portions 540 are connected to the pressure-applying portion 560. This configuration enhances the structural strength of the preliminary opening member 500.

In some embodiments, referring to FIG. 6, the preliminary opening member 500 is arranged on the bottom end of the support rod assembly 100. When the at least three support leg assemblies 300 are folded relative to the support rod assembly 100, the pressure-applying portion 560 protrudes from the bottom ends of the support leg assemblies 300; when the at least three support leg assemblies 300 are folded relative to the support rod assembly 100, the pressure-applying portion 560 of the preliminary opening member 500 impacts the support surface, causing the support surface to apply pressure to the pressure-applying portion 560 along the first direction, thereby causing the preliminary opening member 500 to translate along the first direction relative to the support rod assembly 100 and rotate relative to the support rod assembly 100. It can be understood that the preliminary opening member 500 is disposed on the bottom end of the support rod assembly 100, and the pressure-applying portion 560 protrudes from the bottom end of the support leg assembly 300, facilitating the collision of the pressure-applying portion 560 of the preliminary opening member 500 with the support surface. By colliding the pressure-applying portion 560 with the support surface, it is relatively easy to apply pressure to the pressure-applying portion 560.

For example, in the folded state, the height at which the pressure-applying portion 560 protrudes from the bottom end of the support leg assembly 300 is greater than or equal to 1 mm.

In some embodiments, referring to FIGS. 1, 6, 13, 18, and 19, the preliminary opening member 500 includes a pressure-applying portion 560, and the first external action includes a force acting on the preliminary opening member 500 along the first direction. Pressing the pressure-applying portion 560 along the first direction to cause the preliminary opening member 500 to translate along the first direction relative to the support rod assembly 100 and rotate relative to the support rod assembly 100. During the process where the at least three support leg assemblies 300 are switched from the folded state relative to the support rod assembly 100 into the preliminarily opened state relative to the support rod assembly 100, the sliding sleeve assembly 200 slides along the second direction. When the at least three support leg assemblies 300 are folded relative to the support rod assembly 100 and the second direction is along the direction of gravity, the pressure-applying portion 560 of the preliminary opening member 500 collides with the support surface along the second direction, and the preliminary opening member 500 translates parallel to the support rod assembly 100 in the first direction and rotates relative to the support rod assembly 100, thereby causing the at least three support leg assemblies 300 to be preliminarily opened relative to the support rod assembly 100. After the pressure-applying portion of the preliminary opening member 500 collides with the support surface along the second direction and the second direction is along the direction of gravity to cause the at least three support leg assemblies 300 to be preliminarily opened relative to the support rod assembly 100, the self-weight and inertial effects of the movable component cause the at least three support leg assemblies 300 to be splayed relative to the support rod assembly 100. The movable component includes the sliding sleeve assembly 200, the at least three support leg assemblies 300, and the at least three connecting rods 400. The inertial effect of the movable component includes an inertial effect of the movable component maintaining its movement in the second direction during the process of the pressure-applying portion 560 of the pressing member 500 colliding with the support surface along the second direction. It can be understood that the self-weight and inertial effect of the movable component cause the at least three support leg assemblies 300 to "automatically" splay, thereby facilitating the use of the multi-legged stand.

It can be understood that when the pressure-applying portion 560 of the preliminary opening member 500 collides with the support surface along the second direction, the inertial effect of the movable component still maintains the movable component moving along the second direction.

Since the second direction is along the direction of gravity, the self-weight of the movable component includes at least the self-weight of the sliding sleeve assembly 200. Additionally, since the multi-legged stand collides with the support surface along the second direction, the inertial effect of the movable component includes at least the inertial effect of the sliding sleeve assembly 200. During the process where the at least three support leg assemblies 300 are switched from being preliminarily opened relative to the support rod assembly 100 to being splayed, the sliding sleeve assembly 200 slides along the second direction under the inertial effect, causing the center of gravity of the sliding sleeve assembly 200 to descend, thereby causing the at least three support leg assemblies 300 to be splayed relative to the support rod assembly 100. In some cases, the self-weight of the movable component further includes the self-weight of the support leg assemblies 300 and the self-weight of the connecting rods 400, and the inertial effect of the movable component further includes the inertial effect of the support leg assemblies 300 and the inertial effect of the connecting rods 400. During the process where the at least three support leg assemblies 300 are switched from being preliminarily opened relative to the support rod assembly 100 to being splayed, the movable component slides along the second direction under its own weight effect and inertial effect, causing the center of gravity of the sliding sleeve assembly 200 to descend. Under its own weight effect and inertial effect, one end of the support leg assembly 300 slides with the sliding sleeve assembly 200, while the other end is splayed relative to the support rod assembly 100, and the center of gravity of the support leg assembly 300 descends. The connecting rod 400, under its own weight effect and inertial effect, is switched from its preliminarily opened state relative to the support rod assembly 100 to the splayed state, and the center of gravity of the connecting rod 400 descends, thereby causing the at least three support leg assemblies 300 to be splayed relative to the support rod assembly 100.

In some embodiments, referring to FIGS. 6 and 18, the support leg assembly 300 includes a contact surface 302.

During the translation of the preliminary opening member 500 along the first direction, the actuating portion 540 comes into contact with the contact surface 302 of the corresponding support leg assembly 300, where the angle between the external normal direction of the contact surface 302 and the first direction is greater than 90° to facilitate the preliminary opening of the support leg assembly 300 relative to the support rod assembly 100. The angle between the external normal direction of the contact surface 302 and the first direction is greater than 90°, such that during the translation of the preliminary opening member 500 along the first direction, the actuating portion 540 pushes against the contact surface 302, thereby promoting the preliminary opening of the support leg assembly 300 relative to the support rod assembly 100. For example, the contact surface 302 may be a planar surface or a curved surface.

For example, the contact surfaces 302 of the at least three support leg assemblies 300 enclose to define a rotational space, and the cross-sectional area of the rotational space decreases gradually from bottom to top, facilitating the preliminary opening of the support leg assemblies 300 relative to the support rod assembly 100 as the preliminary opening member 500 translates along the first direction.

Specifically, when the at least three support leg assemblies 300 are splayed to their maximum splayed state relative to the support rod assembly 100 and the at least three support leg assemblies 300 stand on the support surface, the contact surfaces 302 are in contact with the support surface. More specifically, the support leg assembly 300 includes an anti-slip pad 330 and a support leg body 310, with the anti-slip pad 330 disposed on the bottom end of the support leg body 310, and the contact surface 302 disposed on the anti-slip pad 330.

In other cases, during the translation of the preliminary opening member 500 along the first direction, the direction of the normal line of the contact surface 302 forms an angle of 90° or less with the first direction, and the translation of the preliminary opening member 500 along the first direction does not affect the splaying of the support leg assembly 300 relative to the support rod assembly 100. The rotation of the preliminary opening member 500 around the rotational axis 501 causes the support leg assemblies 300 to be preliminarily opened relative to the support rod assembly 100.

Figure 28:
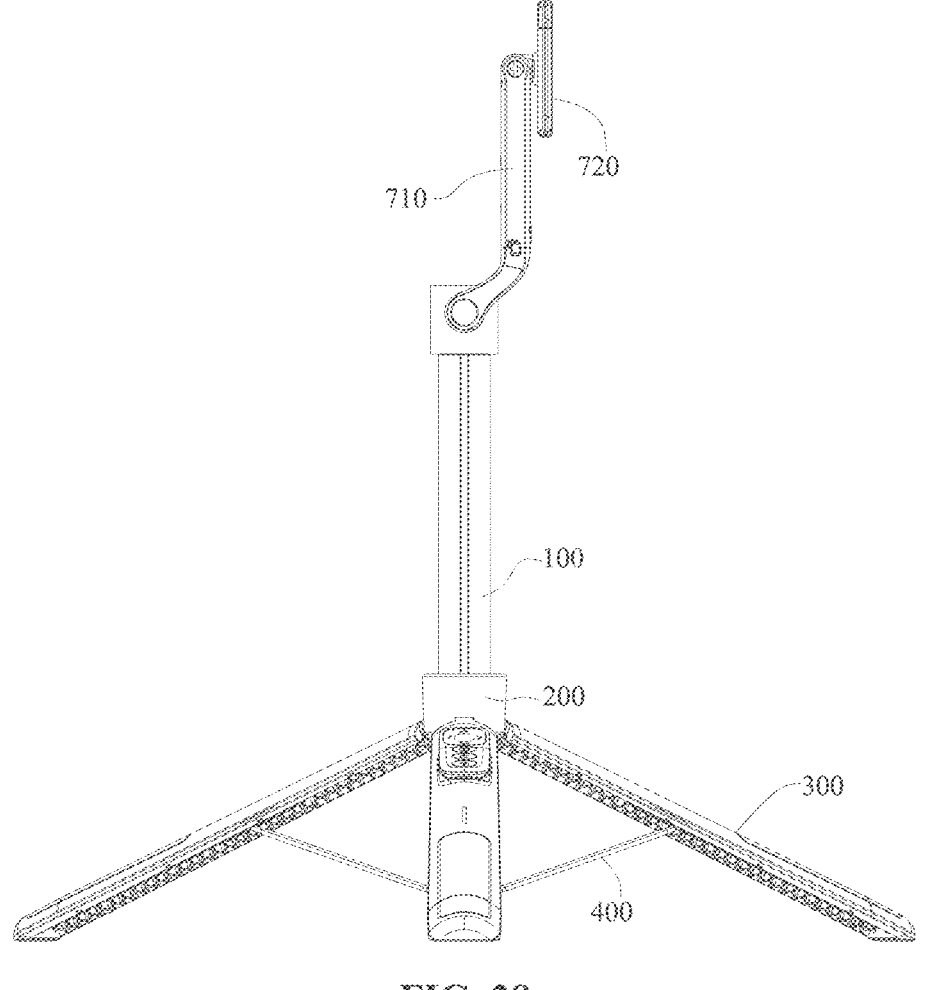
FIG. 28 is a structural schematic view of an electronic terminal support device according to some embodiments of the present disclosure.
Figure 29:
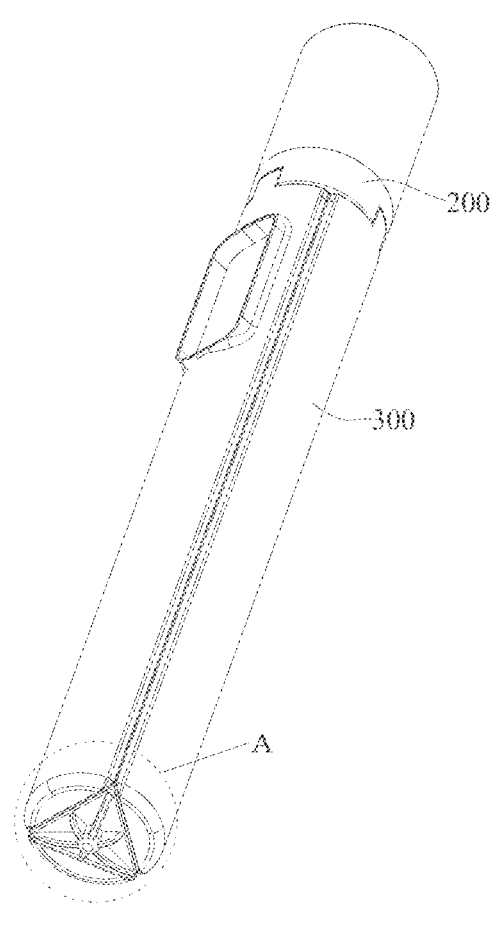
FIG. 29 is a structural schematic view of a multi-legged stand according to other embodiments of the present disclosure; where three support leg assemblies of the multi-legged stand are in a folded state relative to a support rod assembly.

The present disclosure further provides an electronic terminal support device, referring to FIG. 28. The support device includes a support member 720 and a multi-legged stand. The support member 720 is configured to support an electronic terminal, and the support member 720 is arranged on the support rod assembly 100 of the multi-legged stand. For example, the support member 720 is directly or indirectly arranged on the support rod assembly 100, e.g., a connecting arm 710 is arranged on the support rod assembly 100. Specifically, the support member 720 is rotatably arranged on the connecting arm 710, and the support member 720 can rotate relative to the connecting arm 710 to adjust the orientation of the electronic terminal (e.g., landscape, portrait, or diagonal orientation). More specifically, the support member 720 can rotate at 360° relative to connecting arm 710. Specifically, the connecting arm 710 is rotatably arranged on the support rod assembly 100, and the connecting arm 710 can rotate relative to the support rod assembly 100 to adjust the usage angle of the electronic terminal. When it is necessary to store the electronic terminal support device, the connecting arm 710 can be folded onto the support rod assembly 100, or the connecting arm 710 can be folded onto the support leg assembly 300 that is in a folded state.

For example, the support member 720 may be a clamp for holding the electronic terminal, the clamp including a clamp body and two clamping portions, the two clamping portions respectively for clamping opposite sides of the electronic terminal. The clamp body is elastically extendable to adjust the clamping width of the clamp, and the clamping portions are storable within the clamp body. For example, the support member 720 is a suction cup for adhering to the electronic terminal, such as a suction cup that can adhere to the back of the electronic terminal. For example, the support member 720 is a magnetic attraction member for magnetically attaching the electronic terminal, where the magnetic attraction member may be an electromagnet or a permanent magnet. For example, the support member 720 is a tray for supporting the electronic terminal, with the electronic terminal placed on the tray. For example, the support member 720 is a snap-fitting member for snap-fit the electronic terminal. For example, the support member 720 is threadedly connected to the electronic terminal, such as one of the support member 720 and the electronic terminal having a threaded shaft and the other having a threaded hole.

The present disclosure further provides a usage method of a multi-legged stand, the method including:

providing the multi-legged stand; where the at least three support leg assemblies 300 of the multi-legged stand are folded relative to the support rod assembly 100 of the multi-legged stand; the preliminary opening member 500 of the multi-legged stand is in the initial position; the preliminary opening member 500 includes a rotational adjustment portion; the number of the support leg assemblies 300 is three, the number of the actuating portions 540 is three, and the rotational adjustment portion includes three adjustment plates 550; the three adjustment plates 550 are centrally symmetrical around the rotational axis 501 of the preliminary opening member 500, and the three adjustment plates 550 are respectively connected to the corresponding three actuating portions 540, with adjacent two adjustment plates 550 defining a force application space 505 therebetween;

placing the user's three fingers in the three force application spaces 505;

rotating the user's arm to apply a rotational torque around the rotational axis 501 of the preliminary opening member 500, for causing the rotational adjustment portion to rotate around the rotational axis 501 of the preliminary opening member 500, thereby rotating the preliminary opening member 500 from the initial position to a second position, such that the at least three support leg assemblies 300 are preliminarily opened relative to the support rod assembly 100; and causing at least three support leg assemblies 300 to be splayed relative to the support rod assembly 100.

It can be understood that applying a rotational torque to the preliminary opening member 500 using three fingers and the arm makes it easier to rotate the preliminary opening member 500, thereby facilitating the use of a multi-legged stand. In the state where the at least three support leg assemblies 300 are preliminarily opened relative to the support rod assembly 100, there are multiple ways to splay the at least three support leg assemblies 300 relative to the support rod assembly 100, e.g., the user can easily use hands to pry open the support leg assemblies 300 relative to the support rod assembly 100, or the user can easily slide the sliding sleeve assembly 200, thereby causing the support leg assemblies 300 to be in the splayed state relative to the support rod assembly 100.

Furthermore, during the process where the at least three support leg assemblies 300 are switched from the folded state relative to the support rod assembly 100 into the preliminarily opened state relative to the support rod assembly 100, the sliding sleeve assembly 200 slides along the second direction; the step of causing the at least three support leg assemblies 300 to splay relative to the support rod assembly 100 includes: causing the second direction to be along the direction of gravity, and causing the at least three support leg assemblies 300 to be splayed relative to the support rod assembly 100 under the self-weight of the movable component. The movable component includes the sliding sleeve assembly 200, the at least three support leg assemblies 300, and the at least three connecting rods 400 of the multi-legged stand. The self-weight of the movable component causes the multi-legged stand to "automatically" splay, thereby reducing manual operation by the user and thereby facilitating the use of the multi-legged stand. Clearly, the self-weight of the movable component shall be greater than the resistive force acting on the movable component.

The present disclosure further provides a usage method of a multi-legged stand. The method includes:

providing the multi-legged stand; where the at least three support leg assemblies 300 of the multi-legged stand are folded relative to the support rod assembly 100, and the preliminary opening member 500 of the multi-legged stand is in an initial position; the preliminary opening member 500 includes a pressure-applying portion 560;

applying pressure along the first direction to the pressure-applying portion 560 to cause the preliminary opening member 500 to translate along the first direction, for rotating the preliminary opening member 500 relative to the support rod assembly 100, such that the at least three support leg assemblies 300 are preliminarily opened relative to the support rod assembly 100; and causing the at least three support leg assemblies 300 to splay relative to the support rod assembly 100.

Furthermore, during the process where the at least three support leg assemblies 300 are switched from the folded state relative to the support rod assembly 100 into the preliminarily opened state relative to the support rod assembly 100, the sliding sleeve assembly 200 slides along the second direction; the step of causing the at least three support leg assemblies 300 to splay relative to the support rod assembly 100 includes: causing the second direction to be along the direction of gravity, and causing the at least three support leg assemblies 300 to be splayed relative to the support rod assembly 100 under the self-weight of the movable component. The movable component includes the sliding sleeve assembly 200, the at least three support leg assemblies 300, and the at least three connecting rods 400. The self-weight of the movable component causes the multi-legged stand to "automatically" splay, thereby reducing manual operation by the user and thereby facilitating the use of the multi-legged stand.

Furthermore, during the process where the at least three support leg assemblies 300 are switched from the folded state relative to the support rod assembly 100 into the preliminarily opened state relative to the support rod assembly 100, the sliding sleeve assembly 200 slides along the second direction; the step of applying pressure along the first direction to the pressure-applying portion 560 to cause the preliminary opening member 500 to translate along the first direction includes that: the pressure-applying portion 560 of the preliminary opening member 500 collides with the support surface in the second direction, causing the preliminary opening member 500 to translate in the first direction relative to the support rod assembly 100; the second direction is in the direction of gravity; the step of causing the at least three support leg assemblies 300 to splay relative to the support rod assembly 100 includes: causing the at least three support leg assemblies 300 to splay relative to the support rod assembly 100 under the self-weight and inertial effects of the movable component. The movable component includes the sliding sleeve assembly 200, the at least three support leg assemblies 300, and the at least three connecting rods 400 of the multi-legged stand, and the inertial effect of the movable component includes the inertial effect of the movable component to maintain its movement in the second direction during the process of the pressure-applying portion 560 colliding with the support surface along the second direction. The self-weight and inertial effects of the movable component cause the multi-legged stand to "automatically" splay, and the self-weight and inertial effects of the movable component further cause the support leg assemblies 300 of the multi-legged stand to be splayed more quickly, thereby facilitating the use of the multi-legged stand.

The present disclosure further provides a usage method of a multi-legged stand. The method includes:

providing the multi-legged stand; wherein at least three support leg assemblies 300 of the multi-legged stand are folded relative to the support rod assembly 100 of the multi-legged stand, and the preliminary opening member 500 of the multi-legged stand is in an initial position; the multi-legged stand includes a force-bearing member;

applying pressure along the first direction to the force-bearing member to cause the force-bearing member to translate to the first direction, for rotating the preliminary opening member 500 relative to the support rod assembly 100, and causing the at least three support leg assemblies 300 to be preliminarily opened relative to the support rod assembly 100; and causing the at least three support leg assemblies 300 to splay relative to the support rod assembly 100.

Referring to FIGS. 29-55, the present disclosure provides a multi-legged stand including a support rod assembly 100, a sliding sleeve assembly 200, at least three support leg assemblies 300, at least three connecting rods 400, and a preliminary opening member 500. The sliding sleeve assembly 200 is slidably sleeved on the support rod assembly 100 along a length direction of the support rod assembly 100; the at least three support leg assemblies 300 are rotatably connected to the sliding sleeve assembly 200; the at least three connecting rods 400 correspond to the at least three support leg assemblies 300, with one end of each connecting rod 400 rotatably connected to the support rod assembly 100 and the other end rotatably connected to its corresponding support leg assembly 300, allowing the at least three support leg assemblies 300 to be splayed or folded relative to the support rod assembly 100. In an initial state, the at least three support leg assemblies 300 remain in a folded state relative to the support rod assembly 100; when the at least three support leg assemblies 300 are in a splayed state relative to the support rod assembly 100, the at least three support leg assemblies 300 can stand on a support surface. The preliminary opening member 500 is slidably arranged on the support rod assembly 100. A second external action can be applied to the preliminary opening member 500 to cause the preliminary opening member 500 to translate along a first direction relative to the support rod assembly 100. The preliminary opening member 500 includes at least three contact-push portions 570, with each of the at least three contact-push portions 570 corresponding to one of the at least three support leg assemblies 300. During the process of the preliminary opening member 500 translating from the initial position to a third position, the contact-push portions 570 push the corresponding support leg assemblies 300, causing the at least three support leg assemblies 300 to be switched from being folded relative to the support rod assembly 100 to being preliminarily opened relative to the support rod assembly 100.

It can be understood that the preliminary opening member 500 translates to the support rod assembly 100, causing the at least three support leg assemblies 300 to be preliminarily opened relative to the support rod assembly 100, thereby allowing the at least three support leg assemblies 300 to be splayed more easily relative to the support rod assembly 100, which facilitates the use of the multi-legged stand.

Understandably, during the process of the contact-push portions 570 pushing the corresponding support leg assemblies 300 to cause the at least three support leg assemblies 300 to be switched from being folded relative to the support rod assembly 100 to be preliminarily opened, each contact-push portion 570 slides relative to the support rod assembly 100 and pushes open the corresponding support leg assembly 300, causing the at least three support leg assemblies 300 to be switched from being folded relative to the support rod assembly 100 to be preliminarily opened.

For example, the sliding direction of the preliminary opening member 500 is along the length direction of the support rod assembly 100, more specifically, the sliding direction of the preliminary opening member 500 is along the central axis of the support rod assembly 100.

As can be understood, the embodiments shown in FIGS. 29-55 differ from the embodiments shown in FIGS. 1-27 in that the connection method between the preliminary opening member 500 and the support rod assembly 100 is different, and the manner in which the preliminary opening member 500 preliminarily opens the support rod assembly 100 is different.

Figure 36:
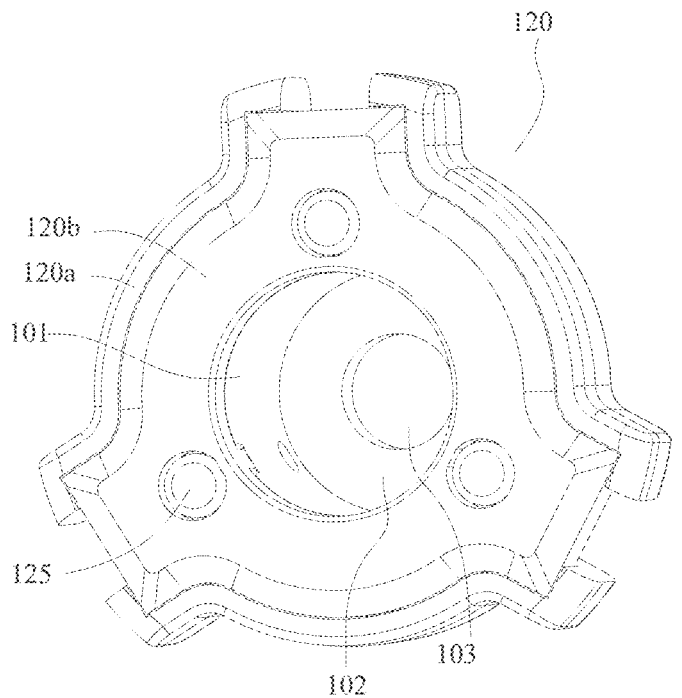
FIG. 36 is a structural schematic view of the mounting member shown in FIG. 34.
Figure 37:
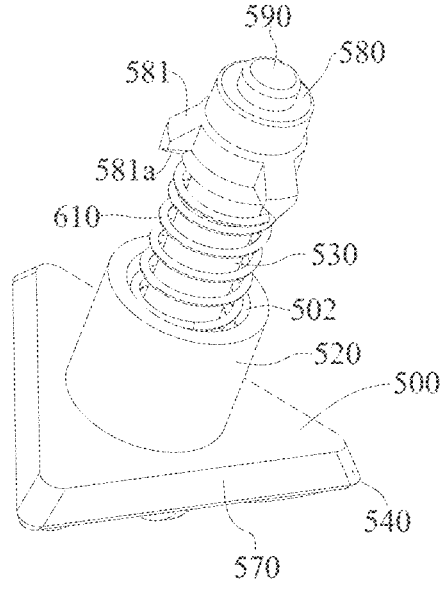
FIG. 37 is a schematic view of the cooperation between the preliminary opening member and a reset spring shown in FIG. 34.
Figure 38:
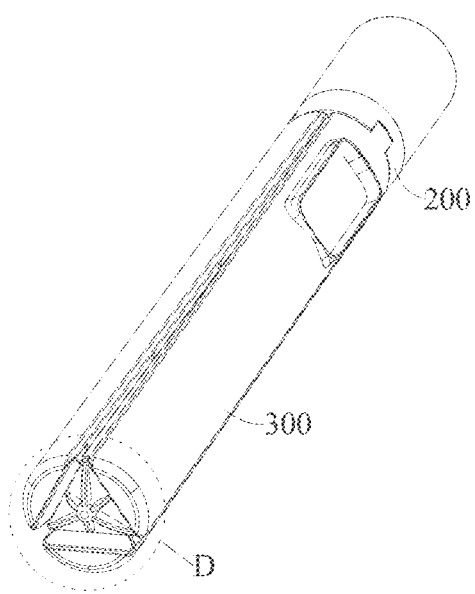
FIG. 38 is a structural schematic view of the multi-legged stand shown in FIG. 29 when the three support leg assemblies are preliminarily opened relative to the support rod assembly, with the preliminary opening member in a third position.
Figure 39:
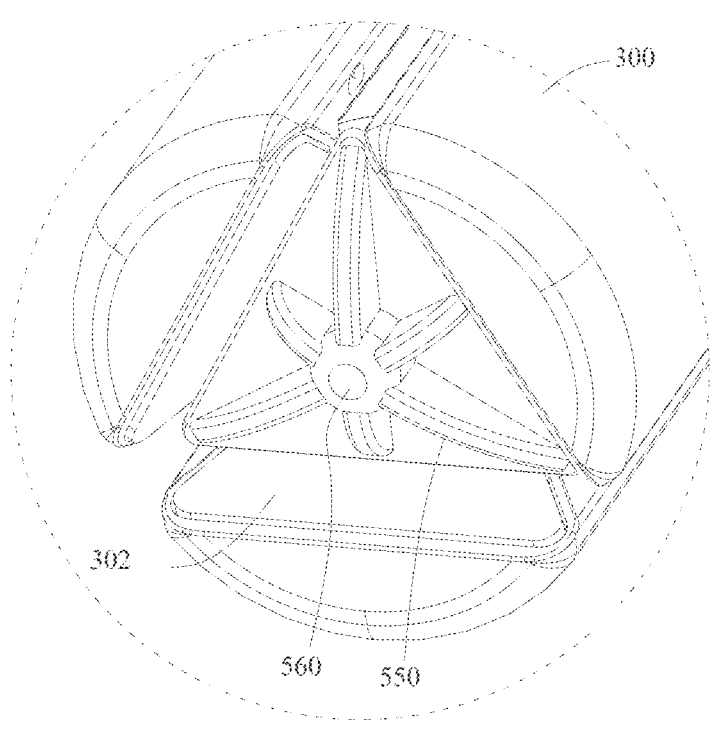
FIG. 39 is an enlarged view of the structure at position D in the multi-legged stand shown in FIG. 38.
Figure 40:
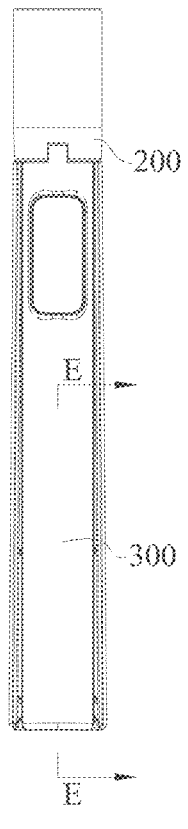
FIG. 40 is a front view of the multi-legged stand shown in FIG. 38 in a certain direction.
Figure 41:
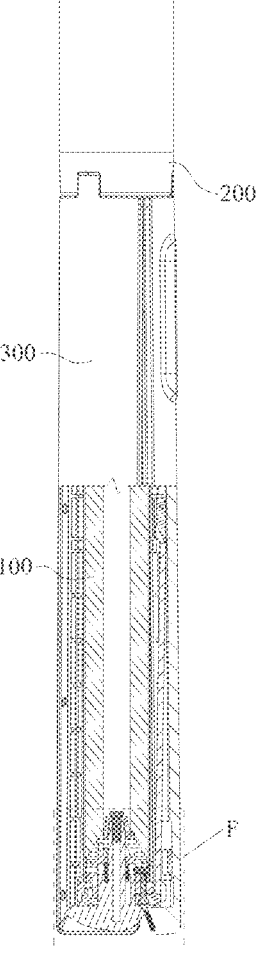
FIG. 41 is a partial cross-sectional view of the multi-legged stand shown in FIG. 40 along an E-E line.
Figure 42:
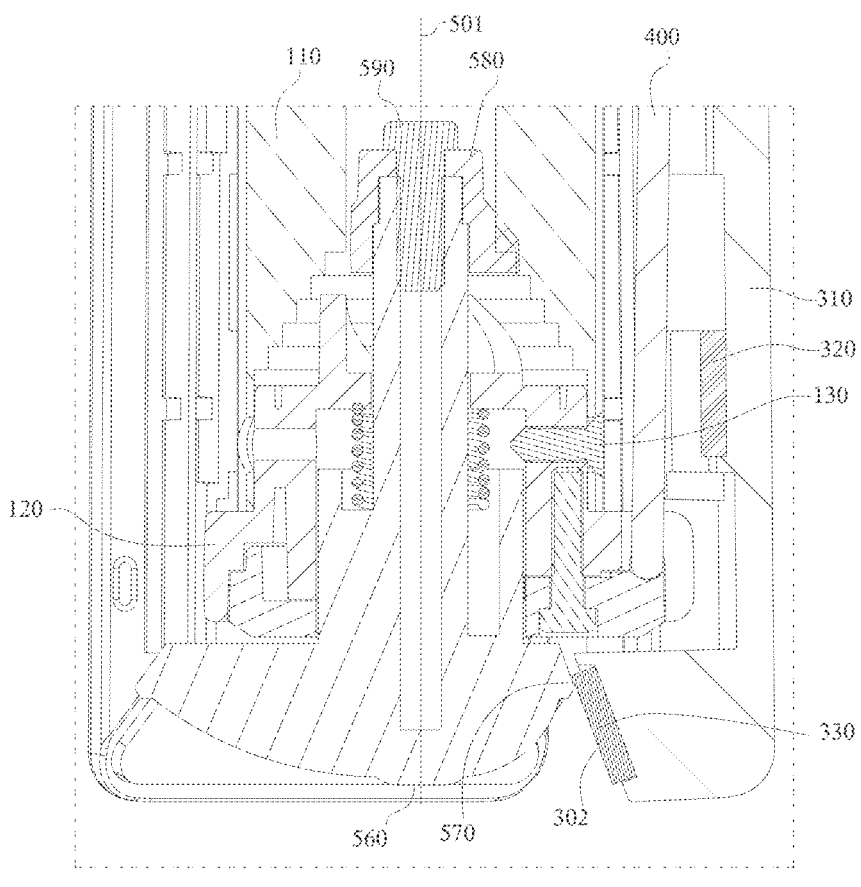
FIG. 42 is an enlarged view of the structure at position F in the structure shown in FIG. 41.
Figure 43:
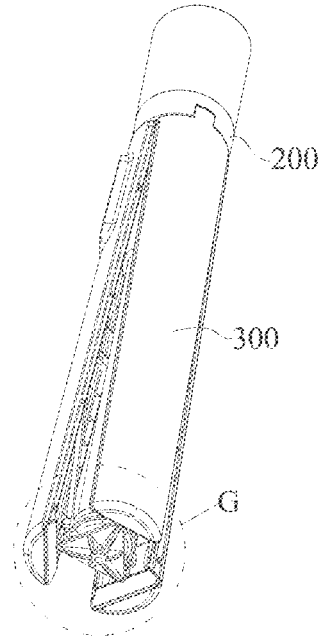
FIG. 43 is a structural schematic view of the multi-legged stand shown in FIG. 29 when the three support leg assemblies are preliminarily opened relative to the support rod assembly, with the preliminarily opening member in a second position.

In some embodiments, as shown in FIGS. 36 and 37, the support rod assembly 100 defines a mounting cavity 101, and the preliminary opening member 500 slidably mates with the mounting cavity 101 of the support rod assembly 100; or, the preliminary opening member 500 defines a mounting cavity 101, and the support rod assembly 100 mates with the mounting cavity 101 of the preliminary opening member 500.

Specifically, when the preliminary opening member 500 slides relative to the support rod assembly 100, the second external action includes a force acting on the preliminary opening member 500 along the first direction. Applying the force to the preliminary opening member 500 causes it to translate along the first direction relative to the support rod assembly 100.

It should be understood that the initial position of the preliminary opening member 500 may refer to a specific position or a range position; the third position of the preliminary opening member 500 may refer to a specific position or a range position. For example, any position that allows the support leg assembly 300 to be in the preliminarily opened state may be considered the third position of the preliminary opening member 500.

It should be understood that the translational direction of the preliminary opening member 500 may be along the first direction, or the translational direction of the preliminary opening member 500 may be in an opposite direction of the first direction.

In some embodiments, the second external action includes a force acting on the preliminary opening member 500 and along the first direction. It can be understood that applying the force in the first direction to the preliminary opening member 500 causes the preliminary opening member 500 to translational move from the initial position to the third position, thereby causing the contact-push portion 570 to push the corresponding support leg assembly 300 such that the at least three support leg assemblies 300 are folded relative to the support rod assembly 100 and become preliminarily opened relative to the support rod assembly 100.

It should be understood that the second external action may be entirely a force acting on the preliminary opening member 500 and along the first direction; or, a component force of the second external action is a force acting on the preliminary opening member 500 and along the first direction. More specifically, the force is a thrust directed toward the support rod assembly 100. The user can press the preliminary opening member 500 by hand, or the preliminary opening member 500 can collide with the support surface to achieve pressing of the preliminary opening member 500. The force may otherwise be a pulling force away from the support rod assembly 100, for example, the user can pull the preliminary opening member 500. It should be understood that the force must overcome the resistance (which includes a friction resistance between the preliminary opening member 500 and the support rod assembly 100) acting on the preliminary opening member 500, causing the preliminary opening member 500 to translate along the first direction relative to the support rod assembly 100.

For example, the first direction is along the length direction of the support rod assembly 100. For example, the preliminary opening member 500 is arranged on a bottom end of the support rod assembly 100, and the first direction is a direction in which the bottom end of the support rod assembly 100 points toward its top end.

In some embodiments, referring to FIGS. 33, 36, 37, 42, 50, etc., the multi-legged stand further includes a reset spring 610, which acts on the preliminary opening member 500, causing the preliminary opening member 500 to return from the third position to the initial position. It can be understood that the reset spring 610 causes the preliminary opening member 500 to return to the initial position, thereby preventing the preliminary opening member 500 from obstructing the folding of the support leg assemblies 300 relative to the support rod assembly 100, specifically, preventing the contact-push portions 570 of the preliminary opening member 500 from obstructing the folding of the support leg assemblies 300 relative to the support rod assembly 100.

Understandably, during the movement of the preliminary opening member 500 relative to the support rod assembly 100 under the second external action, the resistance experienced by the preliminary opening member 500 further includes the elastic force exerted by the reset spring 610 on the preliminary opening member 500.

For example, when the at least three support leg assemblies 300 are in the preliminarily opened state relative to the support rod assembly 100, the reset spring 610 causes the preliminary opening member 500 to return from the third position to the initial position.

For example, the reset spring 610 may be a cylindrical spring, a tower spring, a torsion spring, etc. In some cases, the reset spring 610 is a cylindrical spring or a tower spring, and the action of the reset spring 610 on the preliminary opening member 500 is a force acting on the preliminary opening member 500 along its translational direction, which force is a tensile force or a compressive force exerted by the reset spring 610 on the preliminary opening member 500.

In some embodiments, referring to FIGS. 33, 36, 37, 42, and 50, the preliminary opening member 500 includes a mounting column 520, and the support rod assembly 100 defines a mounting cavity 101. The mounting column 520 is slidably arranged in the mounting cavity 101, and the at least three contact-push portions 570 are connected to the mounting column 520. The mounting column 520 has a first abutment wall 503, and the support rod assembly 100 has a second abutment wall 102, which is disposed within the mounting cavity 101. The reset spring 610 is a cylindrical spring or a tower spring, with a first end of the reset spring 610 abutting against the first abutment wall 503 and a second end abutting against the second abutment wall 102. During the process of the preliminary opening member 500 translating from the initial position to the third position, the mounting column 520 moves toward the second abutment wall 102, and the reset spring 610 is compressed. It can be understood that the mounting column 520 is slidably arranged in the mounting cavity 101, and the reset spring 610 is a cylindrical spring or a tower spring, enabling the reset spring 610 to be easily compressed and thus not obstructing the translation of the preliminary opening member 500.

For example, the cylindrical spring may be a circular cylindrical spring, a square cylindrical spring, a polygonal cylindrical spring, etc., and the tower spring may be a conical spring, a frustoconical spring, a polygonal tower spring, etc. The force exerted by the reset spring 610 on the preliminary opening member 500 is a force acting on the preliminary opening member 500 along its translational direction, and this force is s thrust exerted by the reset spring 610 on the preliminary opening member 500. It should be understood that the second external action includes a thrust acting on the preliminary opening member 500 along the translational direction.

In some embodiments, as shown in FIGS. 33, 36, 37, 42, and 50, the mounting column 520 defines an accommodation cavity 502, which is in communication with one end of the mounting column 520, and the first abutment wall 503 is disposed in the accommodation cavity 502; the first end of the reset spring 610 is received in the accommodation cavity 502. It can be understood that the first end of the reset spring 610 is received within the accommodation cavity 502, such that the reset spring 610 is at least partially received within the accommodation cavity 502, thereby ensuring a compact overall structure of the multi-legged stand. Furthermore, the first end of the reset spring 610 is received within the accommodation cavity 502, thereby restricting the reset spring 610 to remain within the preliminary opening member 500, ensuring that the reset spring 610 does not bend or disengage from its operational position during extension or retraction.

In some embodiments, referring to FIGS. 33, 36, 37, 42, 50, etc., the preliminary opening member 500 further includes a connecting column 530, which is connected to the mounting column 520, and the reset spring 610 is sleeved on the connecting column 530. The support rod assembly 100 includes a retaining portion 122. When the preliminary opening member 500 is in its initial position, the retaining portion 122 retains the connecting column 530 to prevent the preliminary opening member 500 from separating from the support rod assembly 100. The preliminary opening member

500 further includes a stop member 580 arranged on the connecting column 530. When the preliminary opening member 500 is in its initial position, the stop member 580 abuts against the retaining portion 122 to enable the retaining portion 122 to retain the connecting column 530. During the process of the preliminary opening member 500 returning from the third position to the initial position, the reset spring 610 acts on the preliminary opening member 500 to cause the stop member 580 to move toward the retaining portion 122. It can be understood that the retaining portion 122 retains the connecting column 530 of the preliminary opening member 500, thereby allowing the preliminary opening member 500 to be arranged in a restricted manner on the support rod assembly 100. This prevents the preliminary opening member 500 from detaching from the support rod assembly 100 under the action of the reset spring 610. The reset spring 610 is sleeved on the connecting column 530, ensuring that the reset spring 610 does not easily bend or disengage from its operational position during extension or folding, and further contributing to a compact structure of the multi-legged stand.

For example, the preliminary opening member 500 further includes a fourth fastener 590, which passes through the stop member 580 and is securely connected to the connecting column 530. The fourth fastener 590 is configured to mount the stop member 580 on the connecting column 530.

For example, the connecting column 530 is slidably arranged on the support rod assembly, which defines a through hole 103. The connecting column 530 is slidably arranged in the through hole 103 of the support rod assembly, enabling the preliminary opening member to be slidably arranged on the support rod assembly.

In some embodiments, referring to FIGS. 33, 36, 37, 42, 50, etc., when the preliminary opening member 500 is in its initial position, the connecting column 530 directly or indirectly abuts against the retaining portion 122.

In some embodiments, referring to FIGS. 33, 36, 37, 42, and 50, the mounting column 520 defines an accommodation cavity 502, which is in communication with one end of the mounting column 520, and the first abutment wall 503 is disposed within the accommodation cavity 502; the first end of the reset spring 610 is received within the accommodation cavity 502. An end of the connecting column 530 is received within the accommodation cavity 502. It can be understood that one end of the connecting column 530 is received within the accommodation cavity 502, the first abutment wall 503 is disposed within the accommodation cavity 502, and the first end of the reset spring 610 is received within the accommodation cavity 502, thereby ensuring a compact structure of the multi-legged stand. The first end of the reset spring 610 is received in the accommodation cavity 502, ensuring that the reset spring 610 does not easily bend or disengage from its operational position during extension or retraction.

Specifically, the mounting member 120 defines a through hole 103, and the connecting column 530 is slidably arranged in the through hole 103 of the support rod assembly 100, enabling the preliminary opening member 500 to be slidably arranged on the support rod assembly 100.

In some embodiments, referring to FIGS. 33, 36, 37, 42, and 50, the mounting column 520 defines an accommodation cavity 502, which is in communication with one end of the mounting column 520, and the first abutment wall 503 is disposed in the accommodation cavity 502; the first end of the reset spring 610 is received in the accommodation cavity 502. The preliminary opening member 500 further includes a connecting column 530, which is connected to the mounting column 520. An end of the connecting column 530 is received within the accommodation cavity 502, and the reset spring 610 is sleeved on the connecting column 530. The mounting member 120 includes a retaining portion 122. When the preliminary opening member 500 is in its initial position, the retaining portion 122 retains the connecting column 530. The preliminary opening member 500 further includes a stop member 580 arranged on the connecting column 530. When the preliminary opening member 500 is in its initial position, the stop member 580 abuts against the retaining portion 122 to achieve the retaining portion 122 retaining the connecting column 530. During the process of the preliminary opening member 500 returning from the third position to the initial position, the reset spring 610 acts on the preliminary opening member 500 to cause the stop member 580 to move toward the retaining portion 122.

Specifically, the mounting cavity 101 is in communication with the mounting portion 123, and the retaining portion 122 is disposed on the mounting portion 123. The second fastener 130 passes through the support rod body 110 and is securely connected to a first mounting sub-member 120*a* of the mounting member 120.

In some embodiments, referring to FIGS. 33, 36, 37, 42, 50, etc., the preliminary opening member 500 includes a pressure-applying portion 560, and the second external action includes a force acting on the preliminary opening member 500 and along the first direction. Applying pressure to the pressure-applying portion 560 along the first direction causes the preliminary opening member 500 to translate along the first direction relative to the support rod assembly 100, thereby translating the preliminary opening member 500 from the initial position to the third position. It can be understood that the user applies pressure to the pressure-applying portion 560, allowing the user to rotate the preliminary opening member 500 relative to the support rod assembly 100 by pressing, thereby preliminarily opening the support leg assembly 300 relative to the support rod assembly 100, thus facilitating the use of the multi-legged stand. For example, the user presses the pressure-applying portion 560 with his/her hand, or the user strikes the support surface to apply pressure to the preliminary opening member 500.

For example, the at least three adjustment plates 550 are connected to the pressure-applying portion 560, and the at least three contact-push portions 570 are connected to the pressure-applying portion 560. This configuration enhances the structural strength of the preliminary opening member 500.

In some implementations, referring to FIGS. 33, 36, 37, 42, and 50, the preliminary opening member 500 is arranged on the bottom end of the support rod assembly 100. When the at least three support leg assemblies 300 are folded relative to the support rod assembly 100, the pressure-applying portion 560 protrudes from the bottom end of the support leg assemblies 300. When the at least three support leg assemblies 300 are folded relative to the support rod assembly 100, the pressure-applying portion 560 of the preliminary opening member 500 impacts the support surface, causing the support surface to apply pressure to the pressure-applying portion 560 along the first direction, which causes the preliminary opening member 500 to translate along the first direction relative to the support rod assembly 100, thereby moving the preliminary opening member 500 from its initial position to the third position.

It can be understood that the preliminary opening member 500 is disposed on the bottom end of the support rod assembly 100, and the pressure-applying portion 560 protrudes from the bottom end of the support leg assembly 300, facilitating the collision of the pressure-applying portion 560 of the preliminary opening member 500 with the support surface. By colliding the pressure-applying portion 560 with the support surface, it is relatively easy to apply pressure to the pressure-applying portion 560.

In some embodiments, referring to FIGS. 33, 36, 37, 42, and 50, the preliminary opening member 500 includes a pressure-applying portion 560, and the second external action includes a force acting on the preliminary opening member 500 along the first direction, applying pressure to the pressure-applying portion 560 along the first direction to cause the preliminary opening member 500 to translate relative to the support rod assembly 100 along the first direction, thereby causing the preliminary opening member 500 to move from the initial position to the third position. D During the process where the at least three support leg assemblies 300 are switched from the folded state relative to the support rod assembly 100 into the preliminarily opened state relative to the support rod assembly 100, the sliding sleeve assembly 200 slides along the second direction. When the at least three support leg assemblies 300 are folded relative to the support rod assembly 100 and the second direction is along the direction of gravity, the pressure-applying portion 560 of the preliminary opening member 500 collides with the support surface along the second direction, causing the preliminary opening member 500 to translate to the support rod assembly 100 along the first direction, thereby causing the at least three support leg assemblies 300 to be preliminarily opened relative to the support rod assembly 100. After the pressure-applying portion of the preliminary opening member 500 collides with the support surface along the second direction and the second direction is along the direction of gravity to cause the at least three support leg assemblies 300 to be preliminarily opened relative to the support rod assembly 100, the self-weight and inertial effect of the movable component cause the at least three support leg assemblies 300 to be splayed relative to the support rod assembly 100. The movable component includes the sliding sleeve assembly 200, the at least three support leg assemblies 300, and the at least three connecting rods 400. It can be understood that the self-weight and inertial effects of the movable component cause the at least three support leg assemblies 300 to "automatically" splay, thereby facilitating the use of the multi-legged stand.

It can be understood that when the pressure-applying portion 560 of the preliminary opening member 500 collides with the support surface along the second direction, the inertial effect of the movable component still maintains it moving along the second direction.

Since the second direction is along the direction of gravity, the self-weight of the movable component includes at least the self-weight of the sliding sleeve assembly 200, and the multi-legged stand collides with the support surface along the second direction, thus the inertial effect of the movable component includes at least the inertial effect of the sliding sleeve assembly 200. During the process where the at least three support leg assemblies 300 are switched from being preliminarily opened relative to the support rod assembly 100 to being splayed, the sliding sleeve assembly 200 slides along the second direction under the inertial effect, causing the center of gravity of the sliding sleeve assembly 200 to descend, thereby causing the support leg assemblies 300 to be splayed relative to the support rod assembly 100. In some cases, the self-weight of the movable component further includes the self-weight of the support leg assemblies 300 and the self-weight of the connecting rod 400, and the inertial effect of the movable component also includes the inertial effect of the support leg assemblies 300 and the inertial effect of the connecting rods 400. During the process where the at least three support leg assemblies 300 are switched from being preliminarily opened relative to the support rod assembly 100 to being splayed, the movable component slides along the second direction under its own weight effect and inertial effect, causing the center of gravity of the sliding sleeve assembly 200 to descend. Under its own weight effect and inertial effect, one end of the support leg assembly 300 slides with the sliding sleeve assembly 200, while the other end is splayed relative to the support rod assembly 100, and the center of gravity of the support leg assembly 300 descends. The connecting rod 400, under its own weight effect and inertial effect, is switched from its preliminarily opened state relative to the support rod assembly 100 to the splayed state, and the center of gravity of the connecting rod 400 descends, thereby causing the at least three support leg assemblies 300 to be splayed relative to the support rod assembly 100.

In some embodiments, refer to FIGS. 33, 36, 37, 42, 50, etc., the support leg assembly 300 includes a contact surface 302. During the translation of the preliminary opening member 500 along the first direction, the contact-push portion 570 comes into contact with the contact surface 302 of the corresponding support leg assembly 300, where the angle between the external normal direction of the contact surface 302 and the first direction is greater than 90°, thereby promoting the preliminary opening of the support leg assembly 300 relative to the support rod assembly 100. The angle between the external normal direction of the contact surface 302 and the first direction is greater than 90°, such that during the translation of the preliminary opening member 500 along the first direction, the contact-push portion 570 pushes against the contact surface 302, thereby promoting the preliminary opening of the support leg assembly 300 relative to the support rod assembly 100. For example, the contact surface 302 may be a flat surface or a curved surface.

Specifically, when the at least three support leg assemblies 300 are splayed to their maximum splayed state relative to the support rod assembly 100 and the at least three support leg assemblies 300 stand on the support surface, the contact surfaces 302 are in contact with the support surface. More specifically, the support leg assembly 300 includes an anti-slip pad 330 and a support leg body 310, with the anti-slip pad 330 disposed on the bottom end of the support leg body 310, and the contact surface 302 disposed on the anti-slip pad 330.

In some embodiments, referring to FIGS. 33, 36, 37, 42, 47, and 50, the second external action includes a rotational torque acting on the preliminary opening member 500 and around the rotational axis 501; it can be understood that the number of the actuating portions 540 is the same as the number of the contact-push portions 570.

Specifically, the at least three actuating portions 540 are arranged in an alternating pattern with the at least three contact-push portions 570, with each actuating portion 540 located between two adjacent contact-push portions 570, and each contact-push portion 570 located between two adjacent actuating portions 540.

Figure 34:
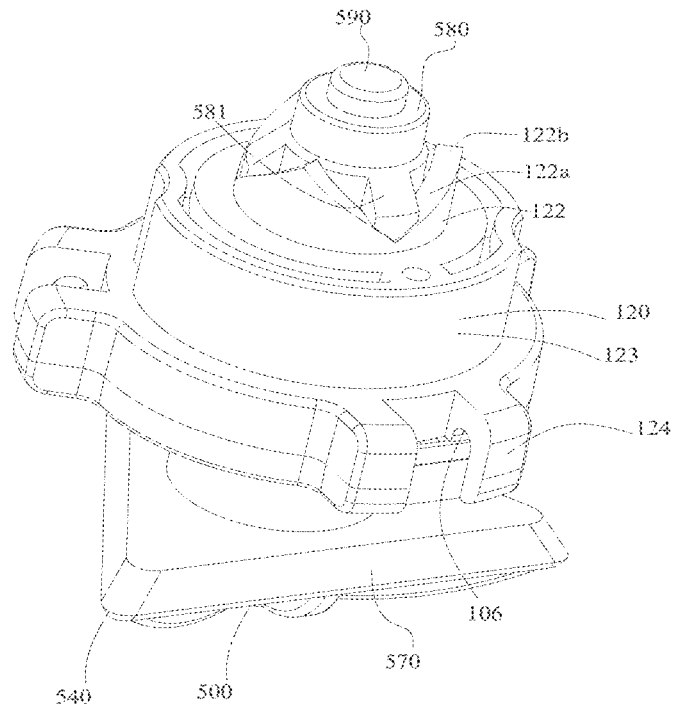
FIG. 34 is a schematic view of the cooperation between a preliminary opening member, a mounting member, and other structures in the multi-legged stand shown in FIG. 29.
Figure 35:
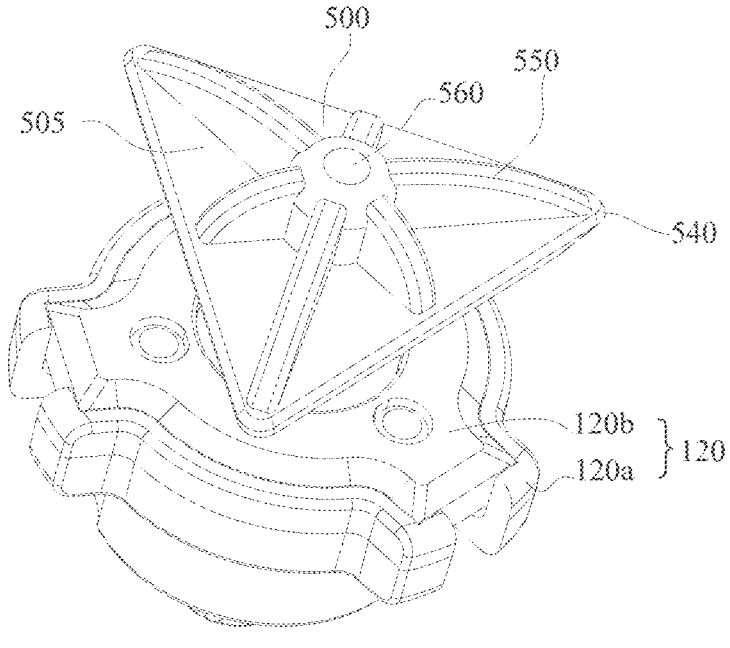
FIG. 35 is a schematic view of the structure shown in FIG. 34 at another viewing angle.

In some embodiments, referring to FIGS. 34 and 37, during the rotation of the preliminary opening member 500 relative to the support rod assembly 100, the preliminary opening member 500 can remain in any one of at least three holding positions, with the number of the holding positions being the same as the number of the support leg assemblies 300. Any one of the at least three holding positions is the initial position, and the holding position adjacent to the initial position is the second position.

It should be understood that any one of the at least three holding positions is the initial position, meaning that the preliminary opening member 500 is equivalent to being in the initial position when in any one of the holding positions. The preliminary opening member 500 can rotate to cause the actuating portion 540 to actuate the corresponding support leg assembly 300, or the preliminary opening member 500 can translate in the first direction to cause the contact-push portion 570 to push the corresponding support leg assembly 300.

It can be understood that when the preliminary opening member 500 is in different corresponding holding positions, the support leg assembly 300 corresponding to the actuating portion 540 of the preliminary opening member 500 is different, and the support leg assembly 300 corresponding to the contact-push portion 570 of the preliminary opening member 500 is different.

For example, the number of the support leg assemblies 300 is 3, 4, 5, etc., and the number of the holding positions is 3, 4, 5, etc.

It can be understood that the holding position may refer to a specific position or a range position. During the rotation of the preliminary opening member 500 relative to the support rod assembly 100, the preliminary opening member 500 remains at the holding position without any external action being applied to it; or, during the rotation of the preliminary opening member 500 relative to the support rod assembly 100, when the rotational torque of the second external action is less than the holding torque of the preliminary opening member 500, the preliminary opening member 500 remains at the holding position.

In some embodiments, referring to FIGS. 34 and 37, the multi-legged stand further includes a reset spring 610, which acts on the preliminary opening member 500. The preliminary opening member 500 includes a first snap-fitting portion 581, and the support rod assembly 100 includes a second snap-fitting portion 122a. The first snap-fitting portion 581 is retained at different positions of the second snap-fitting portion 122a to keep the preliminary opening member 500 at different holding positions. When the second external action is applied to the preliminary opening member 500 to rotate it relative to the support rod assembly 100, the preliminary opening member 500 slides relative to the support rod assembly 100 while the reset spring 610 extends or contracts, causing the first snap-fitting portion 581 to disengage or engage with the second snap-fitting portion 122a. When the preliminary opening member 500 stops rotating relative to the support rod assembly 100, the reset spring 610 acts on the preliminary opening member 500 to cause the first snap-fitting portion 581 to be snap-fitted with the second snap-fitting portion 122a, and the reset spring 610 causes the preliminary opening member 500 to return to its initial position.

It can be understood that the reset spring 610, on the one hand, causes the first snap-fitting portion 581 to be snap-fitted with the second snap-fitting portion 122a, and on the other hand, the extension and contraction deformation of the reset spring 610 further facilitates the first snap-fitting portion 581 to disengage from the second snap-fitting portion 122a. During the process of the first snap-fitting portion 581 being snap-fitted with the second snap-fitting portion 122a or during the process of the first snap-fitting portion 581 disengaging from the second snap-fitting portion 122a, the reset spring 610 undergoes compressible deformation.

The multiple functions of the reset spring 610 contribute to the compact structure of the multi-legged stand.

It is understood that the first snap-fitting portion 581 can be retained on at least three positions on the second snap-fitting portion 122*a*, enabling the preliminary opening member 500 to be maintained at the at least three holding positions.

For example, the first snap-fitting portion 581 is disposed on the stop member 580 of the preliminary opening member 500, and the second snap-fitting portion 122*a* is disposed on the mounting member 120 of the support rod assembly 100, more specifically, the second snap-fitting portion 122*a* is disposed on a second mounting sub-member 120*b* of the mounting member 120.

In some embodiments, referring to FIGS. 34 and 37, the first snap-fitting portion 581 includes at least one first snap-fitting protrusion, and the second snap-fitting portion 122*a* includes at least three second snap-fitting grooves. At least one first snap-fitting protrusion can be retained in different second snap-fitting grooves to retain the first snap-fitting portion 581 at different positions of the second snap-fitting portion 122*a*. The second snap-fitting groove is open-sided, with its cross-section reducing from the top end to the bottom end, to facilitate the disengagement of the first snap-fitting protrusion from the second snap-fitting groove during the rotation of the preliminary opening member 500 relative to the support rod assembly 100. During the rotation of the preliminary opening member 500 relative to the support rod assembly 100, causing the first snap-fitting protrusion to disengage from the second snap-fitting groove, the first snap-fitting protrusion slides past an inner wall of the second snap-fitting groove. When the preliminary opening member 500 stops rotating relative to the support rod assembly 100, the reset spring 610 acts on the preliminary opening member 500 to cause the at least one first snap-fitting protrusion to engage with a corresponding second snap-fitting groove.

It can be understood that the second snap-fitting groove is open-sided, with its cross-section reducing from the top end to the bottom end, facilitating the disengagement of the first snap-fitting protrusion from the second snap-fitting groove during the process of applying the second external action to the preliminary opening member 500 to rotate the preliminary opening member 500 relative to the support rod assembly 100.

For example, the second snap-fitting groove is V-shaped.

In other embodiments, the first snap-fitting portion 581 includes at least three first snap-fitting grooves, and the second snap-fitting portion 122*a* includes at least one second snap-fitting protrusion, with the at least one second snap-fitting protrusion being retained in different first snap-fitting grooves to retain the first snap-fitting portion 581 at different positions on the second snap-fitting portion 122*a*. The first snap-fitting groove is open-sided, with its cross-section reducing from the top end to the bottom end. During the process of applying the second external action to the preliminary opening member 500 to cause the preliminary opening member 500 to rotate relative to the support rod assembly 100, the second snap-fitting protrusion slides past an inner wall of the first snap-fitting groove. Understandably, the first snap-fitting groove is open-sided, with its cross-section reducing from the top end to the bottom end, to facilitate the second card-holding protrusion disengaging from the first snap-fitting groove during the process of applying the second external action to the preliminary opening member 500 to rotate the preliminary opening member 500 relative to the support rod assembly 100.

During the rotation of the preliminary opening member 500 relative to the support rod assembly 100, causing the second snap-fitting protrusion to disengage from the first snap-fitting groove, the second snap-fitting protrusion slides past the inner wall of the first snap-fitting groove. When the preliminary opening member 500 stops rotating relative to the support rod assembly 100, the reset spring 610 acts on the preliminary opening member 500 to cause the at least one second snap-fitting protrusion to engage with a corresponding first snap-fitting groove. For example, the first snap-fitting groove is V-shaped.

In some embodiments, referring to FIGS. 34 and 37, the support rod assembly 100 includes at least three partitioning protrusions 122*b*, and the at least three partitioning protrusions 122*b* are arranged in an alternating pattern with the at least three second snap-fitting grooves; a space between adjacent partitioning protrusions 122*b* is a corresponding second snap-fitting groove. The partitioning protrusion 122*b* gradually narrows along the first direction, and a first side portion 581*a* of the first snap-fitting protrusion gradually narrows in the opposite direction of the first direction, to facilitate the at least one first snap-fitting protrusion engaging with a corresponding second snap-fitting groove when the preliminary opening member 500 stops rotating relative to the support rod assembly 100. The first side portion 581*a* of the first snap-fitting protrusion is disposed on a side of the first snap-fitting protrusion adjacent to a corresponding partitioning protrusion 122*b*.

It can be understood that the partitioning protrusion 122*b* and the first side portion of the first snap-fitting protrusion both gradually taper, facilitating the insertion of the first snap-fitting protrusion into the second snap-fitting groove. It can be understood that the inner wall of the second snap-fitting groove is located on the partitioning protrusion, and the retaining portion includes the partitioning protrusion 122*b*.

It can be understood that when the preliminary opening member 500 is rotated to any angle relative to the support rod assembly 100, under the action of the reset spring 610, the first snap-fitting protrusion of the preliminary opening member 500 can engage or disengage from the second snap-fitting groove. For example, when the preliminary opening member 500 is rotated to a certain angle, the first snap-fitting protrusion aligns precisely with the second snap-fitting groove, and under the action of the reset spring 610, the first snap-fitting protrusion of the preliminary opening member 500 engages into the second snap-fitting groove. In another example, when the preliminary opening member 500 is rotated to another angle, the second snap-fitting protrusion is not aligned with the second snap-fitting groove, under the action of the reset spring 610, the first snap-fitting protrusion of the preliminary opening member 500 engages into the second snap-fitting groove, and during this process, the preliminary opening member 500 rotates.

In some embodiments, referring to FIGS. 34 and 37, the preliminary opening member 500 includes a stop member 580, and the support rod assembly 100 includes a retaining portion 122. When the preliminary opening member 500 is in its initial position, the retaining portion 122 retains the stop member 580 to prevent the preliminary opening member 500 from separating from the support rod assembly 100. The stop member 580 includes a first snap-fitting portion 581, and the retaining portion 122 includes a second snap-fitting portion 122*a*. The second snap-fitting portion 122*a* retains the first snap-fitting portion 581 to ensure that the retaining portion 122 retains the stop member 580. It can be understood that the first snap-fitting portion 581 and the second snap-fitting portion 122*a* are configured both to keep the preliminary opening member 500 in different holding positions and to prevent the preliminary opening member 500 from disengaging from the support rod assembly 100, thereby making the structure of the multi-legged stand compact.

In some embodiments, referring to FIG. 34, during the rotation of the preliminary opening member 500 relative to the support rod assembly 100, the preliminary opening member 500 can remain in any one of the at least three holding positions, with the number of the holding positions being the same as the number of the support leg assemblies 300. Any one of the at least three holding positions is the initial position.

It should be understood that any one of the at least three holding positions is the initial position, meaning that the preliminary opening member 500 is equivalent to being in the initial position when in any one of the holding positions, and the preliminary opening member 500 translates in the first direction to cause the contact-push portion 570 to push its corresponding support leg assembly 300.

Referring to FIGS. 29-55, the present disclosure further provides a usage method of a multi-legged stand, the method including:

providing the multi-legged stand; where the at least three support leg assemblies 300 of the multi-legged stand are folded relative to the support rod assembly 100 of the multi-legged stand, and the preliminary opening member 500 of the multi-legged stand is in the initial position;

applying pressure along the first direction to the preliminary opening member 500 to cause the preliminary opening member 500 to translate along the first direction, thereby causing the at least three support leg assemblies 300 to be preliminarily opened relative to the support rod assembly 100; and causing the at least three support leg assemblies 300 to splay relative to the support rod assembly 100.

It can be understood that the translational of the preliminary opening member 500 in the first direction enables the support leg assemblies 300 to be preliminarily opened, thereby facilitating the splaying of the support leg assemblies 300 relative to the support rod assembly 100.

In some embodiments, during the process where the at least three support leg assemblies 300 are switched from the folded state relative to the support rod assembly 100 into the preliminarily opened state relative to the support rod assembly 100, the sliding sleeve assembly 200 slides along the second direction; the step of causing the at least three support leg assemblies 300 to splay relative to the support rod assembly 100 includes: causing the second direction to be along the direction of gravity, and causing the at least three support leg assemblies 300 to be splayed relative to the support rod assembly 100 under the self-weight of the movable component. The movable component includes the sliding sleeve assembly 200, the at least three support leg assemblies 300, and the at least three connecting rods 400.

In some embodiments, during the process where the at least three support leg assemblies 300 are switched from the folded state relative to the support rod assembly 100 into the preliminarily opened state relative to the support rod assembly 100, the sliding sleeve assembly 200 slides along the second direction; the step of applying pressure to the pressure-applying portion 560 along the first direction to cause the preliminary opening member 500 to translate along the first direction includes that: the pressure-applying portion 560 of the preliminary opening member 500 collides with the support surface along the second direction, causing the preliminary opening member 500 to translate along the first direction relative to the support rod assembly 100 and rotate relative to the support rod assembly 100; the second direction is along the direction of gravity; the step of causing the at least three support leg assemblies 300 to splay relative to the support rod assembly 100 includes: causing the at least three support leg assemblies 300 to splay relative to the support rod assembly 100 under the self-weight and inertial effects of the movable component. The movable component includes the sliding sleeve assembly 200, the at least three support leg assemblies 300, and the at least three connecting rods 400 of the multi-legged stand.

The present disclosure further provides a usage method of a multi-legged stand, the method including:

providing the multi-legged stand; where the at least three support leg assemblies 300 of the multi-legged stand are folded into the support rod assembly 100 of the multi-legged stand, and the preliminary opening member 500 of the multi-legged stand is in an initial position; the preliminary opening member 500 includes a rotational adjustment portion;

a user applying a rotational torque around the rotational axis 501 of the rotational adjustment portion of the preliminary opening member 500, for causing the rotational adjustment portion to rotate around the rotational axis 501 of the preliminary opening member 500, thereby rotating the preliminary opening member 500 from the initial position to a second position, such that the at least three support leg assemblies 300 are preliminarily opened relative to the support rod assembly 100; and causing the at least three support leg assemblies 300 to splay relative to the support rod assembly 100.

It can be understood that the rotation of the preliminary opening member 500 enables the support leg assemblies 300 to be preliminarily opened, thereby facilitating the splaying of the support leg assemblies 300 relative to the support rod assembly 100.

In some embodiments, the number of the support leg assemblies 300 is 3, the number of the actuating portions 540 is 3, and the rotational adjustment assembly includes three adjustment plates 550, with the three adjustment plates 550 being centrally symmetrical around the rotational axis 501 of the preliminary opening member 500; the three adjustment plates 550 are respectively connected to the corresponding three actuating portions 540, and a space between each adjacent adjustment plates 550 is a force application space 505; the user's three fingers are placed in the three force application spaces 505; the step of causing the at least three support leg assemblies 300 to be preliminarily opened relative to the support rod assembly 100 includes: rotating the user's arm to apply a rotational torque around the rotational axis 501 of the preliminary opening member 500, for causing the rotational adjustment portion to rotate around the rotational axis 501 of the preliminary opening member 500, thereby rotating the preliminary opening member 500 from its initial position to a second position, such that the at least three support leg assemblies 300 are preliminarily opened relative to the support rod assembly 100.

In some embodiments, during the process where the at least three support leg assemblies 300 are switched from the folded state relative to the support rod assembly 100 into the preliminarily opened state relative to the support rod assembly 100, the sliding sleeve assembly 200 slides along the second direction; the step of causing the at least three support leg assemblies 300 to splay relative to the support rod assembly 100 includes: causing the second direction to be along the direction of gravity, and causing the at least three support leg assemblies 300 to be splayed relative to the support rod assembly 100 under the self-weight of the movable component. The movable component includes the sliding sleeve assembly 200, the at least three support leg assemblies 300, and the at least three connecting rods 400 of the multi-legged stand.

In other embodiments, referring to FIGS. 56 to 59, the multi-legged stand includes a movable member 522, which is slidable relative to the support rod assembly 100 to cause the preliminary opening member 500 to be subjected to a first external action, thereby rotating the preliminary opening member 500 from the initial position to a second position.

In the embodiments, the connection method between the movable member 522 and the preliminary opening member 500 may be adaptively adjusted and selected based on the sliding position of the movable member 522 relative to the support rod assembly 100. For example, when the movable member 522 slides along its axial direction relative to the support rod assembly 100, the movable member 522 may be in a screw-like engagement with the preliminary opening member 500. When the movable member 522 slides radially relative to the support rod assembly 100, the movable member 522 may form a gear-rack-like structure with the preliminary opening member. The movable member 522 and the preliminary opening member may be connected in other ways, as long as the linear motion of the movable member 522 relative to the support rod assembly 100 can be converted into a peripheral rotational motion of the preliminary opening member. For example, the movable member 522 and the preliminary opening member 500 may form a cam mechanism, a crank-slider mechanism, etc.

The movable member 522 slides relative to the support rod assembly 100 under an external action, either directly or indirectly, to transmit the external action to the preliminary opening member 500 and apply the first external action to cause the preliminary opening member 500 to rotate, thereby rotating the preliminary opening member 500 from the initial position to the second position. For example, the first external action may be applied to the preliminary opening member 500 by directly or indirectly pressing the movable member 522, or by directly or indirectly pushing the movable member 522. When the user directly presses the movable member 522, the movable member 522, which is configured to slide relative to the support rod assembly 100, indirectly pushes the preliminary opening member 500 to rotate. Compared to directly applying the first external action to the preliminary opening member 500 to cause it to rotate, the movable member 522 does not rotate, thereby reducing friction between the movable member 522 and the user's hand. When the user indirectly presses the movable member 522 through an intermediate member, the movable member 522 and the intermediate member do not rotate, reducing friction between the intermediate member and the user's hand. For example, the intermediate member serves as a force-bearing member.

Furthermore, since the movable member 522 and the preliminary opening member 500 are separate structures, the preliminary opening member 500 is not required to move up or down, thereby reducing motion resistance. This makes the operation of pressing or pushing the movable member 522 by the user more effortless and convenient, thereby simplifying the preliminary opening operation of the multi-legged stand.

Furthermore, as shown in FIGS. 58 to 65, the movable member 522 and the support rod assembly 100 are in a sliding engagement along the rotational axis 501 of the preliminary opening member 500, and the movable member 522 and the support rod assembly 100 are in a peripherally limited engagement around the rotational axis. The movable member 522 is in a screw-like engagement with the preliminary opening member 500, such that when the movable member 522 is subjected to a third external action, the preliminary opening member 500 is subjected to the first external action.

For example, the third external action includes a force acting along the rotational axis, e.g., the third external action is solely a force acting along the rotational axis. In other examples, the third external action is a force inclined relative to the rotational axis, with one component force of the third external action being a force acting upward along the rotational axis. The movable member 522 is arranged on the bottom end of the support rod assembly 100.

By providing mutually mating slots and rails on the movable member 522 and the support rod assembly 100 (or, alternatively, by providing mutually mating rails and slots on the movable member 522 and the support rod assembly 100), the movable member 522 and the support rod assembly 100 can be peripherally limited and slidable along the rotational axis. When the movable member 522 is in a screw-like engagement with the preliminary opening member 500, the movable member 522 may specifically be a spiral member, such as a spiral rod or spiral sleeve adapted to the preliminary opening member 500. By allowing the movable member 522 to be spirally engaged with the preliminary opening member 500, the linear motion of the movable member 522 is converted into the peripheral rotational motion of the preliminary opening member 500. Compared to other methods, this fully utilizes the axial space and dimensions of the support rod assembly 200, making the structure between the movable member 522 and the preliminary opening member 500 more compact.

Specifically, mutually mating threads may be provided on the movable member 522 and the preliminary opening member 500 to achieve the screw-like engagement between the movable member 522 and the preliminary opening member 500. For example, the threads on the movable member 522 and the preliminary opening member 500 may be rectangular threads or triangular threads, etc. For example, the movable member 522 is a threaded shaft, and the preliminary opening member 500 is provided with a threaded hole for the threaded shaft to pass through, with the threaded shaft threadedly engaging in the threaded hole; alternatively, the preliminary opening member 500 is arranged with a threaded shaft, and the movable member 522 has a threaded hole threadedly engaging with the threaded shaft. Specifically, the preliminary opening member 500 includes a mating portion 525 and an actuating plate. The actuating plate is connected to one end of the rotating shaft, and at least three corners of the actuating plate form the at least three actuating portions 540. The mating portion 525 defines a threaded hole, and the mating portion 525 is rotatably connected to the bottom end of the support rod assembly 100. The actuating plate is disposed below the support rod assembly 100. The movable member 522 passes through the actuating plate and is spirally engaged with the threaded hole.

For example, the actuating plate has a polygonal structure, and each actuating portion 540 is one of the corners of the polygonal structure, or the at least three actuating portions 540 correspond to at least three corners of the polygonal structure. In other examples, the shape and form of the actuating portion 540 may vary widely, such as a protrusion, a cam flange, etc.

For example, the number of the at least three actuating portions 540 may correspond to the number of the at least three support leg assemblies 300. Of course, the number of the actuating portions 540 may be greater than the number of the support leg assemblies 300.

In some embodiments, referring to FIGS. 56 to 62, the support rod assembly 100 includes a support rod body 110 and a mounting member 120. The mounting member 120 is fixedly connected to the bottom end of the support rod body 110. The movable member 522 is slidably connected to the mounting member 120 along the rotational axis 501. The preliminary opening member 500 is rotatably connected to the mounting member 120. The fixed connection between the mounting member 120 and the support rod body 110 may be achieved in various ways, such as screws, interference fit, or rivets. By providing the mounting member 120 for connecting the preliminary opening member 500 and the movable member 522, the bottom connection structure of the support rod assembly 100 can be formed independently, thereby facilitating the manufacturing of the support rod assembly and reducing manufacturing costs. Additionally, it simplifies the assembly of the preliminary opening member 500 with the support rod body 110. Furthermore, since the support rod body 110 primarily serves a supporting and guiding function, and the mounting member 120 primarily serves a connecting function, the support rod body 110 and the mounting member 120 may be made from different materials. For example, the support rod body 110 may be made from a metallic material to enhance its structural strength and reduce sliding friction with the sliding sleeve assembly 200, while the mounting member 120 may be made from a plastic material to reduce the manufacturing cost of the mounting member 120.

Furthermore, as shown in FIGS. 56 to 59, the multi-legged stand further includes a force-bearing member 526, which is fixedly connected to the movable member 522, and the force-bearing member 526 is arranged with a force-bearing portion for applying the third external action.

For example, the force-bearing portion may be a surface of the force-bearing member, or the force-bearing portion may be a part of the force-bearing member.

In the embodiments, since the movable member 522 is peripherally limited relative to the support rod assembly 100 around the rotational axis 501, when the force-bearing portion is subjected to the third external action, the movable member 522 slides without rotating, thereby driving the preliminary opening member 500 to rotate. The relative position of the force-bearing member 526 and the movable member 522 may be set according to actual requirements.

For example, the force-bearing member 526 is fixedly connected to the bottom end of the movable member 522, and when the at least three support leg assemblies 300 are folded relative to the support rod assembly 100, the force-bearing member is exposed at the bottom ends of the at least three support leg assemblies 300. This arrangement facilitates the user pressing the force-bearing member 526. In this example, the force-bearing portion is the surface of the force-bearing member 526, and the force-bearing portion may be a flat surface, an arc-shaped surface, a spherical surface, etc., which is not specifically limited herein.

In another example, the force-bearing member 526 is fixedly connected to the bottom end of the movable member 522, and when the at least three support leg assemblies 300 are in the folded position, the force-bearing portion protrudes from the bottom ends of the at least three support leg assemblies 300. This arrangement causes the force-bearing portion to protrude outward. The user only needs to grip the multi-legged stand and strike its bottom end against an external object to apply force to the force-bearing portion. Thus, the user can apply the third external action to the force-bearing portion by pressing or striking it, thereby meeting the user's preliminary opening requirements for the multi-legged stand in various usage scenarios. The force-bearing member 526 protrudes from the bottom surface of the support leg assembly 300, making it more convenient for the user to hold the multi-legged stand directly or indirectly and strike the bottom end of the support rod assembly 100 against the external object, thereby indirectly rotating the preliminary opening member 500 from its initial position to the second position.

In some implementations, the preliminary opening member 500 is arranged on the bottom end of the support rod assembly 100, with the force-bearing portion protruding from the bottom end of the preliminary opening member 500 in the initial state. When the at least three support leg assemblies 300 are folded relative to the support rod assembly 100, the force-bearing member 526 is received within a space enclosed by the at least three support leg assemblies 300, and the force-bearing member 526 does not protrude from the bottom ends of the support leg assemblies 300.

In this example, the multi-legged stand occupies a small volume in the folded state, making it more convenient to store and place the multi-legged stand; it further prevents external objects or people from accidentally touching the force-bearing member in the folded state, such as accidentally opening the support leg assembly 300 due to contact with the force-bearing member. For example, when the multi-legged stand is in the stored state, since the force-bearing member 526 does not protrude beyond the bottom end of the support leg assembly 300, the user can more easily grip the bottom ends of the at least three support leg assemblies, making the multi-legged stand more convenient to use.

In this example, the preliminary opening member 500 is arranged on the bottom end of the support rod assembly 100. In the initial state, the force-bearing portion protrudes from the bottom end of the preliminary opening member 500, allowing the user to press the movable member 522 to indirectly rotate the preliminary opening member 500, thereby rotating the preliminary opening member 500 from the initial position to the second position.

In this example, when the user presses the force-bearing portion of the force-bearing member 526, the force-bearing member 526 and the movable member 522 slide toward the sliding sleeve assembly; for example, when the support rod assembly is vertically oriented, pressing the force-bearing portion of the force-bearing member 526 causes the force-bearing member 526 and the movable member 522 to slide upward.

For ease of assembly, the force-bearing member 526 and the movable member 522 may be provided as separate components. In this case, the force-bearing member 526 and the movable member 522 may be fixedly connected via screws, snap-fitting, or other methods. The configuration of the force-bearing member 526 may vary, such as a cylindrical structure or a hemispherical structure, among others, which is not specifically limited herein.

Figure 58:
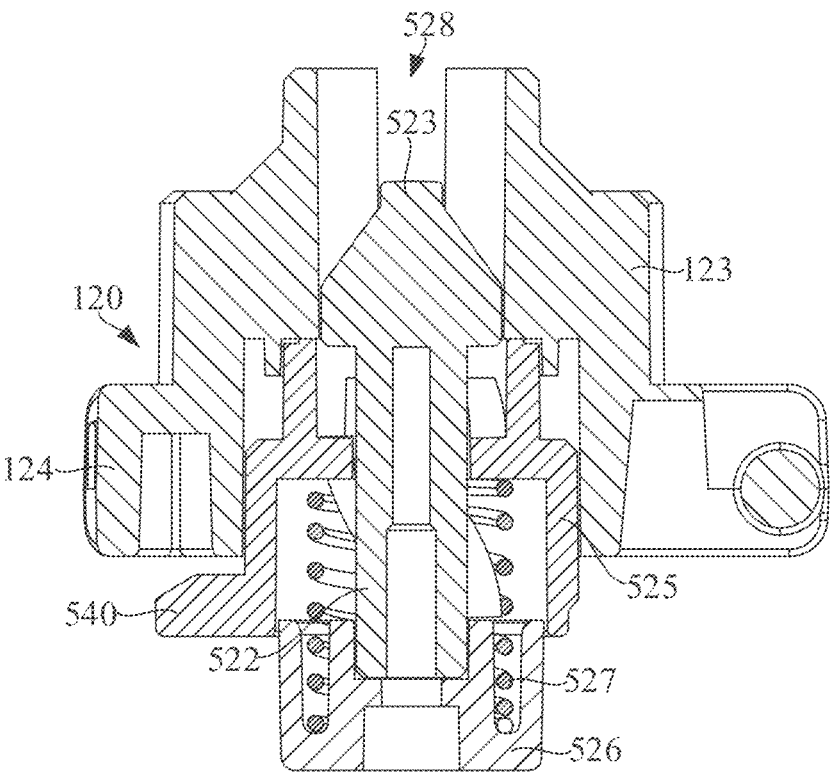
FIG. 58 is a cross-sectional view along an IV-IV line in FIG. 57.
Figure 59:
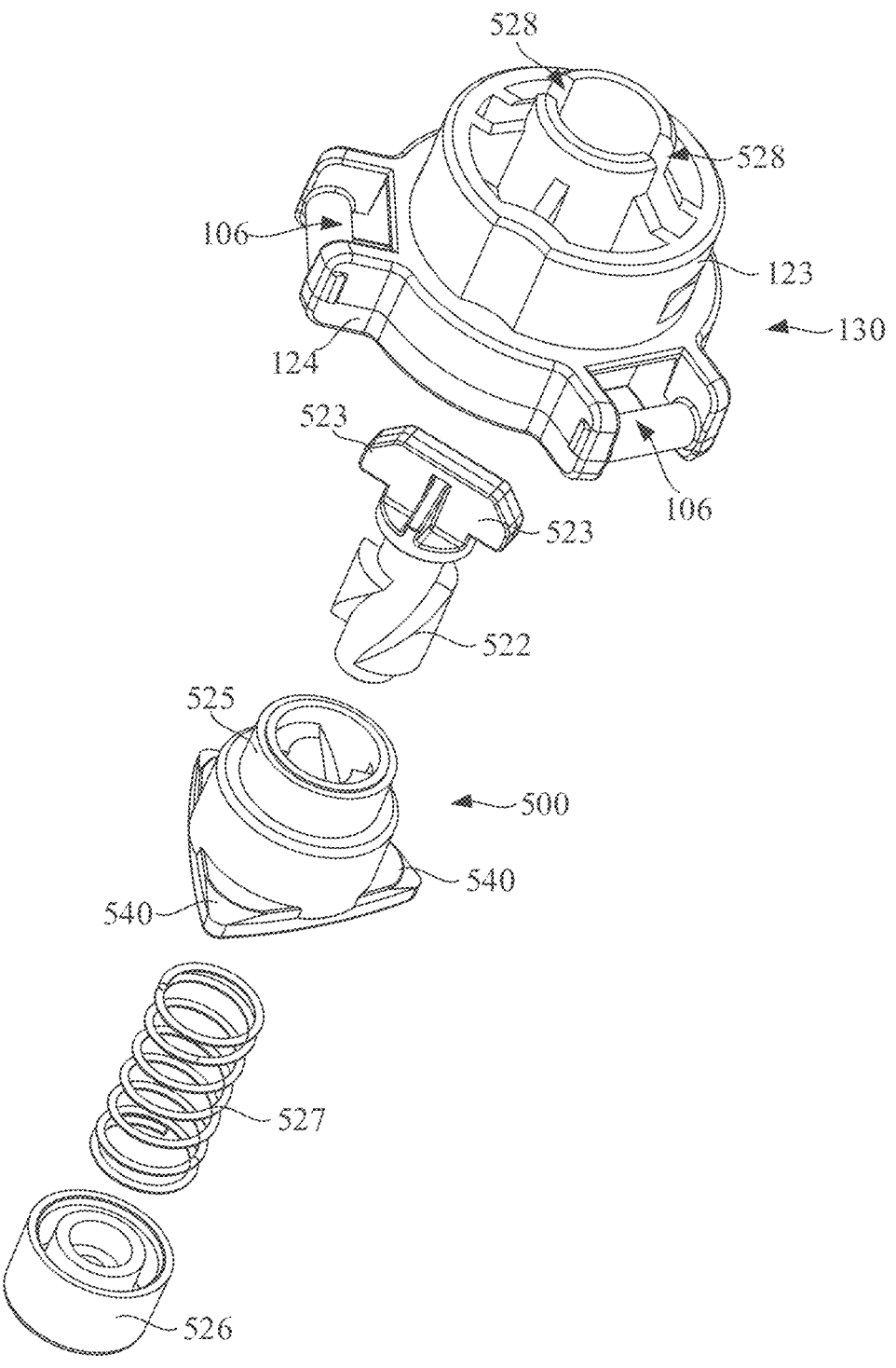
FIG. 59 is an exploded schematic view of the structure shown in FIG. 56.
Figure 60:
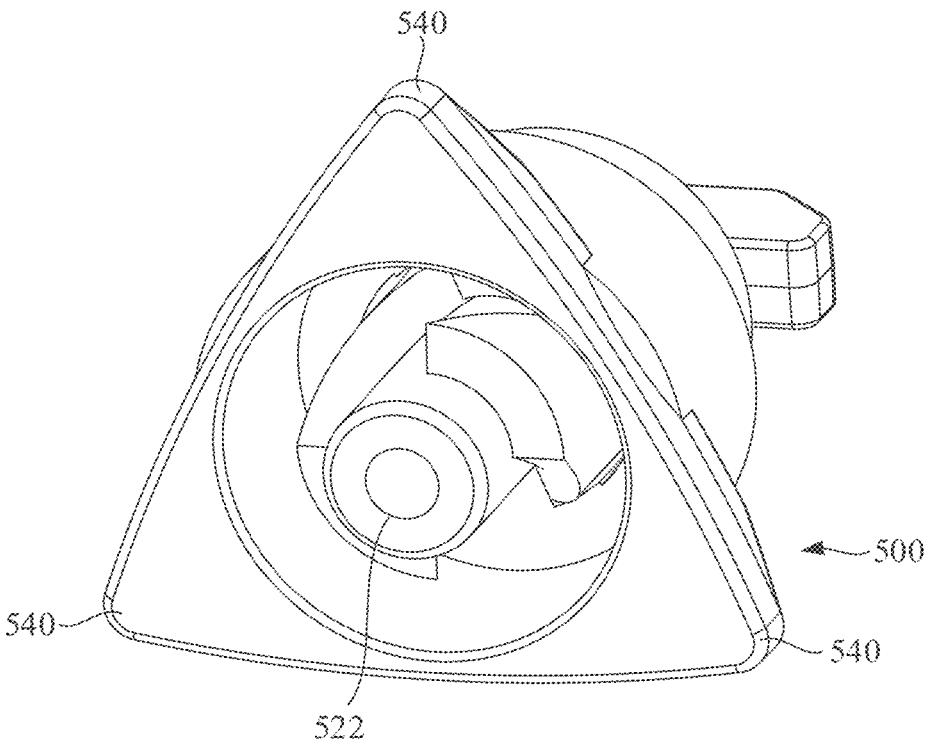
FIG. 60 is a structural schematic view of a preliminary opening member shown in FIG. 56.
Figure 61:
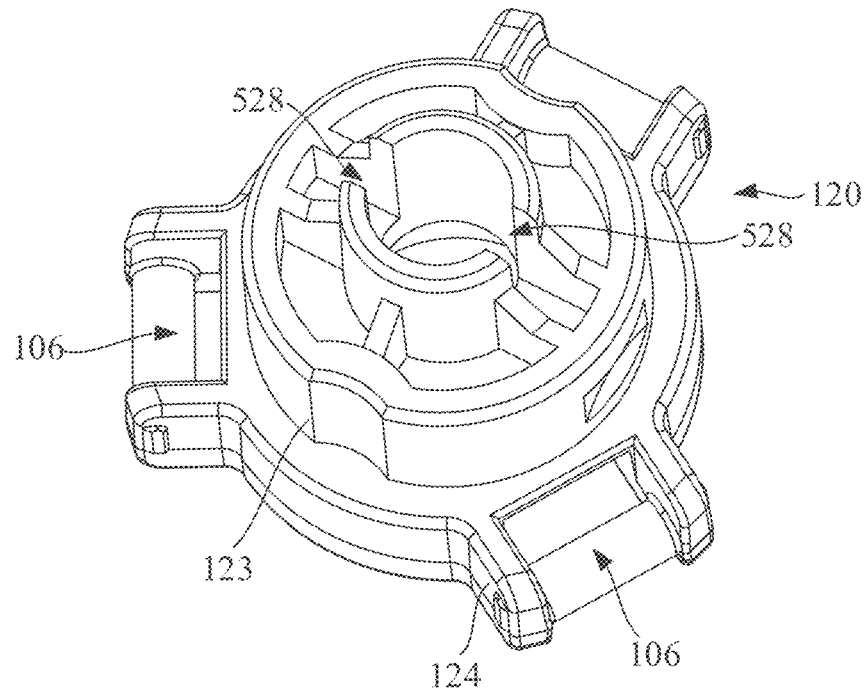
FIG. 61 is a structural schematic view of a mounting member shown in FIG. 56.
Figure 62:
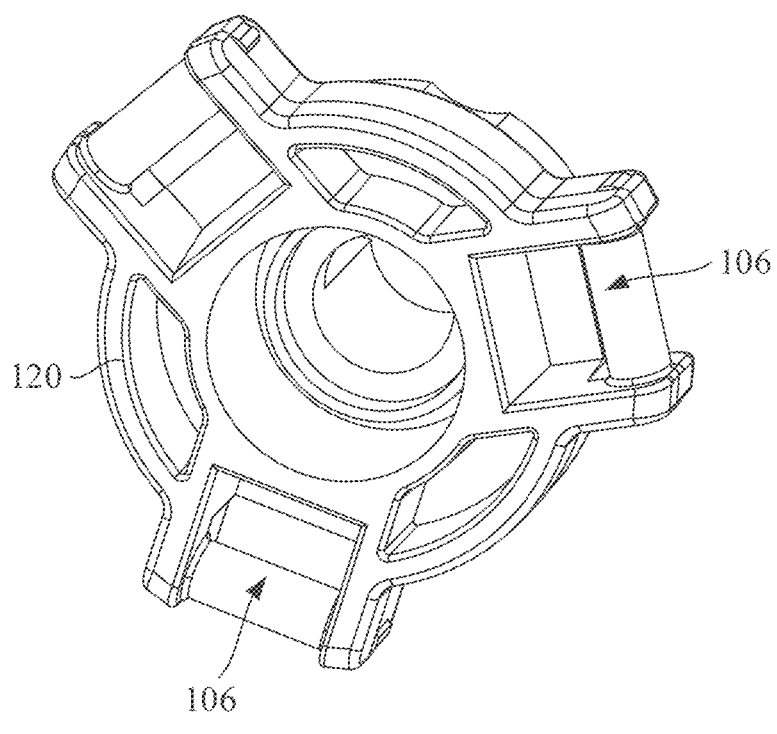
FIG. 62 is a structural schematic view of the mounting member shown in FIG. 61 at another viewing angle.
Figure 63:
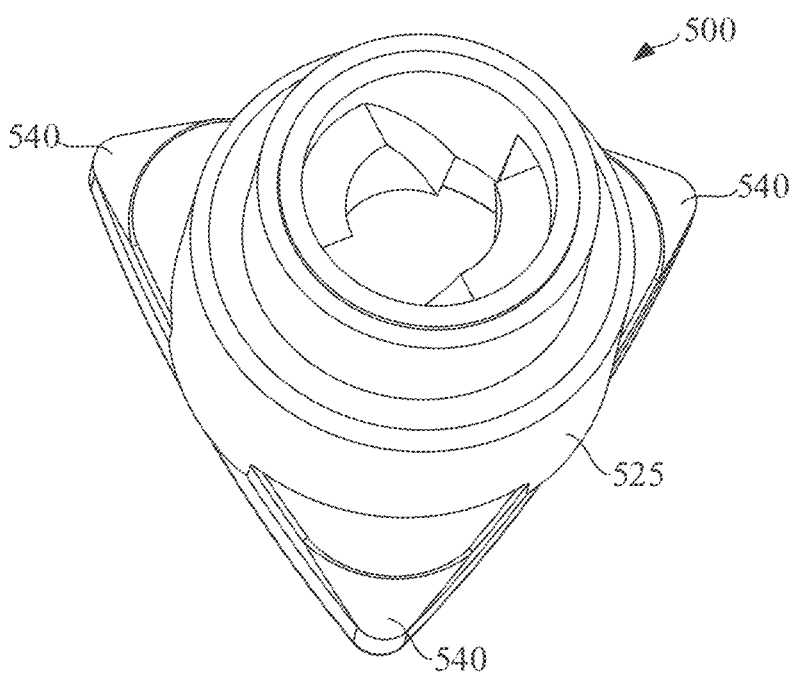
FIG. 63 is a structural schematic view of the preliminary opening member shown in FIG. 60.
Figure 64:
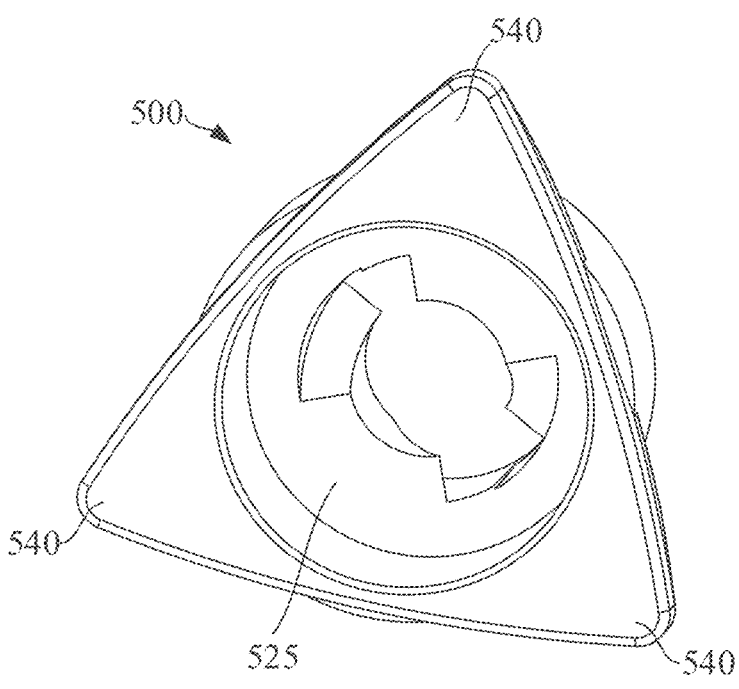
FIG. 64 is a structural schematic view of the preliminary opening member shown in FIG. 63 at another viewing angle.
Figure 65:
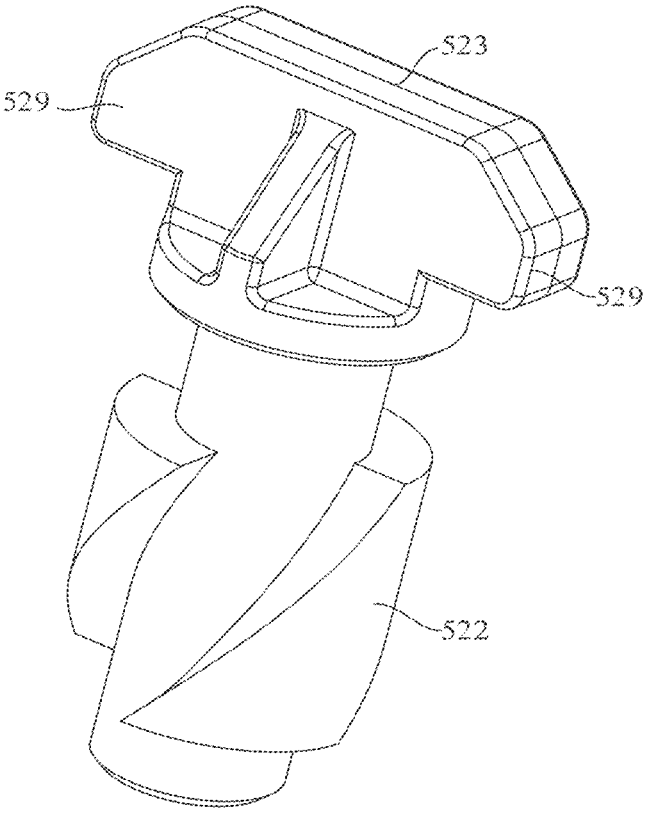
FIG. 65 is a structural schematic view of a movable member shown in FIG. 60.
Figure 66:
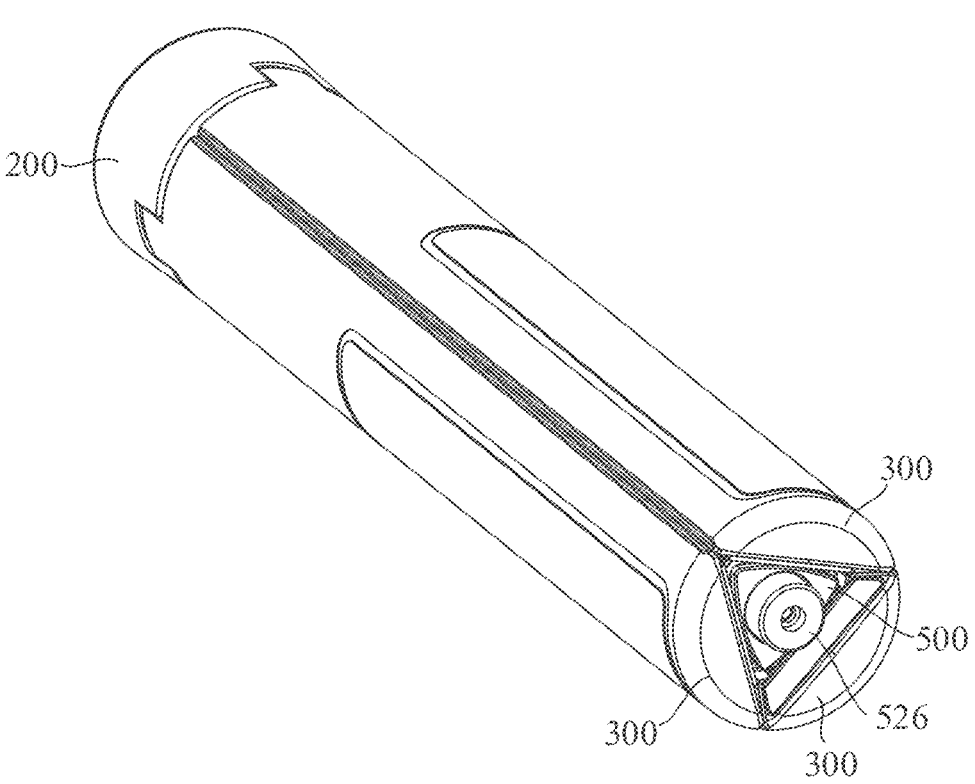
FIG. 66 is a structural schematic view of another embodiment of the multi-legged stand according to the present disclosure, wherein the three support leg assemblies of the multi-legged stand are in a folded state relative to the support rod assembly.
Figure 67:
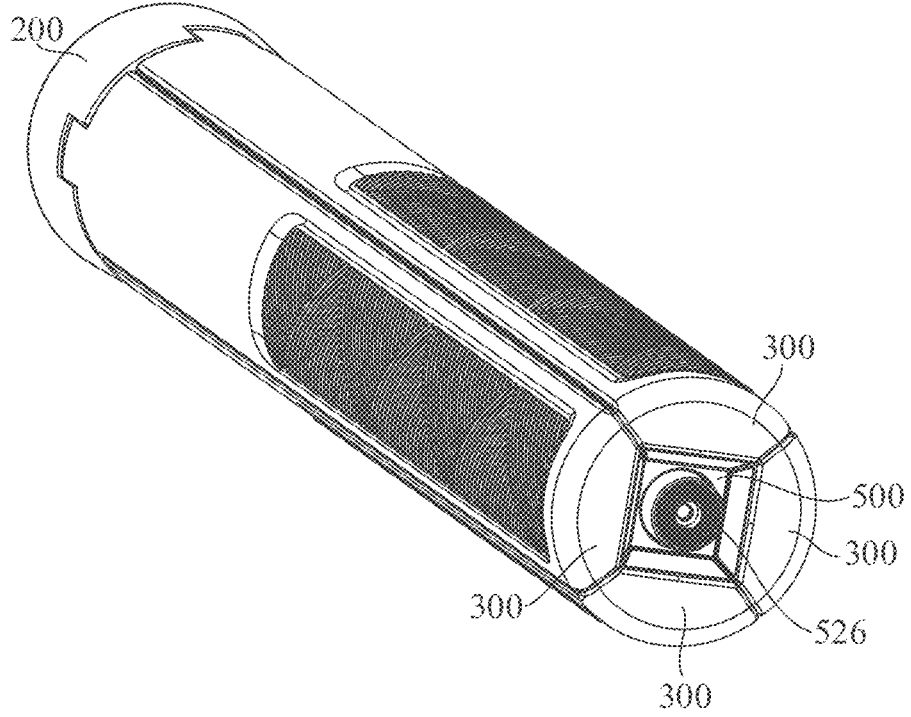
FIG. 67 is a structural schematic view of a multi-legged stand according to still other embodiments of the present disclosure; where four support leg assemblies of the multi-legged stand are in a folded state relative to a support rod assembly.
Figure 68:
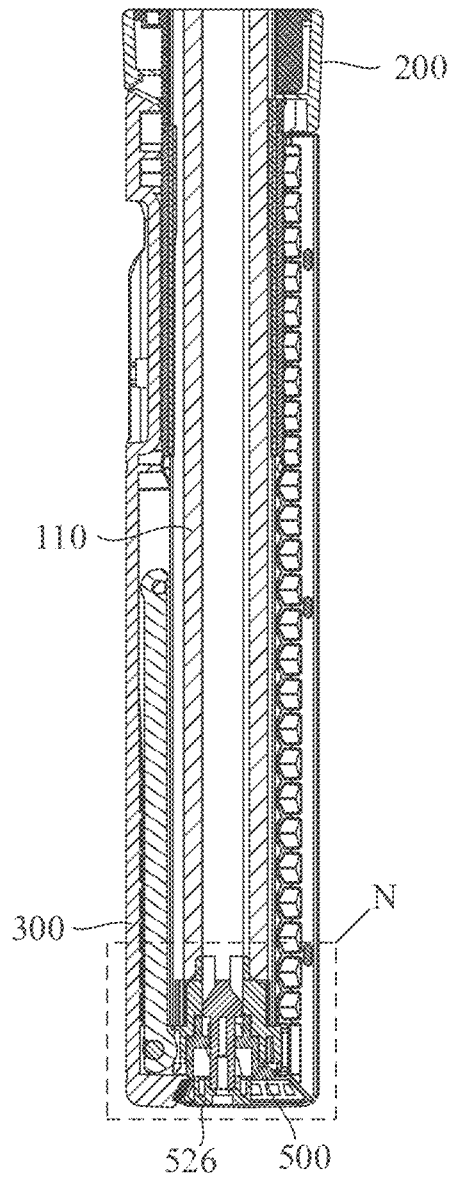
FIG. 68 is a cross-sectional view of the multi-legged stand shown in FIG. 67 along a section line.
Figure 69:
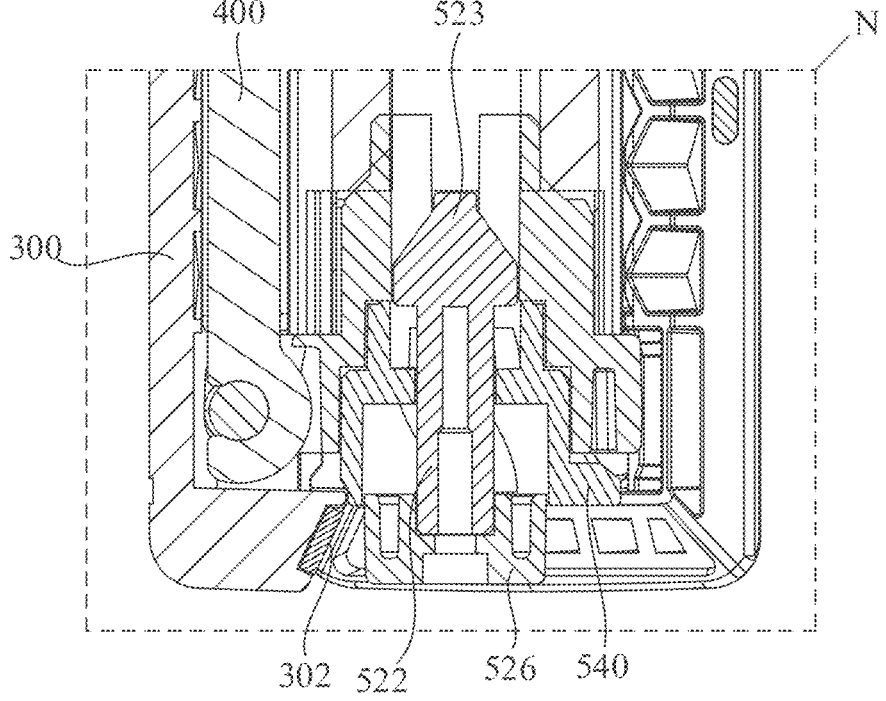
FIG. 69 is an enlarged view of the structure at position N in the support leg assembly as shown in FIG. 68.

In some embodiments, referring to FIGS. 58 and 59, the multi-legged stand further includes an elastic member 527, which is configured to provide an elastic force to the movable member 522 to cause it to return to its original position. When the third external action is removed, the elastic member 527 uses its elastic force to drive the movable member 522 back to its original position, thereby causing the preliminary opening member 500 to return to its initial position.

The elastic member 527 may be a reset spring, such as a compression spring, torsion spring, or conical spring, or it may be a rubber airbag or rubber elastic member, provided that it can provide the elastic force to cause the movable member 522 to return to its original position. By providing the elastic member 527, when the third external action is removed, the movable member 522 can elastically return to its original position, driving the preliminary opening member 500 to automatically return to its initial position without manual reset of the preliminary opening member 500. This prevents the preliminary opening member 500 from obstructing the folding of the support leg assembly 300 relative to the support rod assembly 100. Specifically, it prevents the actuating portion 540 of the preliminary opening member 500 from obstructing the folding of the support leg assembly 300 relative to the support rod assembly 100. It should be understood that the third external action shall be greater than the elastic force exerted by the elastic member 527 on the movable member 522 to allow the movable member 522 to slide relative to the support rod assembly 100.

Furthermore, as shown in FIGS. 58-60 and 63-65, the preliminary opening member 500 further includes a mating portion 525, where the at least three actuating portions 540 are connected to the mating portion 525; the mating portion 525 is rotatably connected to the bottom end of the support rod assembly 100, and the movable member 522 is in a screw-like engagement with the mating portion 525. The elastic member 527 is a reset spring, which is sleeved on the outer periphery of the movable member 522 and sandwiched between the force-bearing member 526 and the mating portion 525.

In the embodiments, the reset spring is sleeved on the outer periphery of the movable member 522 and sandwiched between the force-bearing member 526 and the mating portion 525, thereby making the multi-legged stand more compact and occupying a smaller volume.

In the embodiments, the mating portion 525 may specifically be cylindrical, stepped cylindrical, or columnar in structure. The at least three actuating portions 540 may specifically be angular bosses or protrusions extending outward from the outer peripheral wall of the mating portion 525. To enhance structural strength, in some embodiments, the mating portion 525 and the at least three actuating portions 540 are integrally formed. To ensure the rotational reliability between the mating portion 525 and the support rod assembly 100, specifically, the lower end of the support rod assembly 100 is arranged with a mounting cavity, and the mating portion 525 is rotatably disposed within the mounting cavity. In an embodiment where the support rod assembly 100 includes the mounting member 120, the mounting cavity is arranged on the mounting member 120, and the mating portion 525 rotatably mates with the mounting member 120.

Specifically, the elastic member 527 is sandwiched between the force-bearing member 526 and the mating portion 525, and the elastic recovery direction of the elastic member 527 is set along the extension direction of the rotational axis 501. The elastic member 527 may be adopted with a reset spring, which is elastic, stable, low-cost, and easy to mount. The reset spring may be sandwiched between the force-bearing member 526 and the mating portion 525.

For example, a groove may be defined on the force-bearing member 526, and an abutment wall may be arranged inside the inner cavity of the mating portion 525. One end of the reset spring is embedded in the groove of the force-bearing member 526, and the other end abuts against the abutment wall of the mating portion 525. This arrangement makes the structure between the force-bearing member 526, the movable member 522, the preliminary opening member 500, and the bottom end (mounting member 120) of the support rod assembly 100 more compact and occupies less space.

In other embodiments, the movable member 522 is directly or indirectly subjected to a fourth external action to cause it to reset. For example, the user directly or indirectly pulls the movable member 522 to cause it to reset. In other embodiments, the self-weight of the movable member 522 causes it to return to its original position, or the self-weight of the movable member 522 and the force-bearing member 526 causes the movable member 522 to return to its original position.

Furthermore, referring to FIGS. 58, 59, 61, 65, the movable member 522 includes a guide portion 523, which extends from the top end of the preliminary opening member 500 and is slidably connected to the support rod assembly 100. One of the guide portion 523 and the support rod assembly 100 defines a guide groove 528, while the other is arranged with a protrusion 529 that can be slidably connected to the guide groove 528.

In the embodiments, the guide portion 523 extends outward and is exposed at the top surface of the preliminary opening member to be slidably connected to the bottom end of the support rod assembly 100. The protrusion 529 may be disposed on the outer peripheral wall of the guide portion 523, the guide groove 528 may be defined on the bottom end of the support rod assembly 100; or, the guide groove 528 may be defined on the outer peripheral wall of the guide portion 523, and the protrusion 529 may be disposed on the inner wall of the bottom end of the support rod assembly 100. Through the sliding cooperation between the protrusion 529 and the guide groove 528, the movable member 522 achieves vertical sliding and peripheral positioning cooperation with the support rod assembly 100. That is, the movable member 522 can only slide vertically (in up-down direction) relative to the support rod assembly 100 and cannot rotate. As a result, when the movable member 522 slides vertically, it can drive the preliminary opening member to rotate peripherally. The form and number of the protrusions 529 are not specifically limited. For example, the protrusion 529 may be elongated, or rectangular block-shaped, etc. To ensure guiding stability, for example, the protrusions 529 are provided in at least two, and the multiple protrusions 529 are peripherally spaced around the guide portion 523.

In some embodiments, when the at least three support leg assemblies 300 are splayed relative to the support rod assembly 100, the user can hold the sliding sleeve assembly 200 and lift it, causing the at least three support leg assemblies 300 to be folded relative to the support rod assembly 100.

It can be understood that the user holds the sliding sleeve assembly 200 and lifts the sliding sleeve assembly 200 to fold the support leg assemblies 300 of the multi-legged stand, thereby facilitating the use of the multi-legged stand. During the folding of the support leg assemblies 300, the magnetic attraction member 320 may further promote the folding of the at least three support leg assemblies 300, thereby further facilitating the use of the multi-legged stand.

For example, during the process of lifting the sliding sleeve assembly 200, the multi-legged stand may be suspended in the air or in contact with the support surface.

For example, lifting the sliding sleeve assembly by holding the main cylinder 220 of the sliding sleeve assembly allows the at least three support leg assemblies 300 to be folded relative to the support rod assembly 100.

In some embodiments, when the support leg assemblies 300 are folded relative to the support rod assembly 100, the support leg assemblies 300 are magnetically attracted to the connecting rods 400. During the process of the user holding the sliding sleeve assembly 200 and lifting the sliding sleeve assembly 200 to cause the at least three support leg assemblies 300 to be folded relative to the support rod assembly 100, the magnetic attraction member 320 magnetically attracts the corresponding connecting rod to promote the folding of the at least three support leg assemblies relative to the support rod assembly.

In some embodiments, when the user holds the sliding sleeve assembly 200 and lifts the sliding sleeve assembly 200 such that the at least three support leg assemblies 300 are folded relative to the support rod assembly, the self-weight of the support rod assembly 100 and the self-weight of the support leg assemblies 300 promote the at least three support leg assemblies 300 to be folded relative to the support rod assembly 100.

For example, when the user holds the sliding sleeve assembly 200 and lifts the sliding sleeve assembly 200 such that the at least three support leg assemblies 300 are folded relative to the support rod assembly 100, the self-weight of the connecting arm 710, the self-weight of the support member 720, and the self-weight of the electronic terminal promote the folding of the at least three support leg assemblies 300 relative to the support rod assembly 100.

In some embodiments, when the user holds the sliding sleeve assembly 200 and lifts the sliding sleeve assembly 200 such that the at least three support leg assemblies 300 are folded relative to the support rod assembly 100, the inertial effect of the support rod assembly 100 and the inertial effect of the support leg assemblies 300 promote the folding of the at least three support leg assemblies 300 relative to the support rod assembly 100.

It should be understood "inertia" refers to the property of an object to remain at rest or in uniform motion in a straight line, and the inertial effect refers to an effect brought by the inertia property.

For example, when the user holds the sliding sleeve assembly 200 and lifts the multi-legged stand such that the at least three support leg assemblies 300 are folded relative to the support rod assembly 100, the speed of the sliding sleeve assembly 200 changes, while the support leg assemblies 300 and the support rod assembly 100 maintain their original velocity. The inertial effects of the support leg assemblies 300 and the support rod assembly promote the folding of the at least three support leg assemblies 300 relative to the support rod assembly 100. Specifically, when the user holds the sliding sleeve assembly and lifts the multi-legged stand to fold the at least three support leg assemblies relative to the support rod assembly 100, the sliding sleeve assembly 200 accelerates from rest to a certain speed, while the support rod assemblies 100 and the support rod assembly 200 remain stationary. The inertial effects of the support rod assembly 100 and the support rod assembly 200 promote the folding of the at least three support leg assemblies relative to the support rod assembly.

For example, when the user holds the sliding sleeve assembly 200 and lifts the sliding sleeve assembly 200 such that the at least three support leg assemblies 300 are folded relative to the support rod assembly 100, the inertial effects of the connecting arm 710, the support member 720, and the electronic terminal promote the folding of the at least three support leg assemblies 300 relative to the support rod assembly 100. Specifically, when the user holds the sliding sleeve assembly and lifts the multi-legged stand such that the at least three support leg assemblies 300 are folded relative to the support rod assembly 100, the sliding sleeve assembly 200 accelerates from rest to a certain velocity, while the connecting arm 710, the support member 720, and the electronic terminal remain stationary. The connecting arm 710, the support member 720, and the electronic terminal promote the folding of the at least three support leg assemblies relative to the support rod assembly 100.

It should be understood that "bottom" and "top" as mentioned in this specification should be interpreted according to a common usage state of the multi-legged stand. The common usage state of the multi-legged stand is when it is supported on the support plane. That is, the bottom end of a component refers to an end closest to the support plane, and the top end refers to an end farthest from the support plane; the bottom surface refers to a surface closest to the support plane, and the top surface refers to a surface farthest from the support plane.

The technical features of the above-described embodiments may be combined in any manner. For the sake of brevity, not all possible combinations of the technical features in the embodiments are described. However, any combination of these technical features that does not conflict with the description herein should be considered within the scope of this specification.

The above-described embodiments merely illustrate several implementation methods of the present disclosure, which are described in detail and with specificity. However, this should not be construed as a limitation of the scope of the present disclosure. It should be noted that, for those skilled in the art, various modifications and improvements may be made without departing from the scope of the present disclosure. These modifications and improvements are all within the scope of the present disclosure. Therefore, the scope of the present disclosure should be determined by the appended claims.

What is claimed is:

1. A multi-legged stand, comprising: a support rod assembly, a sliding sleeve assembly, at least three support leg assemblies, at least three connecting rods, and a preliminary opening member;

wherein the sliding sleeve assembly is slidably sleeved along a length direction of the support rod assembly on the support rod assembly;

the at least three support leg assemblies are each rotatably connected to the sliding sleeve assembly;

the at least three connecting rods are matched with the at least three support leg assemblies in a one-to-one correspondence, with an end of each connecting rod rotatably connected to the support rod assembly and another end of the connecting rod rotatably connected to a corresponding support leg assembly, allowing the at least three support leg assemblies to be splayed or folded relative to the support rod assembly; in an initial state, the at least three support leg assemblies remain in a folded state relative to the support rod assembly; in a case where the at least three support leg assemblies are in a splayed state relative to the support rod assembly, the at least three support leg assemblies are capable of standing on a support surface;

in a case where a first external action is applied to the preliminary opening member, the preliminary opening member is caused to rotate relative to the support rod assembly; the preliminary opening member comprises at least three actuating portions, with the at least three actuating portions being matched with the at least three support leg assemblies in a one-to-one correspondence; during rotation of the preliminary opening member from an initial position to a second position, the at least three actuating portions actuate the at least three support leg assemblies respectively to cause the at least three support leg assemblies to be switched from the folded state relative to the support rod assembly to a preliminarily opened state relative to the support rod assembly, facilitating splaying of the at least three support leg assemblies relative to the support rod assembly.

2. The multi-legged stand according to claim 1, wherein during the first external action being applied to the preliminary opening member, the preliminary opening member translates along a first direction relative to the support rod assembly and rotates relative to the support rod assembly; at one of the following is satisfied:

the first external action comprises a force acting on the preliminary opening member along the first direction; and the first external action comprises a rotational torque acting on the preliminary opening member around a rotational axis of the preliminary opening member.

3. The multi-legged stand according to claim 2, wherein the preliminary opening member comprises a pressure-applying portion, and the first external action comprises a force acting on the preliminary opening member along the first direction;

in a case where pressure is applied to the pressure-applying portion along the first direction, the preliminary opening member is caused to translate along the first direction relative to the support rod assembly and rotate relative to the support rod assembly, rotating the preliminary opening member from the initial position to the second position.

4. The multi-legged stand according to claim 3, wherein the preliminary opening member is arranged on a bottom end of the support rod assembly;

in a case where the at least three support leg assemblies are folded relative to the support rod assembly, the pressure-applying portion protrudes from bottom ends of the at least three support leg assemblies;

in the case where the at least three support leg assemblies are folded relative to the support rod assembly, when the pressure-applying portion of the preliminary opening member impacts the support surface, the support surface applies pressure to the pressure-applying portion along the first direction, causing the preliminary opening member to translate along the first direction relative to the support rod assembly and rotate relative to the support rod assembly.

5. The multi-legged stand according to claim 2, wherein the preliminary opening member comprises a pressure-applying portion, and the first external action comprises a force acting on the preliminary opening member along the first direction;

in a case where pressure is applied to the pressure-applying portion along the first direction, the preliminary opening member is caused to translate along the first direction relative to the support rod assembly and rotate relative to the support rod assembly, rotating the preliminary opening member from the initial position to the second position;

wherein the preliminary opening member is arranged on a bottom end of the support rod assembly;

in a case where the at least three support leg assemblies are folded relative to the support rod assembly, the pressure-applying portion protrudes from bottom ends of the at least three support leg assemblies;

during a process where the at least three support leg assemblies are switched from the folded state relative to the support rod assembly to the preliminarily opened state relative to the support rod assembly, the sliding sleeve assembly slides along a second direction;

in a case where the at least three support leg assemblies are folded relative to the support rod assembly and the second direction is along a direction of gravity, when the pressure-applying portion of the preliminary opening member impacts the support surface along the second direction, the preliminary opening member is caused to translate along the first direction relative to the support rod assembly and rotate relative to the support rod assembly, causing the at least three support leg assemblies to be preliminarily opened relative to the support rod assembly;

after the pressure-applying portion of the preliminary opening member impacts the support surface along the second direction, with the second direction is along direction of gravity, and the at least three support leg assemblies are preliminarily opened relative to the support rod assembly, self-weight and inertial effects of a movable component cause the at least three support leg assemblies to be splayed relative to the support rod assembly; wherein the movable component comprises the sliding sleeve assembly, the at least three support leg assemblies, and the at least three connecting rods.

6. The multi-legged stand according to claim 2, wherein each support leg assembly comprises a contact surface; during a translation of the preliminary opening member along the first direction, a corresponding actuating portion comes into contact with the contact surface of the support leg assembly, where an angle between an external normal direction of the contact surface and the first direction is greater than 90° to facilitate preliminary opening of the support leg assembly relative to the support rod assembly.

7. The multi-legged stand according to claim 1, wherein the preliminary opening member is arranged with a first thread, and the support rod assembly is arranged with a second thread; the first thread and the second thread are in meshing engagement, and a rotational axis of the preliminary opening member is coaxial with a central axis of the first thread;

during the first external action being applied to the preliminary opening member, the preliminary opening member rotates around the rotational axis and relative to the support rod assembly, and the preliminary opening member translates along a first direction relative to the support rod assembly, with the first direction being parallel to the rotational axis;

at one of the following is satisfied:

the first external action comprises a force acting on the preliminary opening member along the rotational axis; and the first external action comprises a rotational torque acting on the preliminary opening member around the rotational axis.

8. The multi-legged stand according to claim 7, wherein the multi-legged stand further comprises a reset spring; the reset spring is configured to act on the preliminary opening member, causing the preliminary opening member to return from the second position to the initial position.

9. The multi-legged stand according to claim 8, wherein the preliminary opening member comprises a mounting column, and the first thread is disposed on the mounting column;

the support rod assembly defines a mounting cavity, and the mounting column is arranged in the mounting cavity; the second thread is disposed on a cavity wall of the mounting cavity, and the at least three actuating portions are connected to the mounting column;

the mounting column has a first abutment wall, and the support rod assembly has a second abutment wall disposed within the mounting cavity; a first end of the reset spring abuts against the first abutment wall, and a second end of the reset spring abuts against the second abutment wall;

during a process of the preliminary opening member rotating from the initial position to the second position, the mounting column moves toward the second abutment wall, causing the reset spring to be compressed.

10. The multi-legged stand according to claim 9, at least one of:

wherein:

the mounting column defines an accommodation cavity; the accommodation cavity is in communication with an end of the mounting column, and the first abutment wall is disposed within the accommodation cavity; the first end of the reset spring is received within the accommodation cavity;

the reset spring is a cylindrical spring or a tower spring; the preliminary opening member further comprises a connecting column connected to the mounting column; the reset spring is sleeved on the connecting column;

an end of the connecting column is received in the accommodation cavity;

the support rod assembly comprises a retaining portion, and the retaining portion defines a through hole; the connecting column passes through the through hole; the retaining portion is arranged with the second abutment wall and is configured to retain the connecting column in a case where the preliminary opening member is in the initial position; or wherein:

the support rod assembly comprises a support rod body and a mounting member; the mounting member is arranged on the support rod body, and each connecting rod is rotatably connected to the mounting member;

the mounting cavity is defined on the mounting member, the second thread is arranged on the mounting member, and the mounting member has the second abutment wall.

11. The multi-legged stand according to claim 1, wherein the multi-legged stand further comprises a movable member that is slidable relative to the support rod assembly to cause the preliminary opening member to be subjected to the first external action, for rotating the preliminary opening member from the initial position to the second position.

12. The multi-legged stand according to claim 11, wherein the movable member and the support rod assembly are in a sliding engagement along a rotational axis of the preliminary opening member, and the movable member and the support rod assembly are in a peripherally limited engagement around the rotational axis; the movable member is in a screw engagement with the preliminary opening member, causing that the preliminary opening member is subjected to the first external action in a case where the movable member is subjected to a third external action.

13. The multi-legged stand according to claim 12, at least one of:

wherein:

the multi-legged stand further comprises a force-bearing member that is fixedly connected to the movable member, and the force-bearing member is arranged with a force-bearing portion for applying the third external action;

the multi-legged stand further comprises an elastic member that is configured to provide an elastic force to the movable member to cause the movable member to return to an original position; in a case where the third external action is removed, the elastic member drives the movable member back to the original position under an elastic force of the elastic member, causing the preliminary opening member to return to the initial position; or wherein:

the movable member comprises a guide portion that extends from a top end of the preliminary opening member and is slidably connected to the support rod assembly; one of the guide portion and the support rod assembly defines a guide groove, and the other of the guide portion and the support rod assembly is arranged with a protrusion that is slidably connected to the guide groove.

14. The multi-legged stand according to claim 13, at least one of:

wherein:

the preliminary opening member is arranged on a bottom end of the support rod assembly;

in the initial state, the force-bearing portion protrudes from a bottom end of the preliminary opening member;

in a case where the at least three support leg assemblies are folded relative to the support rod assembly, the force-bearing member is received within a space enclosed by the at least three support leg assemblies, and the force-bearing member does not protrude from bottom ends of the at least three support leg assemblies, or wherein:

the preliminary opening member further comprises a mating portion; the at least three actuating portions are connected to the mating portion; the mating portion is rotatably connected to a bottom end of the support rod assembly, and the movable member is in a screw engagement with the mating portion; the elastic member is a reset spring that is sleeved on an outer periphery of the movable member and sandwiched between the force-bearing member and the mating portion.

15. The multi-legged stand according to claim 1, wherein in a case where the at least three support leg assemblies are folded relative to the support rod assembly, the at least three support leg assemblies surround an outer periphery of the support rod assembly, and each actuating portion is disposed between corresponding adjacent two support leg assemblies;

an inner wall surface of each support leg assembly has a contact surface, and the contact surface is configured such that the preliminary opening member contacts a corresponding actuating portion during rotation from the initial position to the second position.

16. The multi-legged stand according to claim 1, wherein in a case where the at least three support leg assemblies are folded relative to the support rod assembly, the at least three support leg assemblies are magnetically attached to the at least three connecting rods;

during a process where the at least three support leg assemblies are switched from the folded state relative to the support rod assembly to the preliminarily opened state relative to the support rod assembly, attractive forces of the at least three connecting rods on the at least three support leg assemblies weaken or become zero.

17. The multi-legged stand according to claim 1, wherein the multi-legged stand is configured to support an electronic terminal or a photography accessory; in a case where the at least three support leg assemblies are folded relative to the support rod assembly, the at least three support leg assemblies are capable of being held;

during a process where the at least three support leg assemblies are switched from the folded state relative to the support rod assembly into the preliminarily opened state relative to the support rod assembly, a rotation angle of each support leg assembly relative to the support rod assembly is greater than or equal to 0.5°.

18. The multi-legged stand according to claim 1, wherein during a process where the at least three support leg assemblies are switched from the folded state relative to the support rod assembly into the preliminarily opened state relative to the support rod assembly, the sliding sleeve assembly slides along a second direction;

in a case where the at least three support leg assemblies are preliminarily opened relative to the support rod assembly and the second direction is along a direction of gravity, a self-weight of a movable component causes the at least three support leg assemblies to be splayed relative to the support rod assembly; the movable component comprises the sliding sleeve assembly, the at least three support leg assemblies, and the at least three connecting rods.

19. The multi-legged stand according to claim 1, wherein the first external action comprises a rotational torque acting on the preliminary opening member and around a rotational axis; the preliminary opening member comprises a rotational adjustment portion, and the rotational torque around the rotational axis is configured to be applied to the rotational adjustment portion to rotate the preliminary opening member from the initial position to the second position.

20. The multi-legged stand according to claim 1, wherein during a rotation of the preliminary opening member relative to the support rod assembly, the preliminary opening member is capable of remaining in any one of at least three holding positions, with a number of the at least three holding positions being same as a number of the at least three support leg assemblies;

any one of the at least three holding positions is the initial position, and a holding position, among the at least three holding positions, adjacent to the initial position is the second position.

21. The multi-legged stand according to claim 20, wherein the multi-legged stand further comprises a reset spring, and the reset spring is configured to act on the preliminary opening member;

the preliminary opening member comprises a first snap-fitting portion, and the support rod assembly comprises a second snap-fitting portion; the first snap-fitting portion is retained at different positions of the second snap-fitting portion to keep the preliminary opening member at different holding positions of the at least three holding positions;

during a process where the first external action is applied to the preliminary opening member to rotate the preliminary opening member relative to the support rod assembly, the preliminary opening member slides relative to the support rod assembly while the reset spring extends or contracts, causing the first snap-fitting portion to disengage or engage with the second snap-fitting portion;

in a case where the preliminary opening member stops rotating relative to the support rod assembly, the reset spring acts on the preliminary opening member to cause the first snap-fitting portion to be snap-fitted with the second snap-fitting portion, and the reset spring causes the preliminary opening member to return to the initial position.

22. The multi-legged stand according to claim 1, wherein in a case where the at least three support leg assemblies are splayed relative to the support rod assembly, the sliding sleeve assembly is capable of being held and lifted, causing the at least three support leg assemblies to be folded relative to the support rod assembly.

23. The multi-legged stand according to claim 22, wherein in a case where the at least three support leg assemblies are folded relative to the support rod assembly, each support leg assembly is magnetically attracted to a corresponding connecting rod;

during a process where the sliding sleeve assembly is held and lifted to cause the at least three support leg assemblies to be folded relative to the support rod assembly, a magnetic attraction member of the support leg assembly magnetically attracts the corresponding connecting rod to promote folding of the at least three support leg assemblies relative to the support rod assembly, a self-weight of the support rod assembly and a self-weight of the at least three support leg assemblies promote the folding of the at least three support leg assemblies relative to the support rod assembly, and an inertial effect of the support rod assembly and inertial effects of the at least three support leg assemblies promote the folding of the at least three support leg assemblies relative to the support rod assembly.

24. A multi-legged stand, comprising: a support rod assembly, a sliding sleeve assembly, at least three support leg assemblies, at least three connecting rods, and a preliminary opening member;

wherein the sliding sleeve assembly is slidably sleeved along a length direction of the support rod assembly on the support rod assembly;

the at least three support leg assemblies are each rotatably connected to the sliding sleeve assembly;

the at least three connecting rods are matched with the at least three support leg assemblies in a one-to-one correspondence, with an end of each connecting rod rotatably connected to the support rod assembly and another end of the connecting rod rotatably connected to a corresponding support leg assembly, allowing the at least three support leg assemblies to be splayed or folded relative to the support rod assembly; in an initial state, the at least three support leg assemblies remain in a folded state relative to the support rod assembly; in a case where the at least three support leg assemblies are in a splayed state relative to the support rod assembly, the at least three support leg assemblies are capable of standing on a support surface;

the preliminary opening member is slidably arranged on the support rod assembly; a second external action is configured to be applied to the preliminary opening member to cause the preliminary opening member to translate along a first direction relative to the support rod assembly;

the preliminary opening member comprises at least three contact-push portions, with the at least three contact-push portions corresponding to the at least three support leg assemblies in a one-to-one correspondence;

during a process of the preliminary opening member translating from an initial position to a third position, the at least three contact-push portions push the at least three support leg assemblies, causing the at least three support leg assemblies to be switched from being folded relative to the support rod assembly to being preliminarily opened relative to the support rod assembly.

25. The multi-legged stand according to claim 24, wherein the multi-legged stand further comprises a reset spring, and the reset spring is configured to act on the preliminary opening member, causing the preliminary opening member to return from the third position to the initial position.

26. The multi-legged stand according to claim 25, wherein the preliminary opening member comprises a mounting column, and the support rod assembly defines a mounting cavity;

the mounting column is slidably arranged in the mounting cavity, and the at least three contact-push portions are connected to the mounting column;

the mounting column has a first abutment wall, and the support rod assembly has a second abutment wall disposed within the mounting cavity;

a first end of the reset spring abuts against the first abutment wall, and a second end of the reset spring abuts against the second abutment wall;

during a process of the preliminary opening member translating from the initial position to the third position, the mounting column moves toward the second abutment wall, and the reset spring is compressed;

the mounting column defines an accommodation cavity that is in communication with an end of the mounting column, and the first abutment wall is disposed in the accommodation cavity; the first end of the reset spring is received in the accommodation cavity;

the preliminary opening member further comprises a connecting column that is connected to the mounting column; the reset spring is a cylindrical spring or a tower spring, and the reset spring is sleeved on the connecting column;

the support rod assembly comprises a retaining portion; in a case where the preliminary opening member is in the initial position, the retaining portion retains the connecting column to prevent the preliminary opening member from separating from the support rod assembly.

27. The multi-legged stand according to claim 24, wherein in a case where the at least three support leg assemblies are folded relative to the support rod assembly, the at least three support leg assemblies are magnetically attached to the at least three connecting rods;

during a process where the at least three support leg assemblies are switched from being folded relative to the support rod assembly to being preliminarily opened relative to the support rod assembly, attractive forces of the at least three connecting rods on the at least three support leg assemblies weaken or become zero.

28. The multi-legged stand according to claim 24, wherein in a case where the at least three support leg assemblies are splayed relative to the support rod assembly, the sliding sleeve assembly is capable of being held and lifted, causing the at least three support leg assemblies to be folded relative to the support rod assembly.

29. The multi-legged stand according to claim 28, wherein in a case where the at least three support leg assemblies are folded relative to the support rod assembly, each support leg assembly is magnetically attracted to a corresponding connecting rod;

during a process where the sliding sleeve assembly is held and lifted to cause the at least three support leg assemblies to be folded relative to the support rod assembly, a magnetic attraction member of the support leg assembly magnetically attracts the corresponding connecting rod to promote folding of the at least three support leg assemblies relative to the support rod assembly, a self-weight of the support rod assembly and a self-weight of the at least three support leg assemblies promote the folding of the at least three support leg assemblies relative to the support rod assembly, and an inertial effect of the support rod assembly and inertial effects of the at least three support leg assemblies promote the folding of the at least three support leg assemblies relative to the support rod assembly.

30. An electronic terminal support device, comprising a support member and a multi-legged stand; wherein the multi-legged stand comprises: a support rod assembly, a sliding sleeve assembly, at least three support leg assemblies, at least three connecting rods, and a preliminary opening member;

wherein the sliding sleeve assembly is slidably sleeved along a length direction of the support rod assembly on the support rod assembly;

the at least three support leg assemblies are each rotatably connected to the sliding sleeve assembly;

the at least three connecting rods are matched with the at least three support leg assemblies in a one-to-one correspondence, with an end of each connecting rod rotatably connected to the support rod assembly and another end of the connecting rod rotatably connected to a corresponding support leg assembly, allowing the at least three support leg assemblies to be splayed or folded relative to the support rod assembly; in an initial state, the at least three support leg assemblies remain in a folded state relative to the support rod assembly; in a case where the at least three support leg assemblies are in a splayed state relative to the support rod assembly, the at least three support leg assemblies are capable of standing on a support surface;

in a case where a first external action is applied to the preliminary opening member, the preliminary opening member is caused to rotate relative to the support rod assembly or translate relative to the support rod assembly along a first direction; the preliminary opening member comprises at least three actuating portions, with the at least three actuating portions being matched with the at least three support leg assemblies in a one-to-one correspondence; during rotation of the preliminary opening member from an initial position to a second position, the at least three actuating portions actuate the at least three support leg assemblies respectively to cause the at least three support leg assemblies to be switched from the folded state relative to the support rod assembly to a preliminarily opened state relative to the support rod assembly, facilitating splaying of the at least three support leg assemblies relative to the support rod assembly;

wherein the support member is configured to support an electronic terminal, and the support member is arranged on the support rod assembly.

* * * * *